(12) United States Patent
Kim et al.

(10) Patent No.: US 11,382,061 B2
(45) Date of Patent: Jul. 5, 2022

(54) METHOD AND APPARATUS FOR PERFORMING PAGING IN MOBILE COMMUNICATION SYSTEM

(71) Applicant: Samsung Electronics Co., Ltd., Gyeonggi-do (KR)

(72) Inventors: Sangbum Kim, Gyeonggi-do (KR); Soenghun Kim, Gyeonggi-do (KR); Donggun Kim, Seoul (KR); Seungri Jin, Gyeonggi-do (KR); Himke Van Der Velde, Zwolle (NL); Jaehyuk Jang, Gyeonggi-do (KR); Gert Jan Van Lieshout, Apeldoorn (NL)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/322,390

(22) PCT Filed: Jul. 28, 2017

(86) PCT No.: PCT/KR2017/008141
§ 371 (c)(1),
(2) Date: Jan. 31, 2019

(87) PCT Pub. No.: WO2018/026139
PCT Pub. Date: Feb. 8, 2018

(65) Prior Publication Data
US 2019/0166576 A1 May 30, 2019

(30) Foreign Application Priority Data

Aug. 2, 2016 (KR) .................. 10-2016-0098394

(51) Int. Cl.
*H04W 4/00* (2018.01)
*H04W 68/00* (2009.01)
(Continued)

(52) U.S. Cl.
CPC ......... *H04W 68/005* (2013.01); *H04W 24/10* (2013.01); *H04W 36/08* (2013.01);
(Continued)

(58) Field of Classification Search
CPC ..................................................... H04W 76/15
See application file for complete search history.

(56) References Cited

U.S. PATENT DOCUMENTS 10,652,943 B2 * 5/2020 Tamura ............... H04W 8/08
10,721,118 B2 * 7/2020 Hong ................. H04W 76/15
(Continued)

FOREIGN PATENT DOCUMENTS

CN    105491682    4/2016
CN    105722137    6/2016
(Continued)

OTHER PUBLICATIONS

PCT/ISA/210 Search Report issued on PCT/KR2017/008141 (pp. 5).
(Continued)

*Primary Examiner* — Guang W Li
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method and apparatus for configuring a paging area while centering a (Continued)

terminal thereon and updating the same in a network supporting a light connection. According to the present disclosure, a terminal in a communication system may: receive an RRC connection release message including paging area (PA)-related information from a first base station and receive system information from a second base station; and check whether a PA has been changed, on the basis of the PA-related information and PA-related information included in the system information, and transmit an RRC connection resume request message to the second base station when the PA has been changed.

8 Claims, 57 Drawing Sheets

(51) Int. Cl.
| | |
|---|---|
| *H04W 52/02* | (2009.01) |
| *H04W 76/15* | (2018.01) |
| *H04W 76/28* | (2018.01) |
| *H04W 76/27* | (2018.01) |
| *H04W 24/10* | (2009.01) |
| *H04W 36/08* | (2009.01) |
| *H04W 48/10* | (2009.01) |
| *H04W 68/02* | (2009.01) |
| *H04W 92/02* | (2009.01) |
| *H04W 88/06* | (2009.01) |
| *H04W 92/20* | (2009.01) |

(52) U.S. Cl.
CPC .......... *H04W 48/10* (2013.01); *H04W 52/02* (2013.01); *H04W 52/0206* (2013.01); *H04W 68/02* (2013.01); *H04W 76/15* (2018.02); *H04W 76/27* (2018.02); *H04W 76/28* (2018.02); *H04W 88/06* (2013.01); *H04W 92/02* (2013.01); *H04W 92/20* (2013.01); *Y02D 30/70* (2020.08)

(56) References Cited

U.S. PATENT DOCUMENTS

| | | | | |
|---|---|---|---|---|
| 11,051,217 | B2* | 6/2021 | Xu | H04W 36/0055 |
| 11,184,942 | B2* | 11/2021 | Pelletier | H04W 52/365 |
| 2013/0237267 | A1 | 9/2013 | Lee et al. | |
| 2015/0043492 | A1* | 2/2015 | Baek | H04W 76/15 370/329 |
| 2015/0124748 | A1* | 5/2015 | Park | H04L 5/0091 370/329 |
| 2015/0208235 | A1* | 7/2015 | Ingale | H04W 76/15 455/411 |
| 2015/0358866 | A1* | 12/2015 | Xu | H04W 36/38 370/331 |
| 2016/0095034 | A1* | 3/2016 | Hampel | H04W 36/14 370/331 |
| 2016/0100449 | A1 | 4/2016 | Jang et al. | |
| 2016/0183151 | A1* | 6/2016 | Wu | H04W 24/10 370/332 |
| 2016/0183322 | A1* | 6/2016 | Huang | H04W 28/085 455/434 |
| 2016/0205660 | A1 | 7/2016 | Ryu et al. | |
| 2016/0212661 | A1* | 7/2016 | Basu Mallick | H04L 1/1614 |
| 2016/0219553 | A1 | 7/2016 | Sundberg et al. | |
| 2016/0249259 | A1* | 8/2016 | Park | H04W 36/00 |
| 2016/0309379 | A1* | 10/2016 | Pelletier | H04W 76/27 |
| 2016/0338131 | A1* | 11/2016 | Godin | H04W 36/0069 |
| 2017/0150384 | A1* | 5/2017 | Rune | H04W 72/085 |
| 2017/0150405 | A1* | 5/2017 | Chiba | H04W 36/0038 |
| 2017/0208488 | A1* | 7/2017 | Hwang | H04W 64/003 |
| 2017/0265243 | A1* | 9/2017 | Hahn | H04W 76/19 |
| 2017/0331670 | A1* | 11/2017 | Parkvall | H04J 11/0056 |
| 2017/0353987 | A1* | 12/2017 | Wu | H04W 76/15 |
| 2017/0374644 | A1 | 12/2017 | Ryu et al. | |
| 2018/0020382 | A1 | 1/2018 | Kim et al. | |
| 2018/0035485 | A1* | 2/2018 | Lee | H04W 76/38 |
| 2018/0160336 | A1* | 6/2018 | Dai | H04W 36/28 |
| 2019/0159274 | A1* | 5/2019 | Hong | H04W 76/15 |
| 2019/0191481 | A1* | 6/2019 | Wu | H04W 80/08 |
| 2019/0342148 | A1* | 11/2019 | Hong | H04L 41/0668 |
| 2020/0113012 | A1* | 4/2020 | Lee | H04W 28/0252 |

FOREIGN PATENT DOCUMENTS

| | | |
|---|---|---|
| EP | 3 041 310 | 7/2016 |
| WO | WO 2012/064076 | 5/2012 |
| WO | WO 2014/021611 | 2/2014 |
| WO | WO 2016/099138 | 6/2016 |
| WO | WO 2016/111591 | 7/2016 |
| WO | WO 2018/012904 | 1/2018 |

OTHER PUBLICATIONS

PCT/ISA/237 Written Opinion issued on PCT/KR2017/008141 (pp. 5).
3GPP TS 36.331 V13.2.0 (Jun. 2016), 3rd Generation Partnership Project; Technical Specification Group Radio Access Network; Evolved Universal Terrestrial Radio Access (E-UTRA); Radio Resource Control (RRC); Protocol specification (Release 13), Copyright 2016, 3GPP Organizational Partners (pp. 625).
Huawei, "Requirements and Functionalities of the Interface Between LTE and NR", R3-161138, 3GPP TSG-RAN3 Meeting #92, May 23-27, 2016, 5 pages.
European Search Report dated Aug. 7, 2019 issued in counterpart application No. 17837191.0-1231, 10 pages.
Chinese Office Action dated Jun. 3, 2021 issued in counterpart application No. 201780060666.8, 18 pages.
Indian Examination Report dated Aug. 24, 2021 issued in counterpart application No. 201937003985, 5 pages.
Mugen Peng et al., "Self-Organization Networking Techniques in Broadband Mobile Communication Systems", Oct. 31, 2013, 25 pages.
Chinese Rejection Decision dated Apr. 2, 2022 issued in counterpart application No. 201780060666.8, 19 pages.

\* cited by examiner

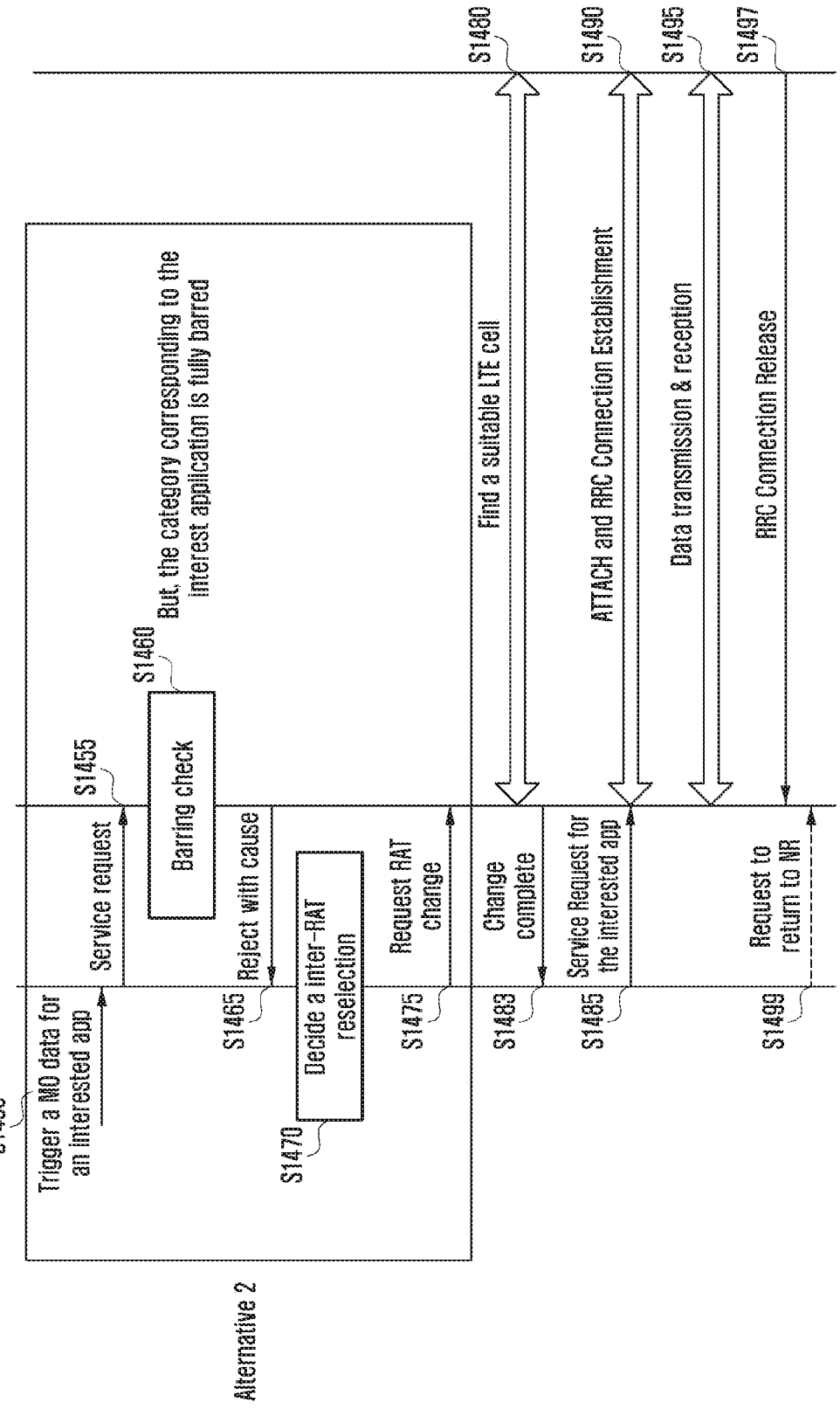

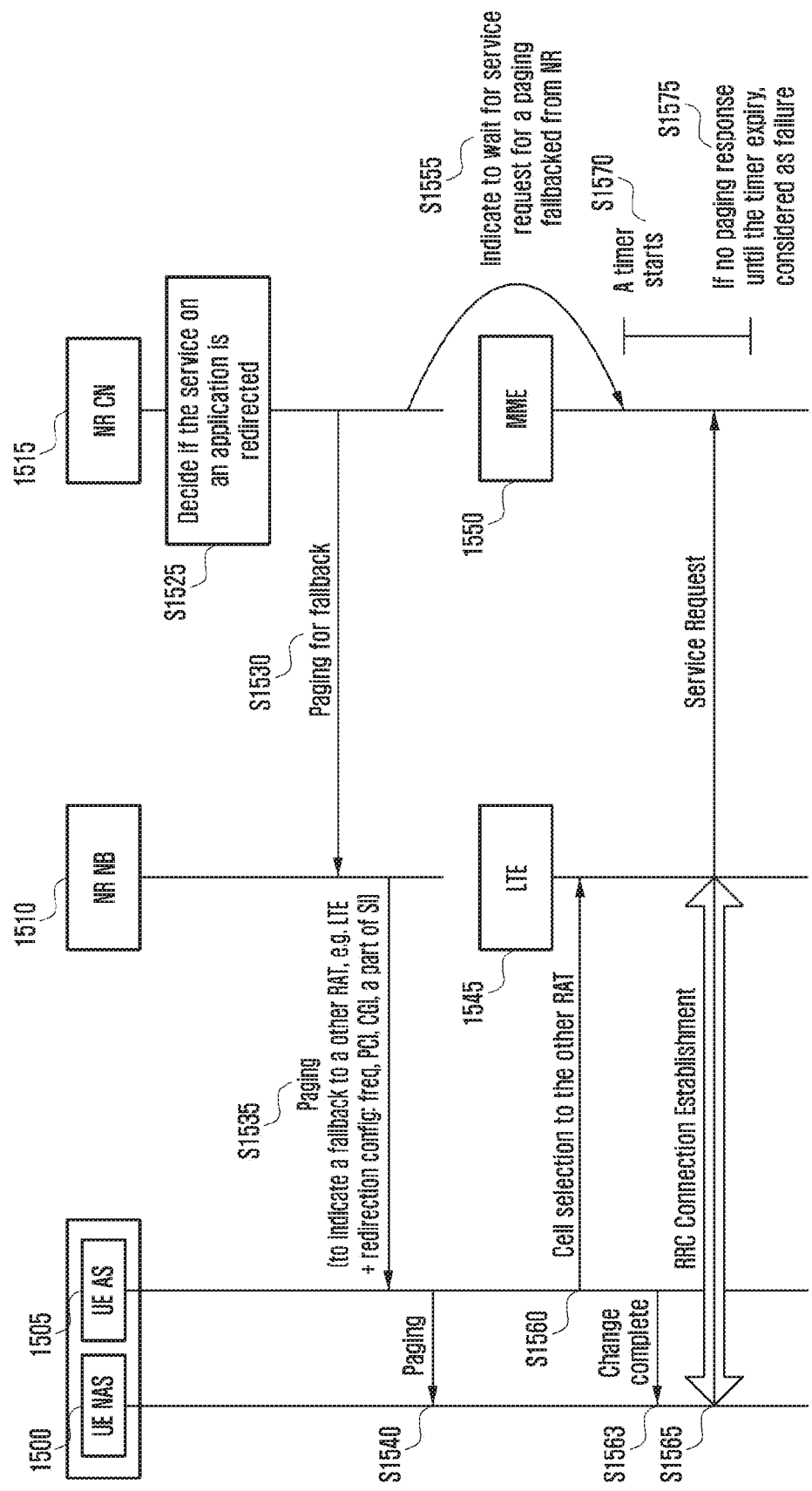

METHOD AND APPARATUS FOR PERFORMING PAGING IN MOBILE COMMUNICATION SYSTEM

PRIORITY

This application is a National Phase Entry of PCT International Application No. PCT/KR2017/008141 which was filed on Jul. 28, 2017, and claims priority to Korean Patent Application No. 10-2016-0098394, which was filed on Aug. 2, 2016, the content of each of which is incorporated herein by reference.

TECHNICAL FIELD

The present disclosure relates to a method and an apparatus for effectively performing paging in a next-generation mobile communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, in the conventional LTE system, a user equipment (UE) is required to update a paging area and perform a paging process in a network supporting a light-connection mode.

DISCLOSURE OF INVENTION

Technical Problem

An aspect of the present disclosure is to reduce signaling overhead by providing a method and an apparatus for configuring and updating a paging area based on a UE according to the characteristics of a normal UE for which the connection is released in the network supporting a light connection or a UE operating in an extended coverage mode.

Solution to Problem

In accordance with an aspect of the present disclosure, a method of a UE in a communication system is provided. The method includes: receiving a radio resource control (RRC) connection release message including paging area (PA)-related information from a first eNB; receiving system information from a second eNB; identifying whether the PA is changed based on the PA-related information and PA-related information included in the system information; and transmitting an RRC connection resume request message to the second eNB when the PA is changed.

The method may further include receiving an RRC connection release message from the second eNB in response to the RRC connection resume request message, wherein the RRC connection release message may include new PA-related information. The second eNB may transmit a UE-related information request message to the first eNB, and the first eNB may transmit a UE-related information response message to the second eNB in response to the UE-related information request message. After transmitting the RRC connection release message, the second eNB may transmit a message indicating update of the PA-related information to the first eNB. The PA-related information may be a PA indicator or a set of one or more cell identifiers.

In accordance with another aspect of the present disclosure, a method of an eNB in a communication system is provided. The method includes: transmitting system information including paging area (PA)-related information to a UE; receiving an RRC connection resume request message to the UE; and receiving an RRC connection release message in response to the RRC connection resume request message to the UE, wherein the RRC connection release message includes new PA-related information.

In accordance with another aspect of the present disclosure, a UE in a communication system is provided. The UE includes: a transceiver; and a controller configured to receive a radio resource control (RRC) connection release message including paging area (PA)-related information from a first eNB, receive system information from a second eNB, control the transceiver to transmit an RRC connection resume request message to the second eNB when the PA is changed, and perform control to identify whether the PA is changed based on the PA-related information and PA-related information included in the system information.

In accordance with another aspect of the present disclosure, an eNB in a communication system is provided. The eNB includes: a transceiver; and a controller configured to perform control to transmit system information including paging area (PA)-related information to a UE, receive an RRC connection resume request message from the UE, and receive an RRC connection release message to the UE in response to the RRC connection resume request message, wherein the RRC connection release message includes new PA-related information.

Advantageous Effects of Invention

According to an embodiment of the present disclosure, radio resources are divided into a network-inactive time window and a network-active time window according to whether the eNB meets a particular condition and transmission of system information, paging, and a CRS is restricted during the network-inactive time window, so that network power consumption can be effectively reduced.

According to another embodiment of the present disclosure, it is possible to determine a mobile communication system to be served for a particular service according to the circumstances, so that the UE can omit an unnecessary process of connecting to a mobile communication system eNB and thus reduce signaling overhead.

According to another embodiment of the present disclosure, when a normal UE of which the connection is released in a network supporting a light connection or an extended coverage mode UE moves, a UE-oriented paging area may be configured as a paging area for reporting mobility and the signal overhead can be reduced.

According to another embodiment of the present disclosure, through the application of selective ciphering to a mobile communication system, a calculation speed at which a data packet transmitted at a high data transmission rate is decoded can be reduced and system load can also be reduced. Further, it is possible to maintain a security level similar to that of another method of ciphering all data.

According to an embodiment of the present disclosure, even when the UE and different types of eNBs are connected at the same time and are served, control message can be effectively transmitted.

BRIEF DESCRIPTION OF DRAWINGS

FIGS. 14A and 14B illustrate an embodiment in which fallback is performed for an MO service in the present disclosure;

FIG. 15 illustrates an embodiment of performing fallback for an MT service in the present disclosure;

MODE FOR THE INVENTION

Figure 1:
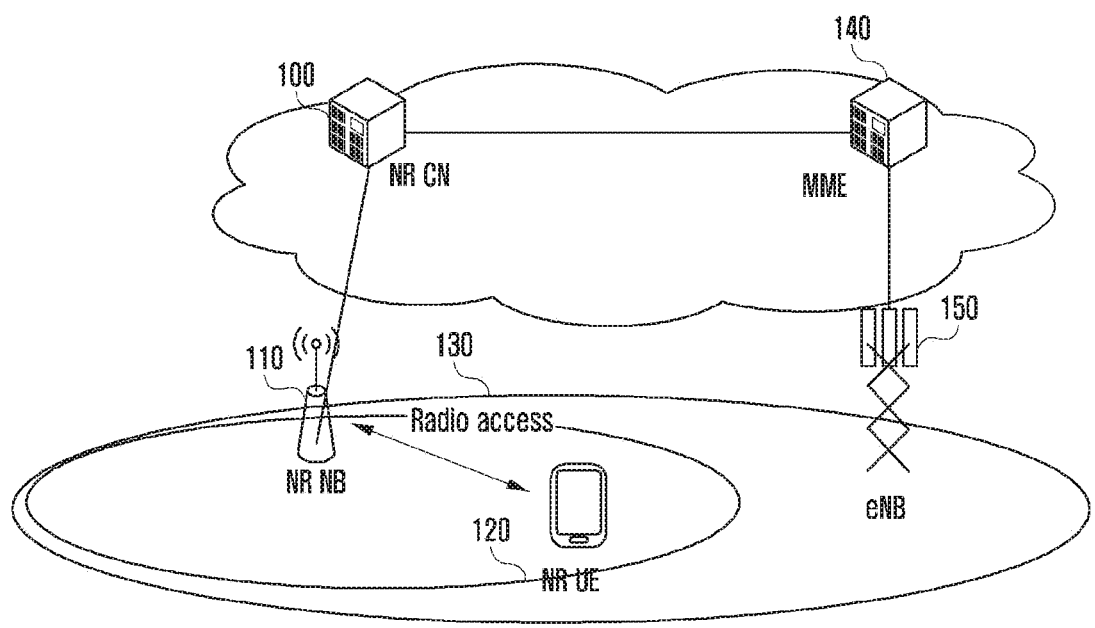
FIG. 1 illustrates the structure of a next-generation mobile communication system.

Hereinafter, embodiments of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. { } The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the ¡ °unit¡ ± or ¡ °module¡ ± does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card. Also, in an embodiment, "units" may include one or more processors.

First Embodiment

FIG. 1 illustrates the structure of a next-generation mobile communication system.

Referring to FIG. 1, as illustrated in FIG. 1, a radio access network of the next-generation mobile communication system includes a next-generation base station (hereinafter, referred to as an NR NB (new radio node B)) 110 and a new radio core network (NR CN) 100. A user terminal (hereinafter, referred to as an NR UE (New Radio User Equipment or a UE) 120 accesses an external network through the NR NB 110 and the NR CN 100.

In FIG. 1, the NR NB 110 corresponds to an evolved Node B (eNB) in a conventional LTE system. The NR NB may be connected to the NR UE 120 through a radio channel and may provide better service than the conventional node B. Since all user traffic is serviced through a shared channel in the next-generation mobile communication system, a device for collecting and scheduling status information of buffer statuses, available transmission power statuses, and channel statuses of UEs is required, which corresponds to the NR NB 110. One NR NB generally controls a plurality of cells. The NR NB may have a bandwidth wider than the conventional maximum bandwidth in order to implement super-high-speed data transmission compared to conventional LTE and may apply orthogonal frequency division multiplexing (OFDM) through radio access technology and further apply beamforming technology. Further, a modulation scheme and an Adaptive Modulation and Coding (AMC) scheme of determining a channel coding rate are applied in accordance with the channel status of the UE.

The NR CN 100 performs a function of supporting mobility, configuring a bearer, and configuring QoS. The NR CN is a device which performs not only a function of managing mobility of the UE but also various control functions and is connected to a plurality of eNBs. Further, the next-generation mobile communication system may be linked to the conventional LTE system, and the NR CN may be connected to an MME 140 through a network interface. The MME is connected to an eNB 150, which is a conventional eNB.

Figure 2:
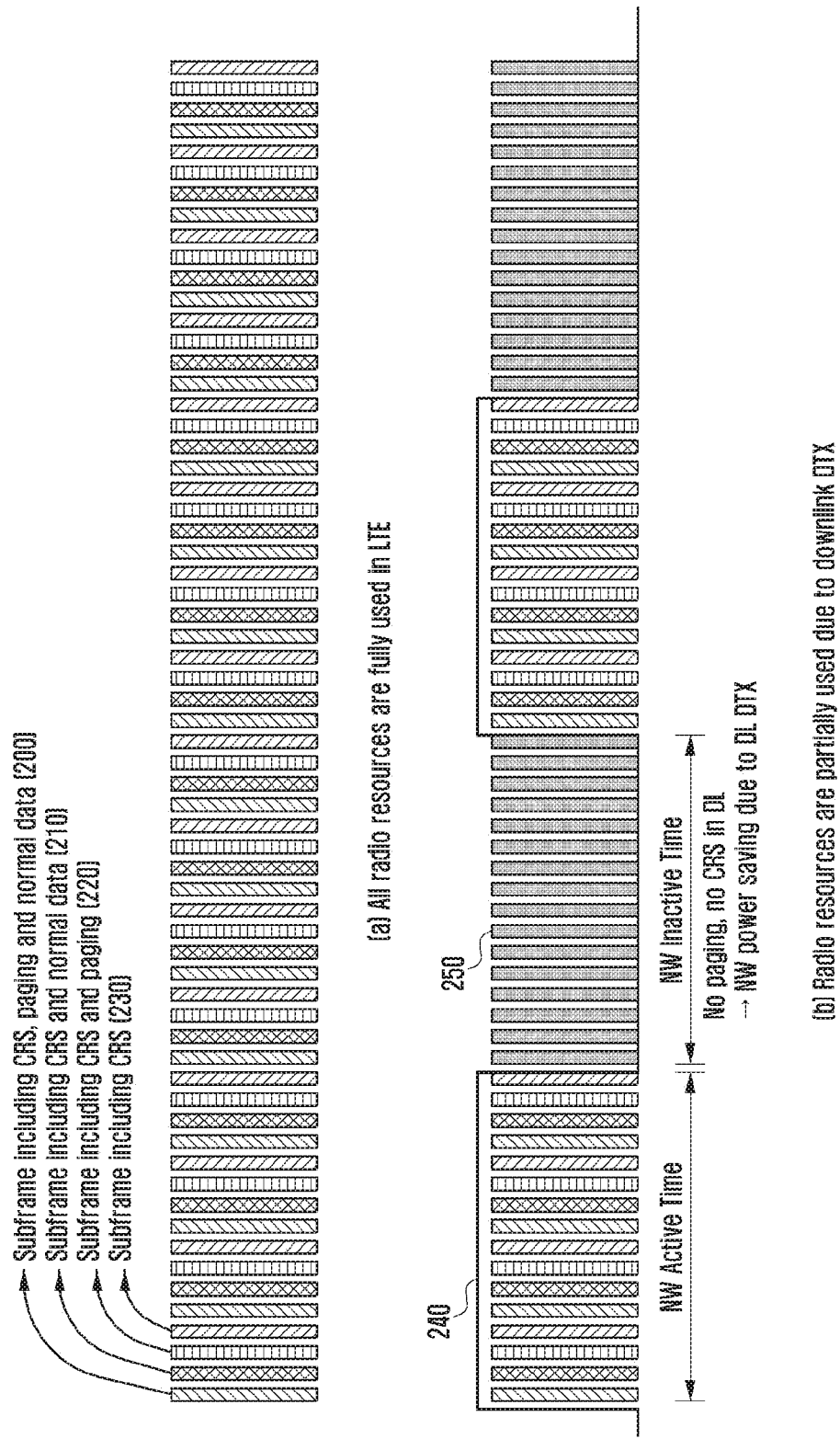
FIG. 2 illustrates a resource usage rate in the conventional LTE system and a resource usage rate in the present disclosure.

FIG. 2 illustrates a resource usage rate in the conventional LTE system and a resource usage rate in the present disclosure.

FIG. 2A illustrates an example in which radio resources are used in conventional LTE. Subframes 200, 210, 220, and 230 are used for transmitting a common reference signal or cell-specific reference signal (CRS), paging, and general data. Even when there is no served UE within a cell and thus there is no paging or general data, the eNB should transmit at least a CRS which is used when the UE derives reference signal received power (RSRP) or reference signal received quality (RSRQ), corresponding to the signal quality index of the cell. Accordingly, the eNB should always transmit a signal regardless of the existence or non-existence of the UE within the cell, and thus there is no method of saving power.

The present disclosure proposes a power-saving technology from the aspect of the network. In the present disclosure, when a particular condition of the eNB is met, as illustrated in FIG. 2B, radio resources are divided into a network inactive time interval 250 in which the eNB transmits no paging and CRS and a network active time interval 240 in which the general operation of the eNB is performed. The particular condition is defined as at least one of the following conditions.
- the case in which the load within the cell is equal or lower than a predetermined value, for example, the case in which the expected number of UEs camping thereon is equal to or smaller than a particular value or the number of connected-mode UEs within the cell is equal to or smaller than a particular value
- the time zone in which the number of UEs that should be served within the cell is significantly small, for example, at dawn
- the case in which the corresponding eNB is specialized at serving UEs requiring low performance, as in machine-type communication (MTC)

In the present disclosure, the inactive time interval is referred to as a network (NW) inactive time window 250. During the time window, the eNB does not transmit system information, paging, and the CRS. Further, the eNB does not transmit a PDCCH except for exceptional cases. On the other hand, the active time interval in which the general operation is performed is referred to as a network-active time window 240.

The network-active time window (or the network-inactive time window) is repeated at a preset period and maintained for a predetermined time. The period and the length of the window are configured by the network, and are transferred to UEs within the cell using system information or dedicated signaling. The window may be applied to all UEs within the cell in common and a unit thereof may be a subframe or a frame. The window may be generated at a regular period and with a particular pattern. In this case, pattern information may be transmitted to UEs within the cell through system information. An equation may be used to derive a frame and a subframe (that is, a paging frame (PF)) in which paging of an idle-mode UE is transmitted and/or paging occasion (PO) is not influenced by the window, but paging transmission in the frame and the subframe in the network-inactive time window may be omitted. Such a masking scheme has an advantage in that equations of deriving the PF and the PO are separated from the window and thus derivation thereof can be simplified. The connected-mode UE also omits monitoring of a physical downlink control channel (PDCCH) during an onDuration time window (that is, referring to an on time) in a discontinuous reception (DRX) operation included in the network-inactive time window. Since the eNB transmits nothing in the network-inactive time window except for a particular exceptional case, power consumption may be saved in the time window.

The present disclosure proposes an operation performed by an idle-mode UE (idle UE) and a connected-mode UE (connected UE) in subframes within the network-inactive time window.

Figure 3:
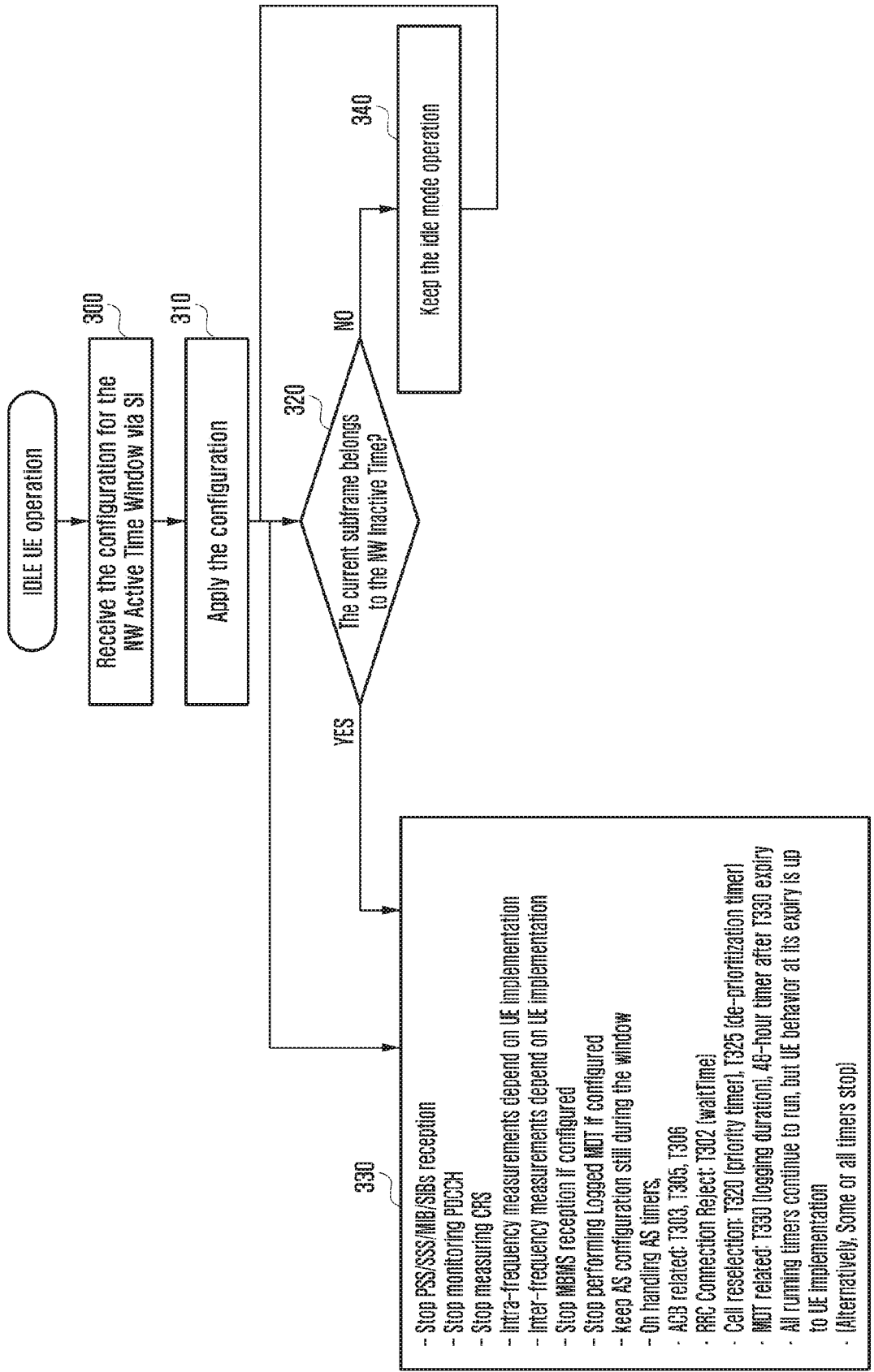
FIG. 3 is a flowchart illustrating an operation of an idle-mode UE in the present disclosure.

FIG. 3 is a flowchart illustrating the operation of an idle-mode UE in the present disclosure.

In step 300, the UE receives configuration information for the network-active time window from the eNB. The UE may receive configuration information for the network-inactive time window instead of the network-active time window. The two windows indicate exclusive time regions, and thus if configuration information for one window is received, the other window is also indicated. The configuration information is provided using broadcasted system information such that the idle-mode UE can receive the configuration information.

In step 310, the UE applies the received configuration information. In step 320, the UE determines whether the current subframe is in the network-inactive time window. When the current subframe is not in the network-inactive time window, the UE performs a general idle mode operation in step 340. When the current subframe is in the network-inactive time window, the UE performs at least one operation indicated below in step 330.

The UE stops receiving a primary synchronization signal (PSS), a secondary synchronization signal (SSS), a master information block (MIB), and a system information block (SIB) in the subframe. The BS may not transmit the PSS, the SSS, the MIB, and the SIB within the network-inactive time window. However, the signals and information may be transmitted within the window when emergency disaster information is transmitted through an earthquake and tsunami warning system and/or a commercial mobile alert system. If the UE receives paging indicating the ETWS and/or the CMAS during the network-active time window, the UE immediately starts receiving alarm information of the ETWS and/or the CMAS, and the reception operation continues during the network-inactive time window until reception of the information is completed.

The UE does not monitor a PDCCH of a serving cell in the subframe. The BS may not transmit control information through the PDCCH in the network-inactive time window except for a specific exceptional case. Accordingly, the UE may not identify a P-RNTI for paging reception.

The UE stops measuring a CRS of the serving cell in the subframe.

Measurement of the same frequency within the system (intra-frequency) by the UE in the subframe may be different depending on UE implementation.

For power saving, the UE does not measure the same frequency within the system when the signal quality of the serving cell is higher than a particular threshold value, that is, $S_{IntraSearch}$ (or a newly defined threshold value). However, since the serving cell does not transmit the CRS in the network-inactive time window, the UE cannot determine the signal quality of the serving cell. Accordingly, in this case, it is required to define the UE operation. The following options may be considered.

Option 1: the UE does not always measure the same frequency within the system in the subframe.

Option 2: the UE measures the same frequency within the system in the subframe.

Option 3: the UE measures the same frequency within the system only when a particular condition is satisfied in the subframe. The condition may correspond to the case in which the signal quality of the serving cell measured in a particular subframe or a subframe group in the network-active time window before the network-inactive time window is not larger than $S_{IntraSearch}$ or the case in which a movement speed of the UE is higher than or equal to a particular value.

The measurement of different frequencies (inter-frequency) within the system or different communication systems (inter-RAT) in the subframe may be different depending on the UE implementation.

For power saving, the UE does not measure different frequencies within the system or different communication systems when the signal quality (that is, RSRP or RSRQ) of the serving cell is higher than a particular threshold value, that is, $S_{nonIntraSearch}$. However, since the serving cell does not transmit the CRS in the network-inactive time window, the UE cannot determine the signal quality of the serving cell. Accordingly, in this case, it is required to define the UE operation. The following options may be considered.

Option 1: UE does not always measure different frequencies within the system or different communication systems in the subframe.

Option 2: UE measures different frequencies within the system or different communication systems in the subframe.

Option 3: UE measures different frequencies within the system or different communication systems only when a particular condition is satisfied in the subframe. The condition may correspond to the case in which the signal quality of the serving cell measured in a particular subframe or a subframe group in the network-active time window before the network-inactive time window is not larger than $S_{nonIntraSearch}$ or the case in which a movement speed of the UE is higher than or equal to a particular value.

cell reselection is different depending on UE implementation. When the UE measures the same frequency within the system or different frequencies in the subframe and the signal quality of a frequency having a higher priority than a currently camped-on frequency is higher than a particular threshold value, the UE may perform cell reselection. This is possible because cell reselection to the frequency having the higher priority does not consider the signal quality of the cell currently providing service. However, when cell reselection to a frequency having the same or a lower priority is performed, the signal quality of the cell currently providing service is considered, and thus cell reselection cannot be performed in the subframe in the above-described cases.

The UE stops receiving a multimedia broadcast multicast service (MBMS) in the subframe.

The UE stops a logged minimization of drive test (MDT) operation in the subframe. At this time, a relevant timer is not stopped.

The UE maintains access stratum (AS) configuration information without deleting the same in the subframe.

The UE continues driving of AS timers in the subframe, and the UE operation follows the UE implementation when the timers expire.

Access class barring (ACB)-related timer: T303, T305, T306

RRC connection reject-related timer: T302 (waitTime)

Cell reselection-related timer: T320 (priority timer), T325 (de-prioritization timer)

Figure 4:
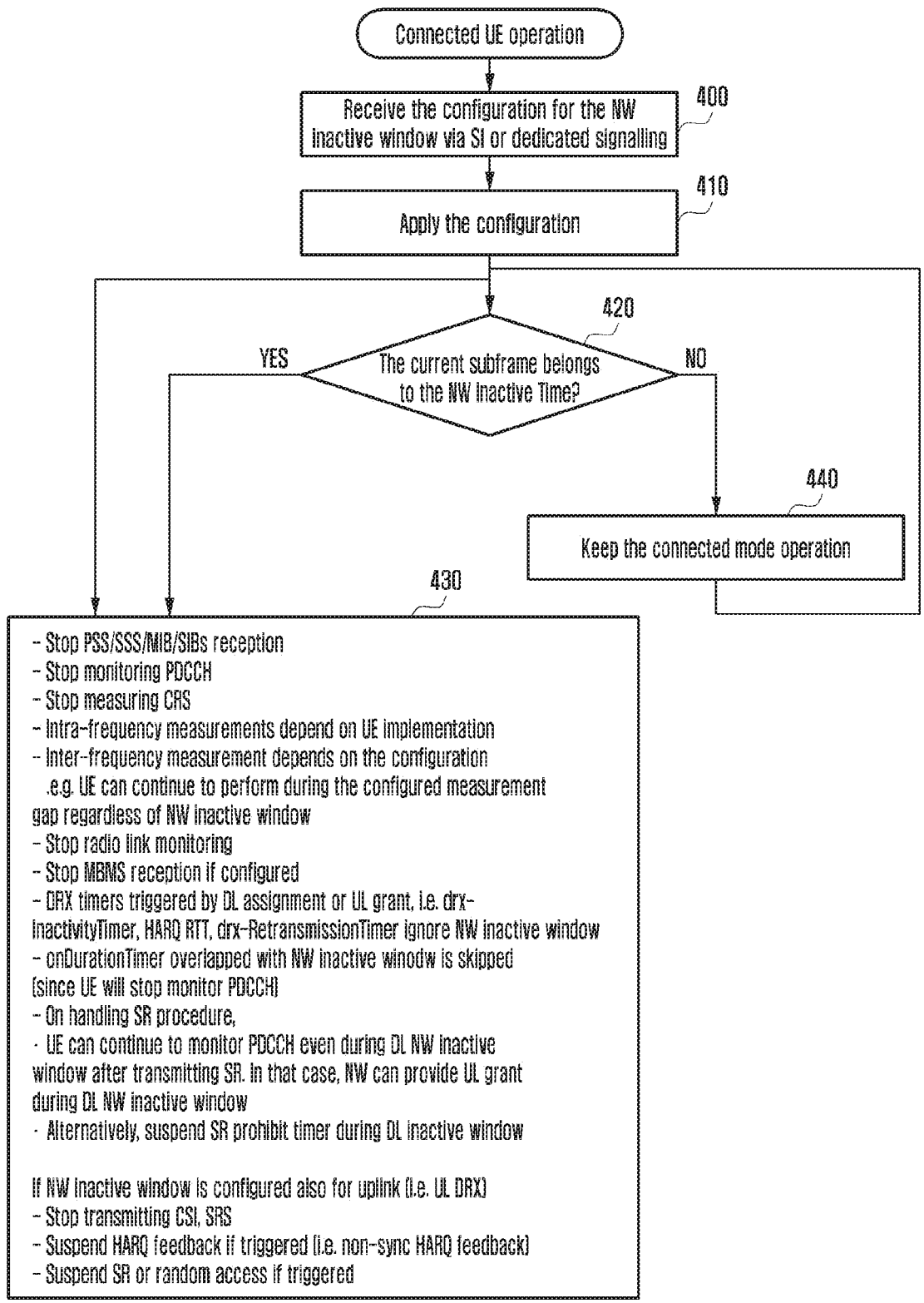
FIG. 4 is a flowchart illustrating an operation of a connected-mode UE in the present disclosure.

MDT-related timer: T330 (logging duration), 48-hour timer after T330 expiry FIG. 4 is a flowchart illustrating the operation of a connected-mode UE in the present disclosure.

In step 400, the UE receives configuration information for the network-active time window from the eNB. The UE may receive configuration information for the network-inactive time window instead of the network-active time window. Since the two windows indicate exclusive time domains, if configuration information for one window is provided, the other window is also indicated. The configuration information is provided using broadcasted system information or dedicated signaling such that the connected-mode UE can receive the configuration information. In step 410, the UE applies the received configuration information. In step 420, the UE determines whether the current subframe is in the network-inactive time window. When the current subframe is not in the network-inactive time window, the UE performs a typical connection mode operation in step 440. When the current subframe is in the network-inactive time window, the UE performs operations indicated below in step 430.

- UE stops receiving the PSS, the SSS, the MIB, and the SIB in the subframe. The BS may not transmit the PSS, the SSS, the MIB, and the SIB within the network-inactive time window. However, the signals and information may be transmitted in the window when emergency disaster information is transmitted through the ETWS and/or the CMAS. If the UE receives paging indicating the ETWS and/or the CMAS during the network-active time window, the UE immediately starts receiving alarm information of the ETWS and/or the CMAS, and the reception operation continues during the network-inactive time window until reception of the information is completed.
- The UE does not monitor a PDCCH of a serving cell in the subframe. The BS may not transmit control information through the PDCCH in the network-inactive time window except for specific exceptional cases. Accordingly, the UE may not identify a P-RNTI or a C-RNTI for paging reception.
- The UE stops measuring a CRS of the serving cell in the subframe.
- Measurement of the same frequency within the system in the subframe by the UE may differ depending on the UE implementation.
- The operation of the UE may consider the following options.
- Option 1: UE does not always measure the same frequency within the system in the subframe.
- Option 2: UE measures the same frequency within the system in the subframe.
- Option 3: UE measures the same frequency within the system only when a particular condition is satisfied in the subframe. This condition may be the case in which signal quality of a serving cell measured in a particular subframe or a subframe group within the network-active time window before the network-inactive time window is close to a threshold value of a particular measurement report event or the measurement report event (corresponding to at least one of events A1, A2, A3, A4, A5, and A6) is satisfied or the case in which a movement speed of the UE is higher than or equal to a particular value.
  - Measurement of different frequencies within the system or different communication systems by the UE in the subframe is different depending on UE implementation. The following options may be considered.
- Option 1: UE does not always measure different frequencies within the system or different communication systems in the subframe.
- Option 2: UE measures different frequencies within the system or different communication systems in the subframe.
- Option 3: UE measures different frequencies within the system or different communication systems only when a particular condition is satisfied in the subframe. The condition may be the case in which the signal quality of a serving cell measured in a particular subframe or a subframe group within the network-active time window before the network-inactive time window is close to a threshold value of a particular measurement report event or the measurement report event (corresponding to at least one of events A1, A2, A3, A4, A5, A6, B1, B2, C1, and C2) is satisfied or the case in which a movement speed of the UE is higher than or equal to a particular value.

In the case in which a measurement gap is set in the UE, if the gap and the network-inactive time window overlap each other, the UE measures different frequencies within the system or different communication systems regardless of the window.

- UE does not perform radio link monitoring (RLM) in the subframe. Since the serving cell does not transmit the CRS, if the UE still performs RLM, an incorrect determination may be made. In a more detailed UE operation, a physical layer (PHY) of the UE does not make an out-of-sync determination, or a higher layer may ignore an out-of-sync indicator provided from the PHY during the network-inactive time window.
- UE stops receiving the MBMS in the subframe.
- Upon receiving a DL assignment or UL grant through the PDCCH within the network-active time window, the UE executes a drx-InactivityTimer timer, an HARQ RTT timer, and a drx-RetransmissionTimer timer. When the drx-InactivityTimer timer and the drx-RetransmissionTimer timer operate, the UE should monitor the PDCCH. At this time, the driving time of the timers may overlap the network-inactive time window, and the UE monitors the PDCCH during the overlapping time window. Further, if control information on the PDCCH includes a C-RNTI of the UE, the UE receives data scheduled by the control information through a physical downlink shared channel (PDSCH) regardless of the network-inactive time window. The UE can perform a cell measurement operation and the eNB can transmit the CRS while the UE monitors the PDCCH.
- UE does not monitor the PDCCH if an onDuration time window overlaps the network-inactive time window in a DRX operation.
- UE monitors the PDCCH regardless of the network-inactive time window if a scheduling request (SR) is transmitted through a physical uplink control channel (PUCCH) or is pending. The eNB may provide the uplink grant through the PDCCH within the network-inactive time window in order to reduce a scheduling delay time. If the control information on the PDCCH includes the C-RNTI of the UE, the UE receives data scheduled by the control information through the PDSCH regardless of the network-inactive time window. An SR prohibit timer may be suspended during the network-inactive time window.

The present disclosure focuses on an inactive time in the downlink between the UE and the eNB. On the other hand, the inactive time may also be configured in the uplink. If the inactive time window is configured in the uplink, the configuration may be performed separately from the downlink. The UE stops transmitting channel state information (CSI) and a sounding reference signal (SRS) within the inactive time window in the uplink. If there is HARQ feedback triggered by the eNB, the HARQ feedback is suspended during the inactive time. If there is a triggered SR or a random access process, it is also suspended.

Figure 5:
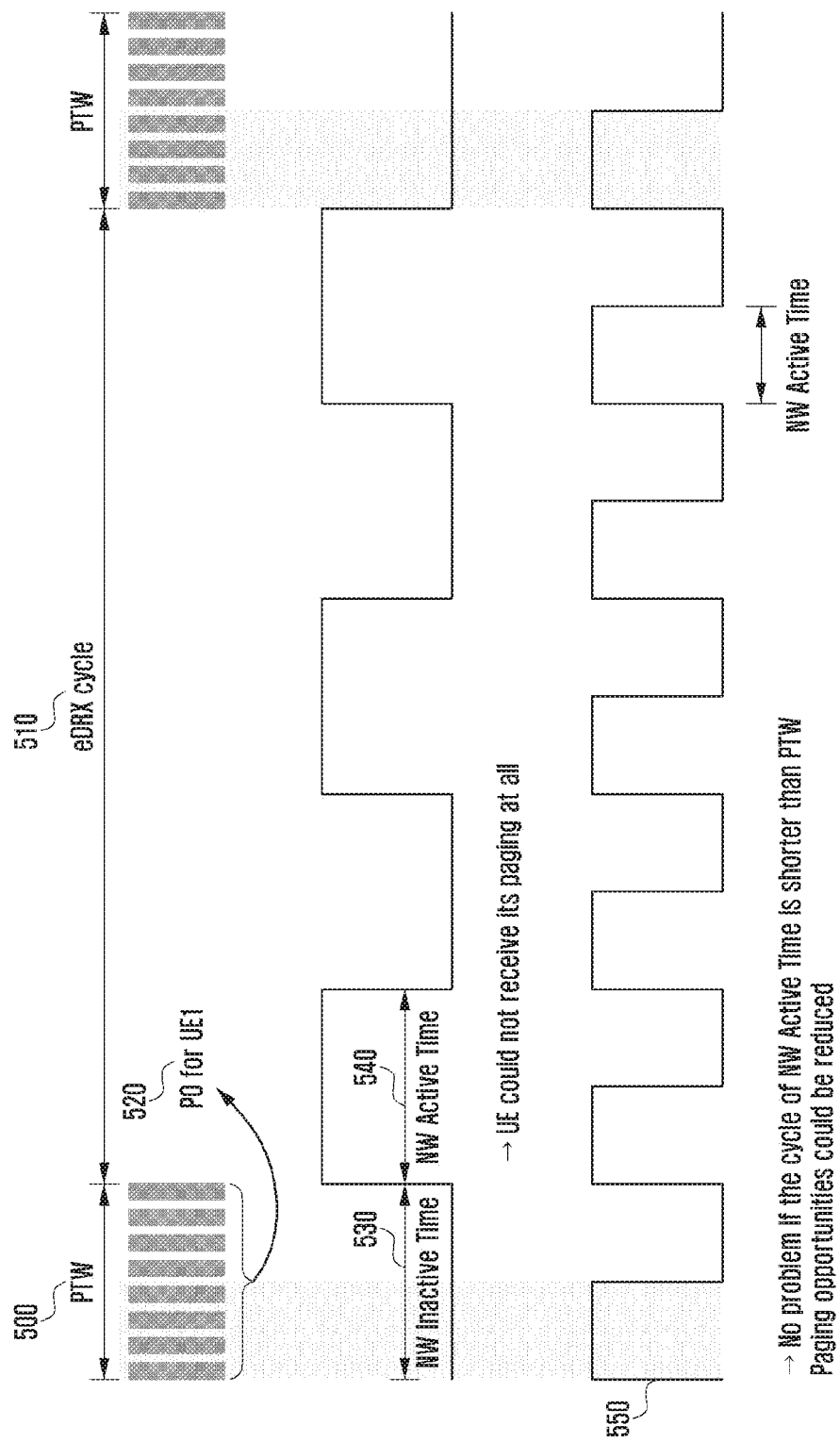
FIG. 5 illustrates a method of deriving a network active time according to the present disclosure.

FIG. 5 illustrates a method of deriving a network active time according to the present disclosure.

If extended discontinuous reception (eDRX) having a very long cycle is applied to the next-generation mobile communication system, the eDRX may be combined with the network-inactive time window and thus the UE may never receive paging. When eDRX is applied, a paging time window (PTW) 500 arrives at a very long cycle 510 and the UE receives paging 520 several times within the window. If the PTW overlaps a network-inactive time window 530 all of the time, the UE never receives paging. In the present disclosure, the cycle of the network-active time window is configured to be shorter than a length of the PTW in order to solve this problem. Since there is a plurality of UEs within the cell, the eNB or the network determines the cycle of the network-active time window on the basis of the UE having the shortest eDRX cycle among UEs configuring eDRX. Accordingly, at least a part 550 of the network-active time window overlaps the PTW and thus the UE can receive paging. Another method is to configure the cycle and the length of the network-active time window such that all UEs configuring eDRX can receive paging. To this end, configuration information for eDRX is needed. Accordingly, in consideration of the configuration information for the network-active time window (or the network-inactive time window) and the configuration information of eDRX, it may be determined that the PTW of eDRX and the part of the network-active time window overlap each other.

Figure 6:
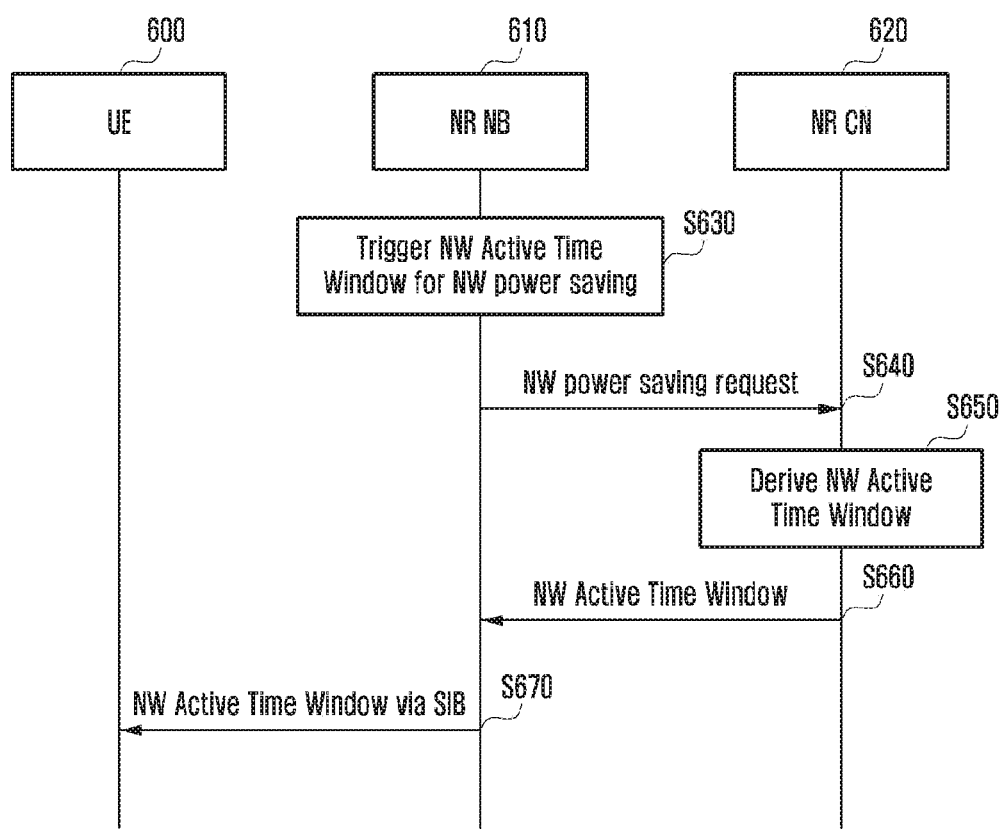
FIG. 6 illustrates a first embodiment for deriving the network (in)active time in the present disclosure.

FIG. 6 illustrates a first embodiment for deriving the network (in)active time in the present disclosure.

Referring to FIG. 6, an eNB 610 determines to configure the network-active time window (or the network-inactive time window) in order to save network power in S630. The eNB transmits a network (NW) power-saving request message to an NR CN 620 in S640. The message is used by the eNB both for indicating the configuration of the network-active time window and making a request for the window value to the NR CN at the same time. The NR CN is aware of the PTW length value applied to the UE and thus determines appropriate cycle and length values of the network-active time window in consideration of the eDRX configuration value in S650. The NR CN transfers configuration information of the derived window to the eNB in S660. The eNB transmits the configuration information of the network-active time window to a UE 610 through system information or dedicated signaling in S670.

Figure 7:
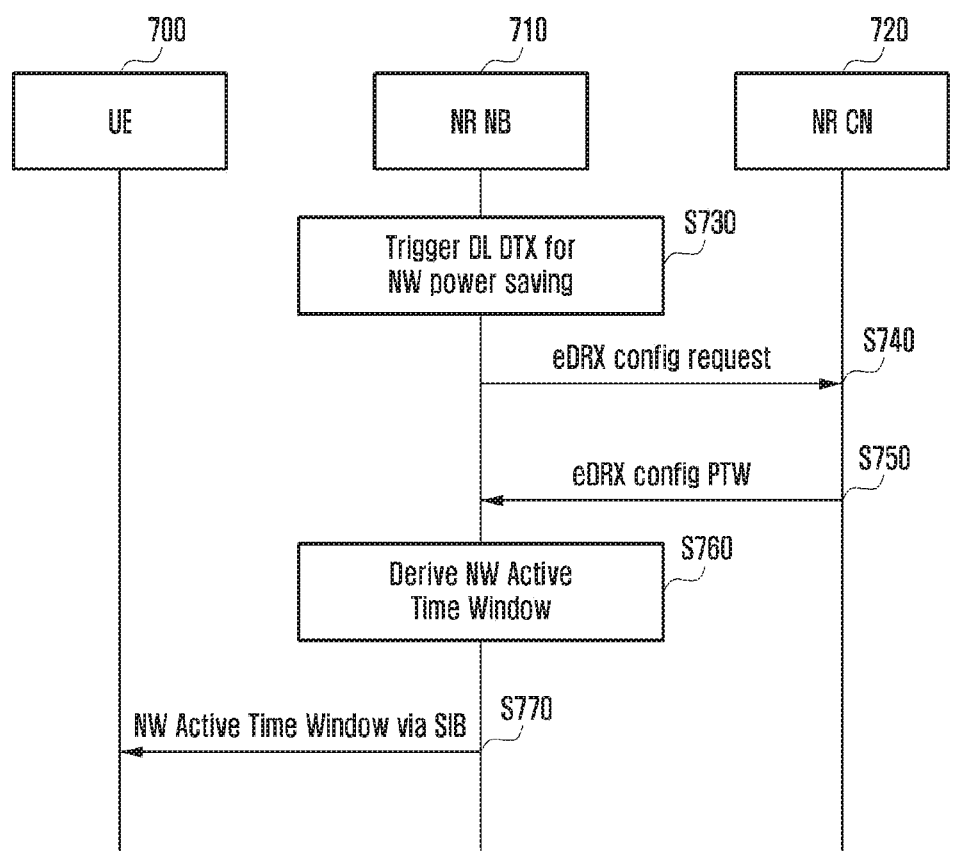
FIG. 7 illustrates a second embodiment for deriving the network (in)active time in the present disclosure.

FIG. 7 illustrates a second embodiment for deriving the network-(in)active time in the present disclosure.

Referring to FIG. 7, an eNB 710 determines to configure the network-active time window (or the network-inactive time window) in order to save power of the network in S730. The eNB transmits an eDRX configuration (config) request message to the NR CN 720 in S740. The message is used by the eNB for indicating the configuration of the network-active time window and a request for eDRX configuration information of the UE within the cell to the NR CN at the same time. More specifically, the configuration information requested by the eNB may be the shortest length of the PTW that is applied to the UE within the cell. Since the NR CN is aware of the eDRX configuration value (that is, the shortest length of the PTW) applied to the UE, the NR CN transmits the eDRX configuration value to the eNB in S750 and determines appropriate cycle and length values of the network-active time window on the basis of the information in S760. The eNB provides the configuration information of the network-active time window to the UE 700 through system information or dedicated signaling in 1f-40.

Figure 8:
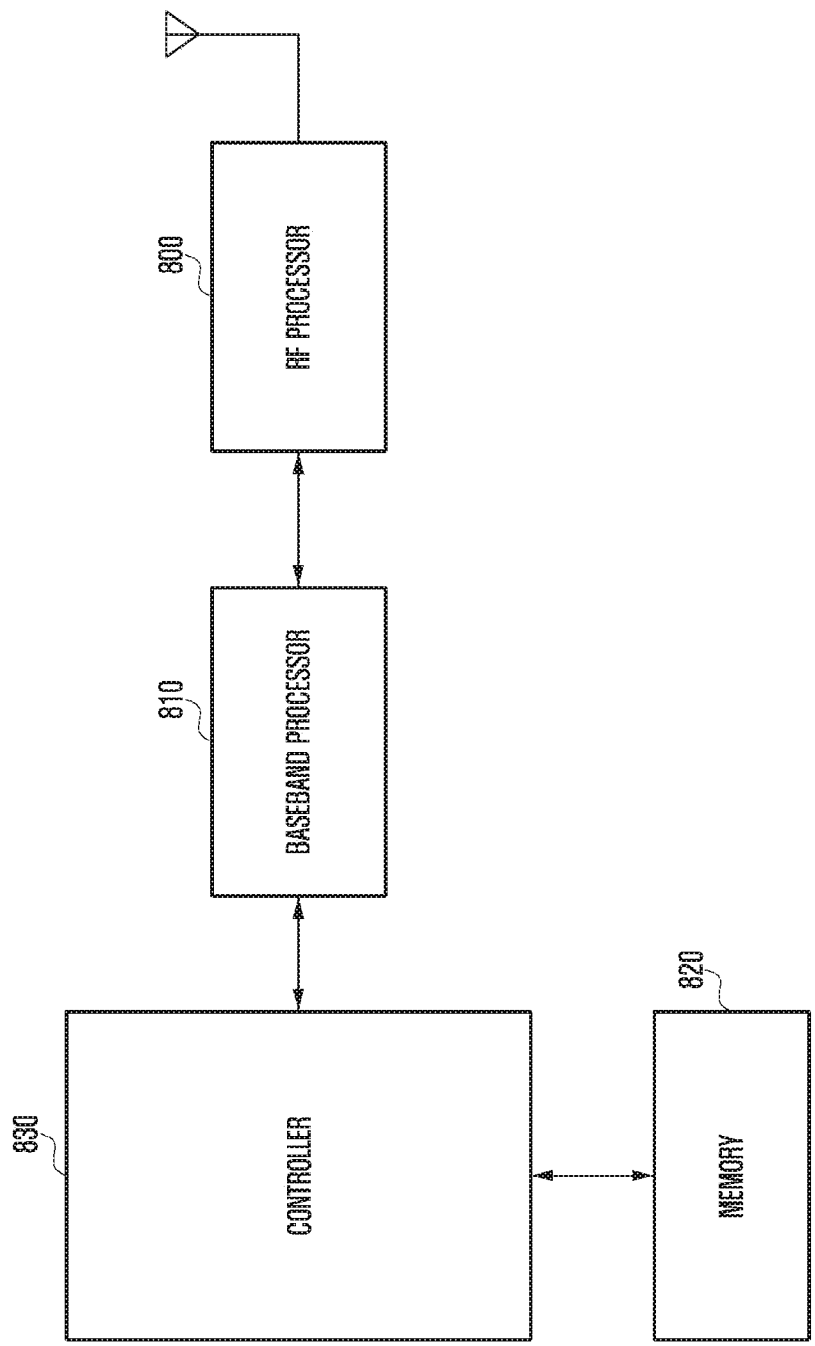
FIG. 8 is a block diagram illustrating the structure of the UE.

FIG. 8 is a block diagram illustrating the structure of the UE.

Referring to FIG. 8, the UE includes a radio-frequency (RF) processor 800, a baseband-processor 810, a memory 820, and a controller 830.

The RF processor 800 performs a function for transmitting and receiving a signal through a wireless channel, such as band conversion and amplification of a signal. That is, the RF processor 800 up-converts a baseband signal provided from the baseband processor 810 into an RF band signal, transmits the RF band signal through an antenna, and then down-converts the RF band signal received through the antenna into a baseband signal. For example, the RF processor 800 may include a transmission filter, a reception filter, an amplifier, a mixer, an oscillator, a digital-to-analog convertor (DAC), an analog-to-digital convertor (ADC), and the like. Although only one antenna is illustrated in FIG. 8, the UE may include a plurality of antennas. In addition, the RF processor 800 may include a plurality of RF chains. Moreover, the RF processor 800 may perform beamforming. For the beamforming, the RF processor 800 may control the phase and the size of each signal transmitted/received through a plurality of antennas or antenna elements. Further, the RF processor may perform MIMO and may receive a plurality of layers during a MIMO operation.

The baseband processor 810 performs a function for a conversion between a baseband signal and a bitstream according to a physical layer standard of the system. For example, in data transmission, the baseband processor 810 encodes and modulates a transmission bitstream to generate complex symbols. In addition, in data reception, the baseband processor 810 reconstructs a reception bitstream through demodulation and decoding of the baseband signal provided from the RF processor 800. For example, in an orthogonal frequency division multiplexing (OFDM) scheme, in data transmission, the baseband processor 810 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, in data reception, the baseband processor 810 divides the baseband signal provided from the RF processor 800 in units of OFDM symbols, reconstructs the signals mapped to the subcarriers through a fast Fourier transform (FFT) operation, and then reconstructs the reception bitstream through demodulation and decoding.

The baseband processor 810 and the RF processor 800 transmit and receive signals as described above. Accordingly, the baseband processor 810 and the RF processor 800 may be referred to as a transmitter, a receiver, a transceiver, or a communicator. Further, at least one of the baseband processor 810 and the RF processor 800 may include a plurality of communication modules to support a plurality of different radio access technologies. In addition, at least one of the baseband processor 810 and the RF processor 800 may include different communication modules to process signals of different frequency bands. For example, different radio access technologies may include a wireless RAN (for example, IEEE 802.11) and a cellular network (for example, LTE). Further, the different frequency bands may include a super-high-frequency (SHF) (for example, 2.5 GHz and 5 GHz) band and a millimeter (mm)-wave (for example, 60 GHz) band.

The memory 820 stores data such as a basic program, an application program, and configuration information for the operation of the UE. In addition, the memory 820 provides data stored therein in response to a request from the controller 830.

The controller 830 controls the overall operation of the UE. For example, the controller 830 transmits and receives a signal through the baseband processor 810 and the RF processor 800. In addition, the controller 830 may record data in the memory 820 and read the data. To this end, the controller 830 may include at least one processor. For example, the controller 830 may include a communication processor (CP), for performing control for communication, and an application processor (AP), for controlling a higher layer such as an application program.

Figure 9:
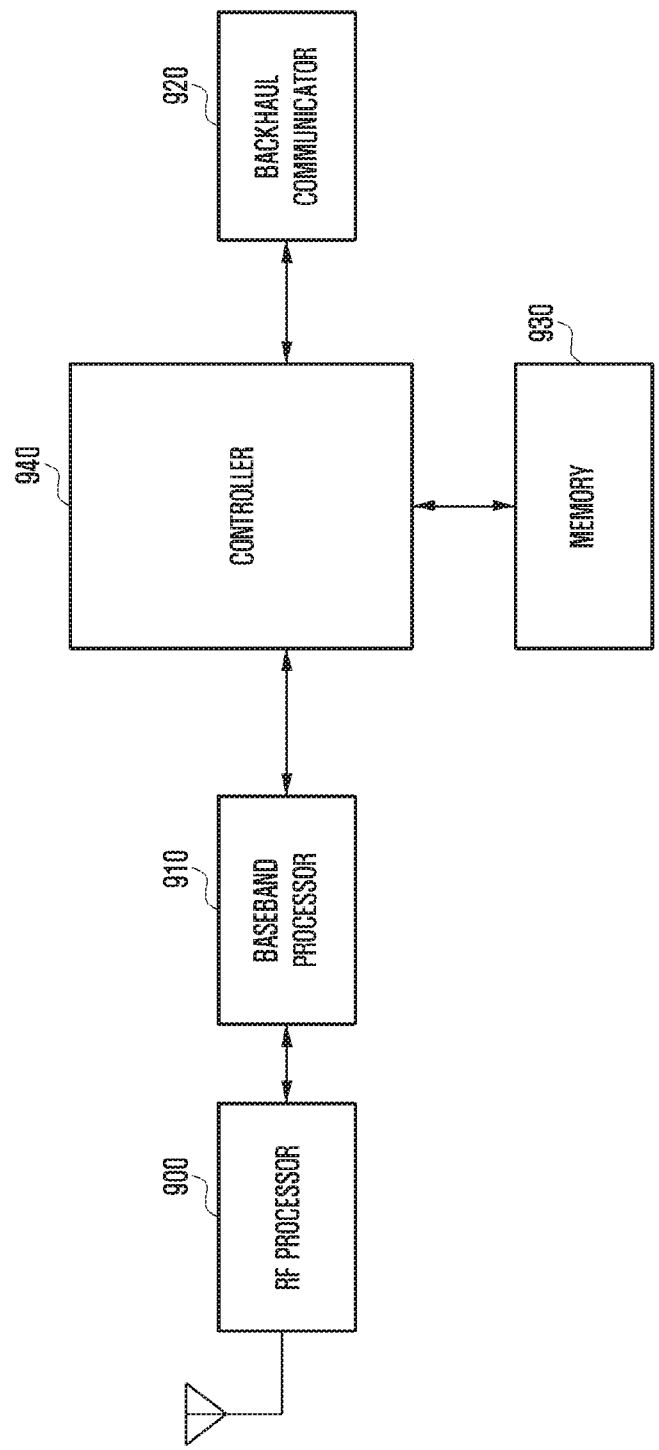
FIG. 9 is a block diagram illustrating the configuration of the eNB in a wireless communication system according to an embodiment of the present disclosure.

FIG. 9 is a block diagram illustrating the configuration of the eNB in a wireless communication system according to an embodiment of the present disclosure.

As illustrated in FIG. 9, the eNB includes an RF processor 900, a baseband processor 910, a backhaul communicator 920, a memory 930, and a controller 940.

The RF processor 900 performs a function for transmitting and receiving a signal through a wireless channel, such as band conversion and amplification of a signal. That is, the RF processor 900 up-converts a baseband signal provided from the baseband processor 910 into an RF band signal, transmits the RF band signal through an antenna, and then down-converts the RF band signal received through the antenna into a baseband signal. For example, the RF processor 900 may include a transmission filter, a reception filter, an amplifier, a mixer, an oscillator, a DAC, and an ADC. Although only one antenna is illustrated in FIG. 9, the eNB may include a plurality of antennas. In addition, the RF processor 900 may include a plurality of RF chains. Moreover, the RF processor 900 may perform beamforming. For the beamforming, the RF processor 900 may control the phase and the size of each of the signals transmitted and received through a plurality of antennas or antenna elements. The RF processor may perform a downlink MIMO operation by transmitting one or more layers.

The baseband processor 910 performs a function of performing conversion between a baseband signal and a bitstream according to the physical layer standard of the radio access technology. For example, in data transmission, the baseband processor 910 encodes and modulates a transmission bitstream to generate complex symbols. In addition, in data reception, the baseband processor 910 reconstructs a reception bitstream through demodulation and decoding of the baseband signal provided from the RF processor 900. For example, in an OFDM scheme, when data is transmitted, the baseband processor 910 generates complex symbols by encoding and modulating a transmission bitstream, maps the complex symbols to subcarriers, and then configures OFDM symbols through an IFFT operation and CP insertion. Further, when data is received, the baseband processor 910 splits the baseband signal provided from the RF processor 900 in units of OFDM symbols, reconstructs the signals mapped to the subcarriers through a fast Fourier transform (FFT) operation, and then reconstructs the reception bitstream through demodulation and decoding. The baseband processor 910 and the RF processor 900 transmit and receive signals as described above. Accordingly, the baseband processor 910 and the RF processor 900 may be referred to as a transmitter, a receiver, a transceiver, a communicator, or a wireless communicator.

The backhaul communicator 920 provides an interface for communicating with other nodes within the network. That is, the backhaul communicator 920 converts a bitstream transmitted from the eNB to another node, for example, a secondary eNB or a core network, into a physical signal and converts a physical signal received from the other node into a bitstream.

The memory 930 stores data such as a basic program, an application program, and configuration information for the operation of the eNB. In addition, the memory 930 provides data stored therein in response to a request from the controller 940.

The controller 940 controls the overall operation of the eNB. For example, the controller 940 transmits and receives a signal through the baseband processor 910 and the RF processor 900 or through the backhaul communicator 920. In addition, the controller 940 may record data in the memory 930 and read the data. To this end, the controller 940 may include at least one processor.

Second Embodiment

Figure 10:
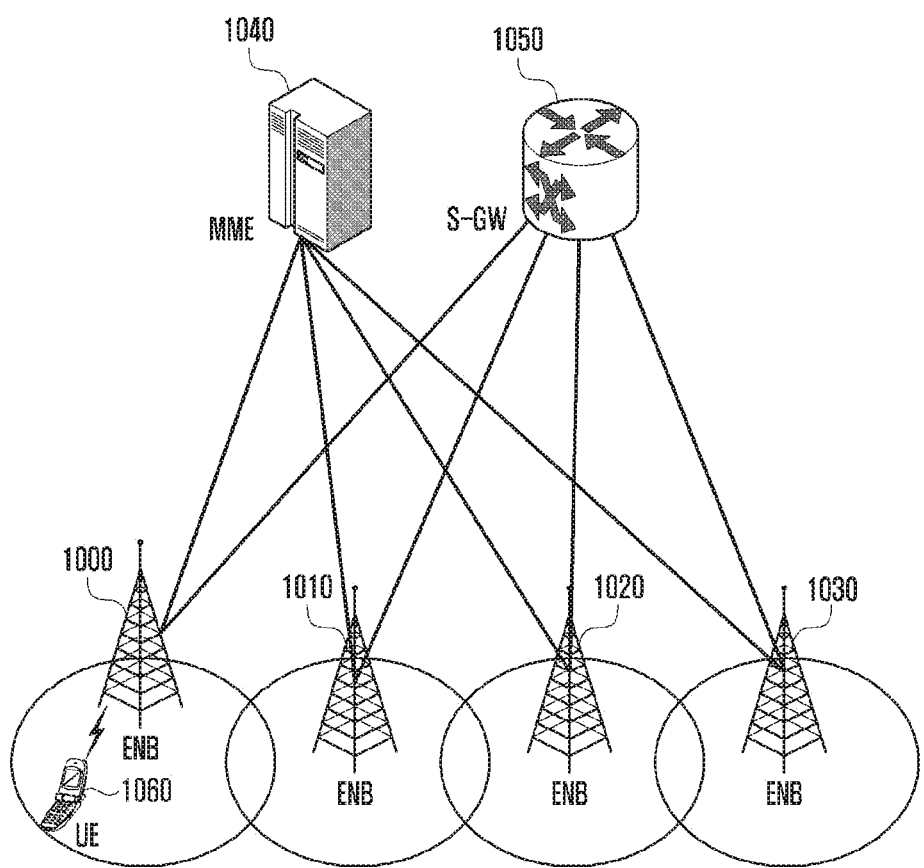
FIG. 10 illustrates the structure of the conventional LTE system.

FIG. 10 illustrates the structure of a conventional LTE system.

Referring to FIG. 10, a radio access network of the LTE system includes next-generation evolved Node Bs (hereinafter, referred to as ENBs, Node Bs, or base stations) 1000, 1010, 1020 and 1030, a mobility management entity (MME) 1040, and a serving-gateway (S-GW) 1050. A User Equipment (hereinafter, referred to as a UE or a terminal) 1060 accesses an external network through the ENBs 1000, 1010, 1020, and 1030 and the S-GW 1050.

In FIG. 10, the ENBs 1000, 1010, 1020, and 1030 correspond to the conventional node Bs of the UMTS system. The ENB is connected to the UE 1060 through a wireless channel, and performs a more complicated role than the conventional node B. In the LTE system, since all user traffic including a real-time service such as a voice over IP (VoIP) through an Internet protocol are serviced through a shared channel, a device for collecting and scheduling status information of buffer statuses, available transmission power statuses, and channel statuses of UEs is required, and the ENBs 1000, 1010, 1020, and 1030 serve as this device. One ENB generally controls a plurality of cells. For example, in order to implement a transmission rate of 100 Mbps, the LTE system uses orthogonal frequency division multiplexing (OFDM) as the radio access technology in a bandwidth of 20 MHz. Further, a modulation scheme and an adaptive modulation and coding (hereinafter, referred to as an AMC) scheme of determining a channel coding rate are applied to the LTE system in accordance with the channel status of the UE.

The S-GW 1050 is a device for providing a data bearer, and generates or removes the data bearer under the control of the MME 1040. The MME is a device for performing not only a function of managing mobility of the UE but also various control functions and is connected to a plurality of eNBs.

Figure 11:
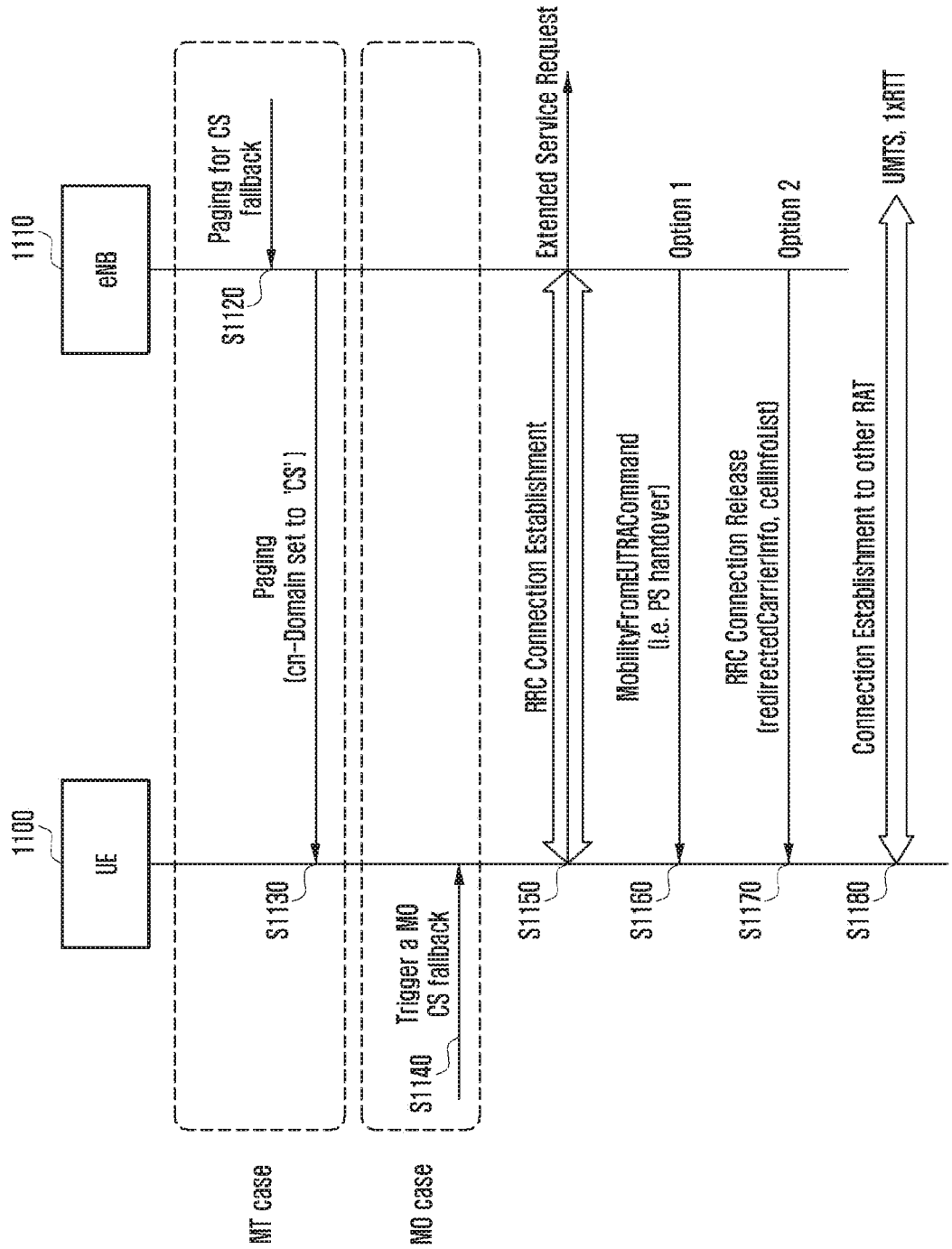
FIG. 11 illustrates a circuit-switched (CS) fallback operation process in the conventional LTE system.

FIG. 11 illustrates a circuit-switched (CS) fallback operation process in the conventional LTE system. In the conventional LTE system, the CS fallback is a function of switching a CS service to a radio access technology (RAT) other than LTE and providing a service. A representative CS service is a circuit-switched-based voice service.

The CS fallback may be triggered by the UE or the network. The MME transfers paging requiring the CS fallback to an eNB 1110 in S1120. In the case of a mobile-terminating (MT) call (that is, in the case in which paging is transferred to a UE 1100), the eNB configures a cn-Domain information element (IT) as "CS" to indicate execution of the CS fallback in a paging message. On the other hand, in the case of a mobile-originating (MO) call (that is, in the case in which the UE makes a request for a connection), the UE indicates the MO call for the CS fallback to the network in S1140. To this end, in an RRC connection establishment process, the UE transmits an extended service request message to the MME in S1150. The NAS message includes UE information required for the CS fallback. The message is transmitted to the RAT to serve the UE through the CS fallback.

Thereafter, the CS fallback is performed through two methods. The connection moves to another RAT through inter-RAT handover in the first method in S1160 (option 1), and the connection is terminated in LTE and then the connection to another RAT is established in the second method in S1170 (option 2). In the case of the first method, the CS fallback is triggered as the eNB transmits a MobilityFromEUTRACommand message to the UE. In the case of the second method, the CS fallback is triggered as the eNB transmits an RRC connection release message, including information on the RAT to which the connection is attempted, to the UE. The release message includes frequency information (redirectedCarrierInfo) and cell ID information (cellInfoList) of the other RAT. The UE attempts to establish the connection to the RAT indicated by the information after the connection to LTE is terminated in S1180.

Figure 12:
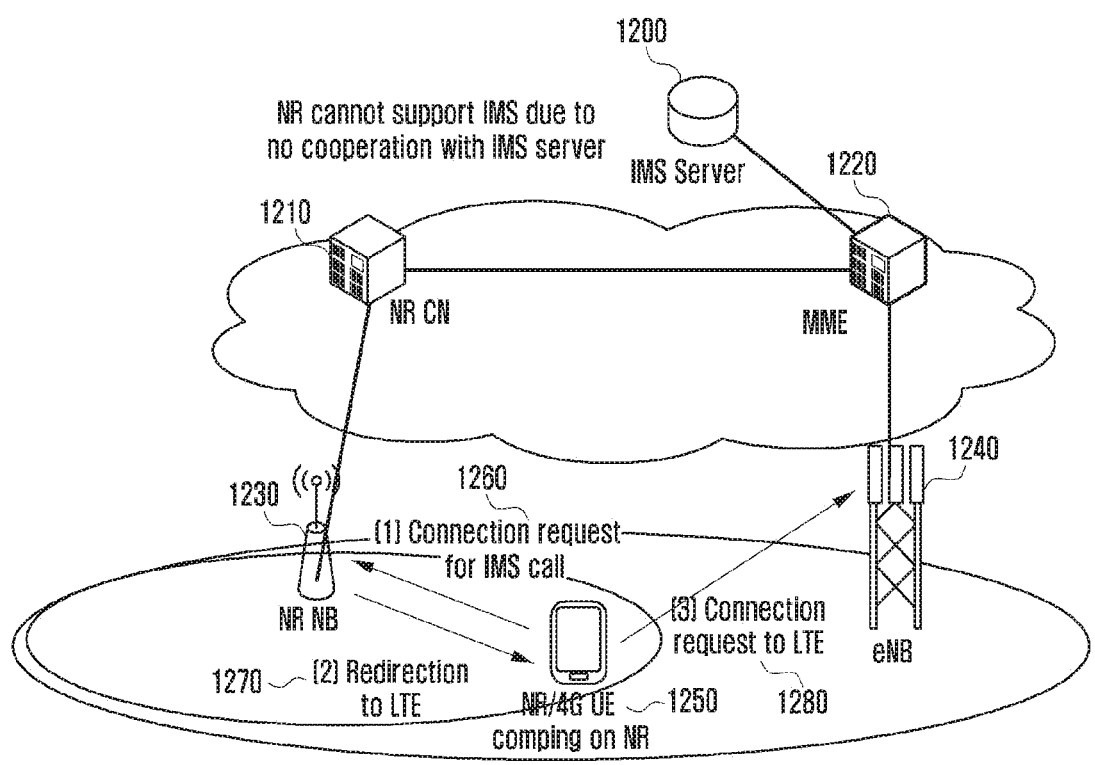
FIG. 12 illustrates a scenario in which fallback is performed according to a service in the present disclosure.

FIG. 12 illustrates a scenario in which fallback is performed for a service in the present disclosure.

The next-generation mobile communication system includes an NR NB 1230 and an NR CR 1210. The NR NB corresponds to an evolved Node B (eNB) of the conventional LTE system and is connected to an NR UE 1250 through a radio channel, and may provide better service than the conventional node B. Since all user traffic is serviced through a shared channel in the next-generation mobile communication system, a device for collecting and scheduling status information of buffer statuses, available transmission power statuses, and channel statuses of UEs is required, which corresponds to the NR NB 1230. One NR NB generally controls a plurality of cells. The NR NB may have a bandwidth wider than the conventional maximum bandwidth in order to implement super-high-speed data transmission compared to conventional LTE and may apply orthogonal frequency division multiplexing (OFDM) through radio access technology, and thus beamforming technology may be additionally added thereto. Further, a modulation scheme and an adaptive modulation and coding (hereinafter, referred to as an AMC) scheme of determining a channel coding rate are applied to the LTE system in accordance with a channel status of the UE.

The NR CN 1210 performs a function of supporting mobility, configuring a bearer, and configuring QoS. The NR CN is a device which performs not only a function of managing mobility of the UE but also various control functions and is connected to a plurality of eNBs. Further, the next-generation mobile communication system may be linked to the conventional LTE system, and the NR CN is connected to an MME 1220 through a network interface. The MME is connected to an eNB 1240, which is a conventional eNB.

In initial deployment of the next-generation mobile communication system, support for a particular service using the next-generation mobile communication system may be excluded in order to reduce complexity, and it is expected that the next-generation mobile communication system will be intensively installed in some hotspots to which data traffic is concentrated rather than being rolled out as a nationwide network. For example, in order to support an IP multimedia subsystem (IMS) call, which is a packet-switched (PS) voice service, a link with an IMS server 1200 is necessary. However, in initial deployment of the next-generation mobile communication system, the link to the external server may be restricted, in which case services related thereto cannot be supported. Further, a particular service may be sensitive to an interrupt time due to an inter-RAT handover, and it may be preferable that a nationwide network be connected to the LTE network to be served from the beginning rather than service being performed in the next-generation mobile communication network and then switched to LTE through an inter-RAT handover for such type service.

Accordingly, when the UE makes a request for a connection for a particular service (for example, an IMS call) to the NR NB, as indicated by reference numeral 1260, the NR NB indicates fallback to LTE, as indicated by reference numeral 1270. The UE makes a request for the connection to LTE according to the indication as indicated by reference numeral 1280. In addition to LTE, other systems such as GSN and 1×RTT may be considered as targets for fallback.

In the present disclosure, fallback for a particular service is performed through a system other than the next-generation mobile communication system.

Figure 13:
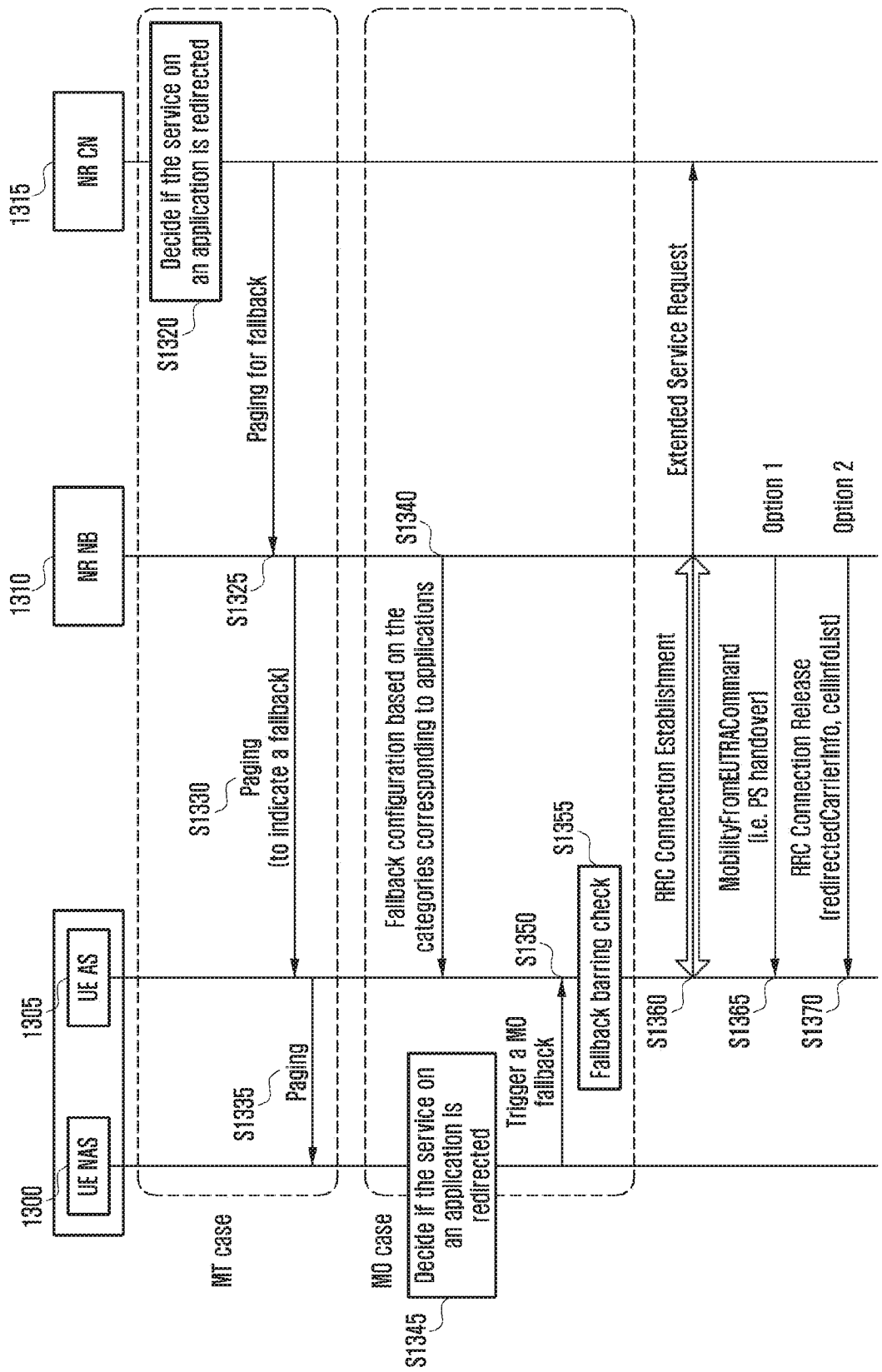
FIG. 13 illustrates an embodiment in which fallback is performed according to a service in the present disclosure.

FIG. 13 illustrates an embodiment in which fallback is performed according to a service in the present disclosure.

A process of performing fallback in the next-generation mobile communication system may be divided into MT and MO. In the case of MT, an NR CN 1315 determines whether provision of a particular service from another RAT is more suitable in S1320. The NR CN transfers paging requiring fallback to an eNB (NR NB) 1310 in S1325. The eNB transmits paging indicating fallback to the UE in S1330. Entities within the UE are divided into an access stratum (AS) 1300 and a non-access stratum (NAS) 1305 according to their roles. The AS performs a function related to access (or connection) and the NAS performs other functions. The AS receiving paging transfers the paging to the NAS in S1335. The NAS performs the indicated fallback operation.

In the case of MO, the AS receives fallback access-barring-related configuration information from the eNB in S1340. The access-barring-related configuration information is generally provided using system information and is used for mitigating a congestion situation by restricting access when network congestion situation occurs. The UE may determine whether the UE is able to perform access on the basis of the access-barring-related configuration information. In general, whether to perform access is determined through a probabilistic procedure. The fallback access-barring-related configuration information is to provide fallback for a service and may be provided for each service. In the case of fallback, the service is provided by another RAT, so that access-barring-related configuration information may be provided separately from the normal service.

The NAS determines whether provision of a particular service by another RAT is more appropriate in S1345. The NAS transfers a service request for a service requiring fallback to the AS in S1350. The AS determines whether access can be performed using the fallback access-barring-related configuration information corresponding to the relevant service in S1355. If the fallback access-barring-related configuration information corresponding to the relevant service is not provided, the AS determines whether access can be performed by applying normal access-barring-related configuration information. After step S1355 in the case of MT or if access is accepted in the case of MO, the AS transfers an extended service request message to the NR CN through an RRC connection establishment process in S1360.

Thereafter, fallback is performed through two methods. The connection moves to another RAT through inter-RAT handover in the first method in S1365 (option 1), and the connection is terminated in the current system and then the connection to another RAT is established in the second method in S1370 (option 2). In the case of the first method, the fallback is triggered as the eNB transmits a MobilityFromEUTRACommand message to the UE. In the case of the second method, the fallback is triggered as the eNB transmits an RRC connection release message including information on the RAT, to which the connection is attempted, to the UE. The release message includes frequency information (redirectedCarrierInfo) and cell ID information (cellInfoList) of the other RAT.

Such methods include a step in which the UE accesses the next-generation mobile communication system and then moves to another RAT. Accordingly, even though the UE does not receive service from the next-generation mobile communication system, the UE is required to perform a lot of signaling with the next-generation mobile communication system in order to access the corresponding system. Therefore, the present disclosure proposes a fallback method for each of the MO and MT services in order to reduce signaling overhead.

Figure 14A:
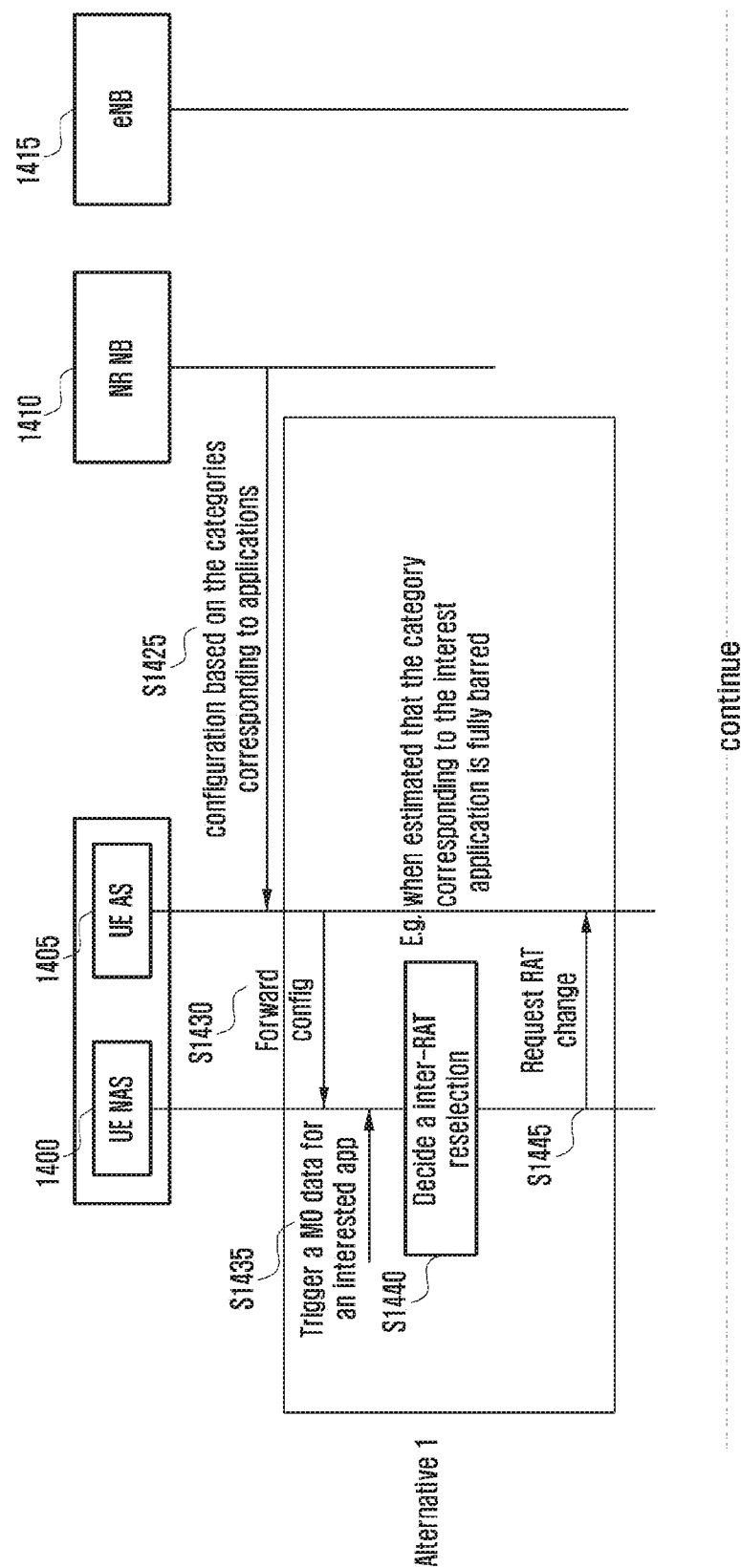

FIGS. 14A and 14B illustrate an embodiment in which fallback is performed according to an MO service in the present disclosure.

In the present disclosure, a UE NAS determines whether to attempt access to the next-generation mobile communication system or another RAT according to the type of service (or application) and access configuration information (which may be configuration information related to access restriction) corresponding thereto. If the eNB desires to perform fallback for a particular service, the eNB configures 100% access prohibition or high access prohibition likelihood for the particular service in configuration information for the particular service or in fallback-dedicated access-barring-related configuration information.

In another method, a new indicator indicating execution of fallback for a particular service may be included and transmitted. The indicator has a bitmap form and each bit corresponds to one access-barring category or a particular service. The particular service (or application) receives one category. Mapping information between the service and the category is transmitted to the UE in advance at a NAS or application level.

An eNB 1410 transmits the access configuration information to the UE in S1425. Alternatively, the eNB may transmit separate configuration information for fallback for a service. The present disclosure proposes two methods to provide configuration information. In the first method (Alternative 1), the configuration information provided from the eNB is provided to the NAS. When a particular service is triggered in S1435, the NAS 1400 determines whether access to the next-generation mobile communication system is possible using configuration information corresponding to the service. If the access is not accepted or the success probability of the access is not high, the NAS determines fallback to another RAT in S1440. The NAS makes a request for a RAT change to the AS 1405 in S1445.

The second method (Alternative 2) is as follows. When transferring a service request triggered (in S1450) by the particular service (or application) to the AS, the NAS inserts category information corresponding to a relevant application in S1455. All of the existing services or applications receive at least one category value. The UE AS determines whether the access is approved on the basis of the configuration information and the category value in S1460. If it is determined that the access is not approved (that is, if the access is not accepted or the success probability of the access is not high), the AS transmits a report including a detailed failure cause to the NAS in S1465. The failure cause may correspond to information on whether access of the relevant service is 100% restricted and may be used for determining whether the NAS requires a RAT change. The NAS determines to perform fallback to another RAT in S1470 and makes a request for a change to another RAT to the AS in S1475.

If it is determined to perform fallback to another RAT through the first method or the second method, the AS searches for a new suitable LTE cell to be accessed in S1480. When the suitable cell is found, the AS informs the NAS of the cell and indicates that the AS is ready to perform access in S1483. The NAS transfers a service request for the service of interest to the AS in S1485, and the AS performs both an RRC connection establishment process and a NAS attach process in S1490. When the connection establishment is completed, the UE performs required data transmission and reception with the eNB in S1495. When the required data transmission and reception are completed, the UE ends the connection through an RRC connection release process in S1497. The UE may camp on the next-generation mobile communication system again as necessary in S1499.

Through the process, the UE may receive a desired service from another RAT without any process for accessing the next-generation mobile communication system eNB according to a service.

FIG. 15 illustrates an embodiment of performing fallback according to an MT service in the present disclosure.

In the present disclosure, if fallback is required for the MT service, configuration information required for fallback is inserted into a paging message and an attempt to direct access to a RAT for fallback is made without any process for accessing the next-generation mobile communication system.

An NR CN 1515 determines if providing service from another RAT is more appropriate for a particular service in S1525. The NR CN transfers paging requiring fallback to an eNB (NR NB) 1510. The eNB transmits paging indicating fallback to the UE in S1535. The paging message may include configuration information required for fallback as well as indication of execution of the fallback. The configuration information required for the fallback includes at least one of the following pieces of information.

Types of RATs to which the connection moves since fallback is triggered may include, for example, LTE, UMTS, GSM, or 1×RTT.

Serving frequency of downlink or uplink of the RAT

Frequency bandwidth of the RAT

Cell identifier of the RAT (for example, a physical cell ID (PCI) or a cell global identity (CGI)), the PCI being a cell identifier reused for each predetermined service area section and the CGI being a unique cell identifier within at least one service provider. In general, the CGI is longer than the PCI.

System information required for connection to the RAT, that is, transmission power in the RAT for fallback and random access configuration information in the RAT for fallback. GPS time in the case of 1×RTT.

The AS 1505 of the UE receiving the paging transfers the paging to the NAS 1500 in S1540. The NAS performs the indicated fallback operation. That is, it is recognized to perform access for paging to another system rather than the system receiving paging. The AS performs an operation for selecting a cell to the indicated RAT (LTE 1545 in the case of FIG. 15) for fallback in S1560. When cell selection is completed, the AS informs the NAS of the completion in S1563. The NAS performs an RRC connection establishment process and transmits a service request message to the MME in S1565.

The UE may not be successfully connected to the indicated RAT. When fallback failure is finally determined, the UE transmits a paging response message to the NR NB. The message includes information indicating that the paging response message is transmitted to the NR network due to fallback failure. The NR CN informs the MME 1550 that there is a UE for which to perform fallback and instructs the MME to wait for a service request message, and at this time also transmits information required for properly providing the service to the MME in LTE in S1555. The MME operates a particular timer in S1570, and if the indicated UE does not transmit a service request even though the timer expires, deletes relevant configuration information and finally processes fallback failure in S1575. Further, the MME reports the fallback failure to the NR CN.

Figure 16:
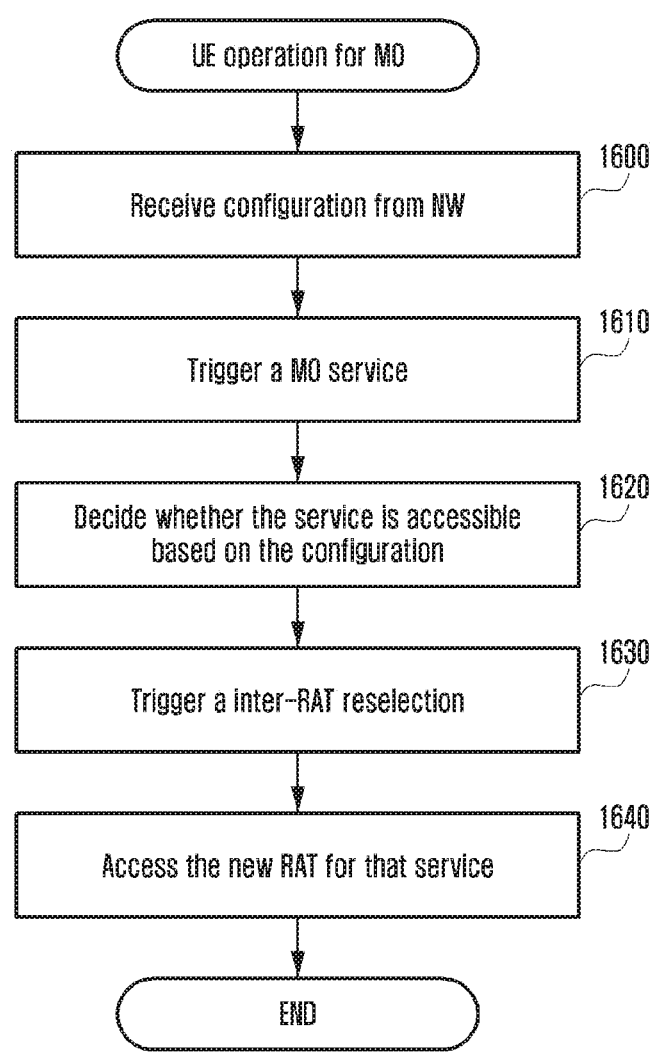
FIG. 16 illustrates a process in which the UE performs fallback for an MO service in the present disclosure.

FIG. 16 illustrates a process in which the UE performs fallback for an MO service in the present disclosure.

In step 1600, the UE receives access configuration information (the configuration information may be access-barring-related configuration information) and configuration information indicating fallback for a particular service from the eNB. In step 1610, the UE triggers an MO service. In step 1620, the UE determines whether the triggered MO service is a service accessible to the eNB or is one for which fallback is required on the basis of the access configuration information and the configuration information indicating fallback for the particular service. If it is determined that access to the eNB is not possible or that fallback is required, the UE triggers a process of selecting another RAT in step 1630. In step 1640, the UE attempts access to a newly found RAT to receive the service.

Figure 17:
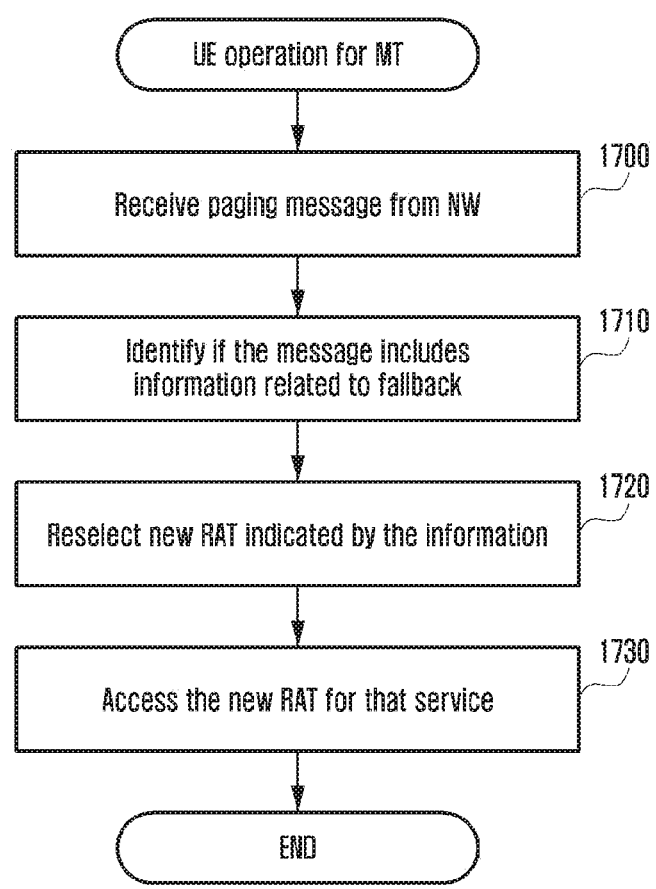
FIG. 17 illustrates a process in which the UE performs fallback for an MT service in the present disclosure.

FIG. 17 illustrates a process in which the UE performs fallback according to an MT service in the present disclosure.

The UE receives a paging message from the eNB in step 1700 and determines whether fallback configuration information is included in the paging message in step 1710. If the paging message includes the fallback configuration information, the UE performs fallback to the RAT indicated by the provided fallback configuration information in step 1720. Specifically, the UE reselects the RAT indicated by the information in step 1720. In step 1730, the UE attempts access to the newly found RAT to receive the service. If fallback fails, the UE transmits a paging response message to the NR NB. The response message may indicate fallback failure.

Figure 18:
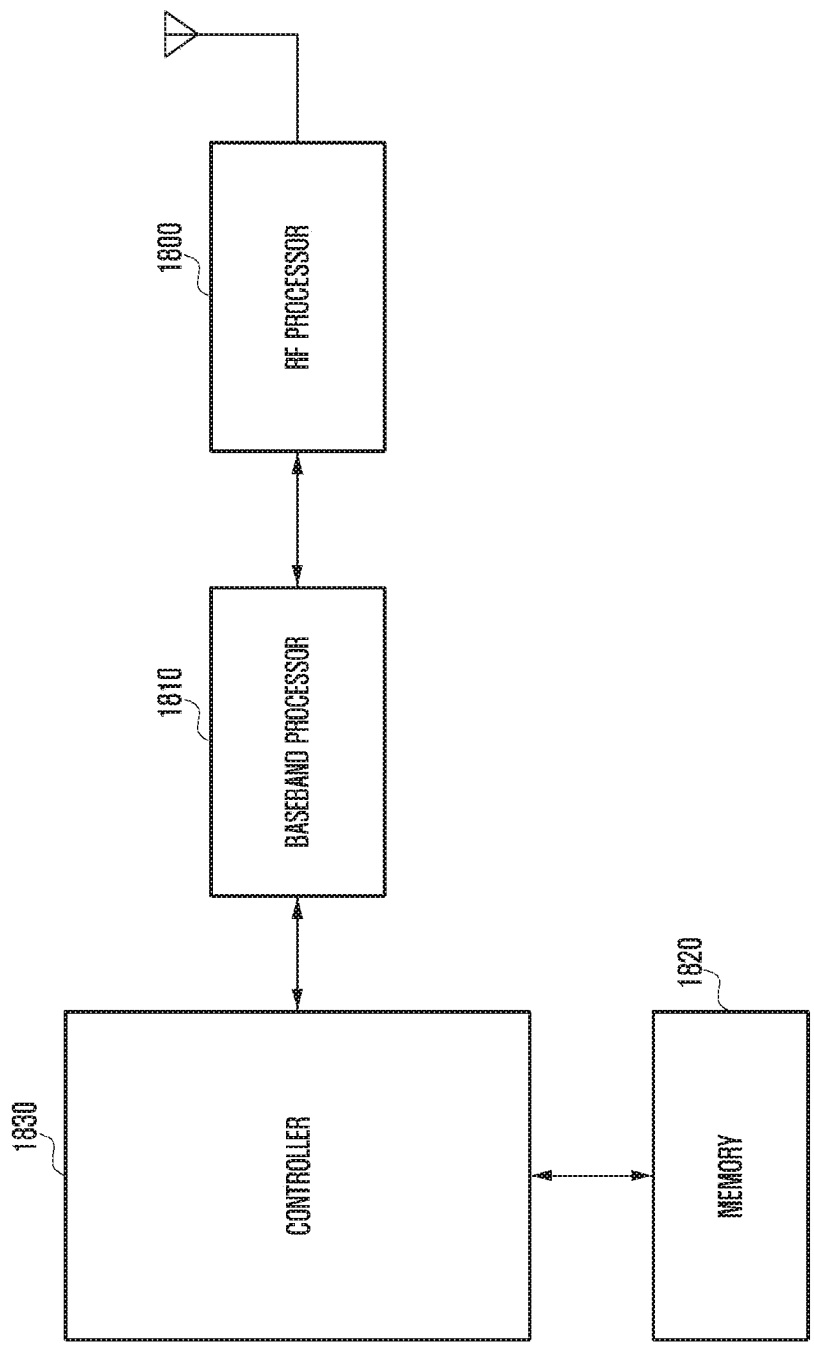
FIG. 18 is a block diagram illustrating a structure of the UE capable of implementing the present disclosure.

FIG. 18 is a block diagram illustrating a structure of the UE capable of implementing the present disclosure.

Referring to FIG. 18, the UE includes a radio frequency (RF) processor 1800, a baseband processor 1810, a memory 1820, and a controller 1830.

The RF processor 1800 performs a function for transmitting and receiving a signal through a wireless channel, such as band conversion and amplification of a signal. That is, the RF processor 1800 up-converts a baseband signal provided from the baseband processor 1810 into an RF band signal, transmits the RF band signal through an antenna, and then down-converts the RF band signal received through the antenna into a baseband signal. For example, the RF processor 1800 may include a transmission filter, a reception filter, an amplifier, a mixer, an oscillator, a digital-to-analog convertor (DAC), an analog-to-digital convertor (ADC), and the like. Although only one antenna is illustrated in FIG. 18, the UE may include a plurality of antennas. In addition, the RF processor 1800 may include a plurality of RF chains. Moreover, the RF processor 1800 may perform beamforming. For the beamforming, the RF processor 1800 may control the phase and the size of each signal transmitted/received through a plurality of antennas or antenna elements. The RF processor may perform MIMO and receive a plurality of layers when performing the MIMO operation.

The baseband processor 1810 performs a function for conversion between a baseband signal and a bitstream according to a physical layer standard of the system. For example, in data transmission, the baseband processor 1810 generates complex symbols by encoding and modulating a transmission bitstream. In data reception, the baseband processor 1810 reconstructs the reception bitstream through the demodulation and decoding of the baseband signal provided from the RF processor 1800. For example, in an orthogonal frequency division multiplexing (OFDM) scheme, in data transmission, the baseband processor 1810 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, in data reception, the baseband processor 1810 splits the baseband signal provided from the RF processor 1800 in units of OFDM symbols, reconstructs the signals mapped to the subcarriers through a fast Fourier transform (FFT) operation, and then reconstructs the reception bitstream through demodulation and decoding.

The baseband processor 1810 and the RF processor 1800 transmit and receive signals as described above. Accordingly, the baseband processor 1810 and the RF processor 1800 may be referred to as a transmitter, a receiver, a transceiver, or a communicator. Further, at least one of the baseband processor 1810 and the RF processor 1800 may include a plurality of communication modules for supporting a plurality of different radio access technologies. In addition, at least one of the baseband processor 1810 and the RF processor 1800 may include different communication modules to process signals of different frequency bands. For example, the different radio access technologies may include a wireless RAN (for example, IEEE 802.11) and a cellular network (for example, LTE). Further, the different frequency bands may include a super-high-frequency (SHF) (for example, 2.5 GHz and 5 GHz) band and a millimeter (mm) wave (for example, 60 GHz) band.

The memory 1820 stores data such as a basic program, an application program, and setting information for the operation of the UE. In addition, the memory 1820 provides data stored therein in response to a request from the controller 1830.

The controller 1830 controls the overall operation of the UE. For example, the controller 1830 transmits and receives a signal through the baseband processor 1810 and the RF processor 1800. In addition, the controller 1830 may record data in the memory 1820 and read the data. To this end, the controller 1830 may include at least one processor. For example, the controller 1830 may include a CP (communication processor), which performs control for communication, and an AP (application processor), which controls a higher layer such as an application program.

Figure 19:
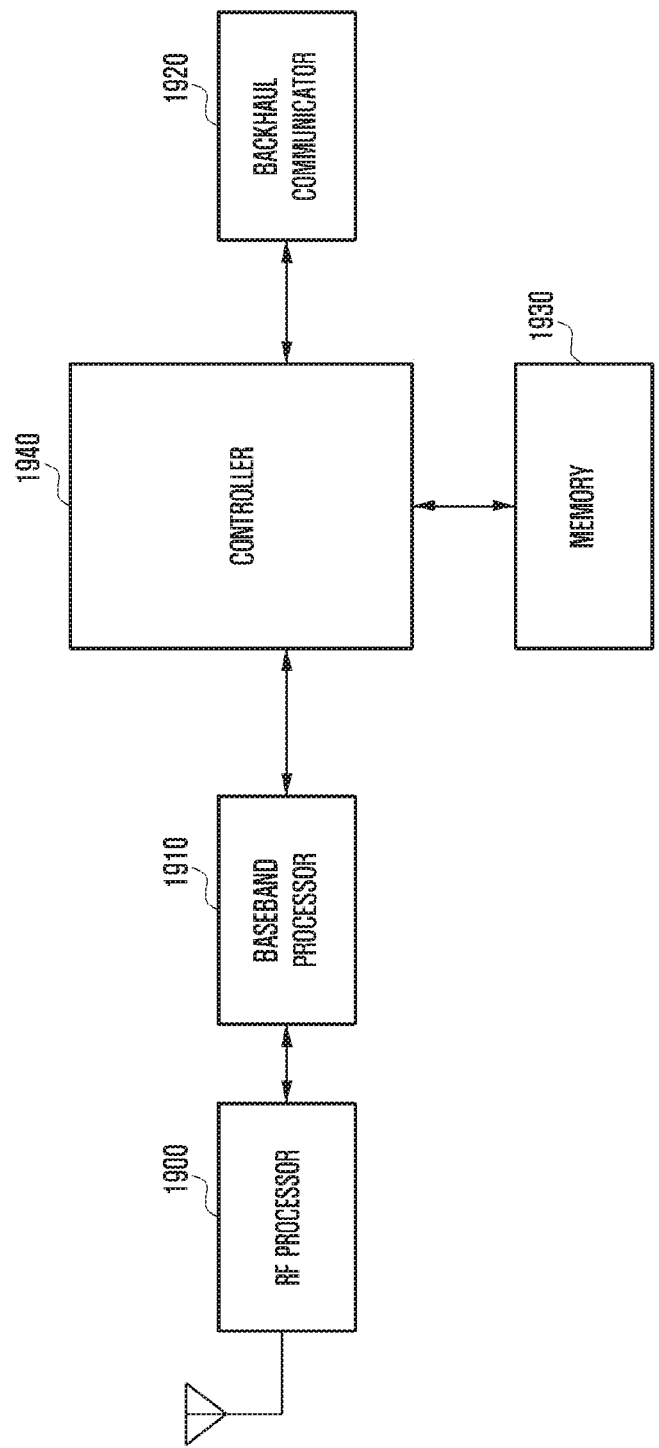
FIG. 19 is a block diagram illustrating a configuration of the eNB capable of implementing the present disclosure.

FIG. 19 is a block diagram illustrating a configuration of the eNB capable of implementing the present disclosure.

As illustrated in FIG. 19, the eNB includes an RF processor 1900, a baseband processor 1910, a backhaul communicator 1920, a memory 1930, and a controller 1940.

The RF processor 1900 performs a function for transmitting and receiving a signal through a wireless channel, such as band conversion and amplification of a signal. That is, the RF processor 1900 up-converts a baseband signal provided from the baseband processor 1910 into an RF band signal, transmits the RF band signal through an antenna, and then down-converts the RF band signal received through the antenna into a baseband signal. For example, the RF processor 1900 may include a transmission filter, a reception filter, an amplifier, a mixer, an oscillator, a DAC, and an ADC. Although only one antenna is illustrated in FIG. 19, the eNB may include a plurality of antennas. In addition, the RF processor 1900 may include a plurality of RF chains. Moreover, the RF processor 1900 may perform beamforming. For the beamforming, the RF processor 1900 may control the phase and the size of each of the signals transmitted and received through a plurality of antennas or antenna elements. The RF processor may perform a downlink MIMO operation by transmitting one or more layers.

The baseband processor 1910 performs a function of performing conversion between a baseband signal and a bitstream according to a physical layer standard of the radio access technology. For example, in data transmission, the baseband processor 1910 encodes and modulates a transmission bitstream to generate complex symbols. In addition, in data reception, the baseband processor 1910 reconstructs a reception bitstream through demodulation and decoding of the baseband signal provided from the RF processor 1900. For example, in an OFDM scheme, when data is transmitted, the baseband processor 1910 generates complex symbols by encoding and modulating a transmission bitstream, maps the complex symbols to subcarriers, and then configures OFDM symbols through an IFFT operation and CP insertion. Further, when data is received, the baseband processor 1910 splits the baseband signal provided from the RF processor 1900 in units of OFDM symbols, reconstructs the signals mapped to the subcarriers through a fast Fourier transform (FFT) operation, and then reconstructs the reception bitstream through demodulation and decoding. The baseband processor 1910 and the RF processor 1900 transmit and receive signals as described above. Accordingly, each of the baseband processor 1910 and the RF processor 1900 may be referred to as a transmitter, a receiver, a transceiver, a communicator, or a wireless communicator.

The backhaul communicator 1920 provides an interface for communicating with other nodes within the network. That is, the backhaul communicator 1920 converts a bitstream transmitted from the eNB to another node, for example, a secondary eNB or a core network, into a physical signal and converts a physical signal received from the other node into a bitstream.

The memory 1930 stores data such as a basic program, an application program, and setting information for the operation of the server. In addition, the memory 1930 provides data stored therein in response to a request from the controller 1940.

The controller 1940 controls the overall operation of the eNB. For example, the controller 1940 transmits and receives a signal through the baseband processor 1910 and the RF processor 1900 or through the backhaul communicator 1920. In addition, the controller 1940 may record data in the memory 1930 and read the data. To this end, the controller 1940 may include at least one processor.

Third Embodiment

In the following description, terms for identifying access nodes, terms referring to network entities, terms referring to messages, terms referring to interfaces between network entities, and terms referring to various pieces of identification information are used for convenience of description. Therefore, the present disclosure is not limited by the terminologies provided below, and other terms that indicate subjects having equivalent technical meanings may be used.

For convenience of description, the present disclosure uses terms and names defined in a 3GPP LTE (3rd-generation Partnership Project, Long-Term Evolution). However, the present disclosure is not limited to the terms and names, and may be equally applied to a system according to another standard.

Figure 20:
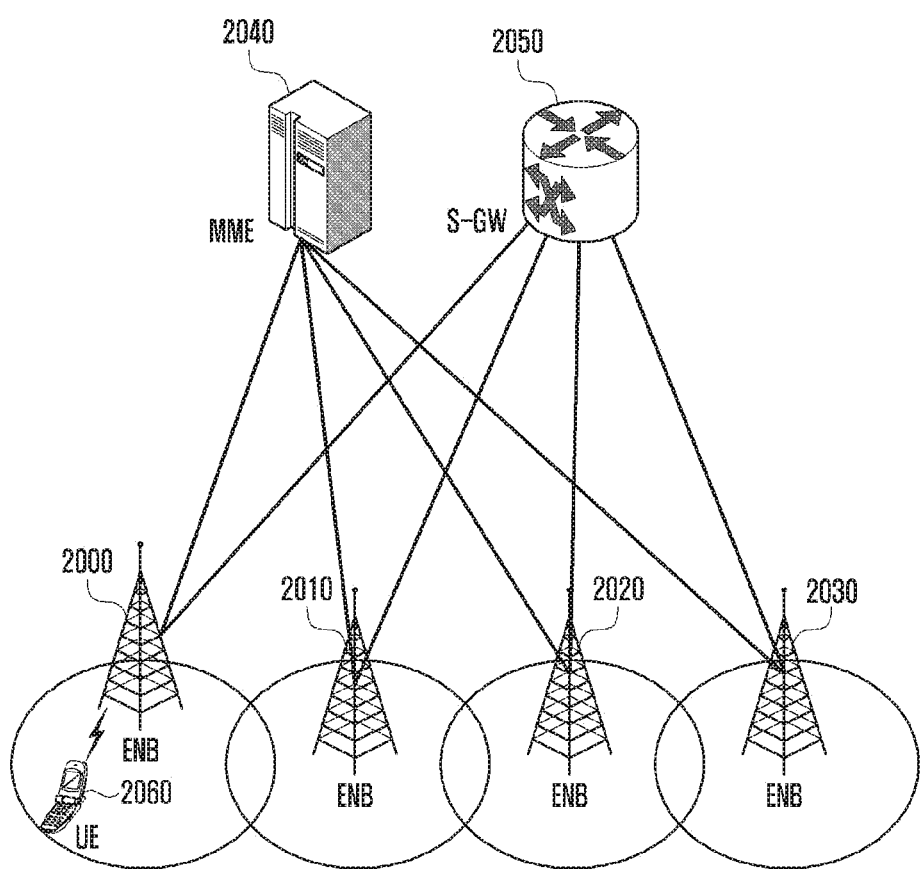
FIG. 20 illustrates the structure of an LTE system to which the present disclosure can be applied.

FIG. 20 illustrates the structure of an LTE system to which the present disclosure can be applied.

Referring to FIG. 20, the wireless communication system includes a plurality of eNBs 2000, 2010, 2020, and 2030, a mobility management entity (MME) 2040, and a serving-gateway (S-GW) 2050. A User Equipment (hereinafter, referred to as a UE or a terminal) 2060 accesses an external network through the eNBs 2000, 2010, 2020, and 2030 and the S-GW 2050.

The eNBs 2000, 2010, 2020, and 2030 are access nodes of a cellular network and provide radio access to UEs accessing the network. That is, in order to serve traffic of users, the eNBs 2000, 2010, 2020, and 2030 perform scheduling on the basis of collected status information such as buffer statuses, available transmission power statuses, and channel statuses of UEs and support connection between the UEs and a core network (CN). The MME 2040 is a device performing a function of managing mobility of the UE and various control functions and is connected to a plurality of eNBs, and the S-GW 2050 is a device providing a data bearer. The MME 2040 and the S-GW 2050 may further perform authentication for the UE accessing the network and bearer management and may process packets received from the eNBs 2000, 2010, 2020, and 2030 or packets to be transferred to the eNBs 2000, 2010, 2020, and 2030.

Figure 21:
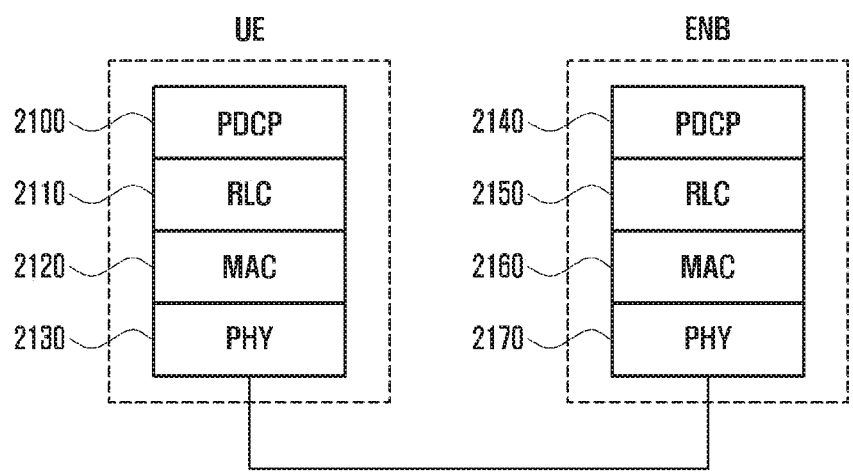
FIG. 21 illustrates a radio protocol structure in the LTE system to which the present disclosure can be applied.

FIG. 21 illustrates a radio protocol structure in the LTE system to which the present disclosure can be applied.

Referring to FIG. 21, the UE and the eNB include packet data convergence protocols (PDCP) 2100 and 2140, radio link controls (RLC) 2110 and 2150, and medium access controls (MAC) 2120 and 2160, respectively, in the wireless protocol of the LTE system. The PDCPs 2130 and 2170 perform an operation of compressing/reconstructing an IP header, and the RLCs 2110 and 2150 reconfigure a PDP packet data unit (PDU) to have the proper size. The MACs 2120 and 2160 are connected with various RLC layer devices included in one UE and perform an operation for multiplexing RLC PDUs to the MAC PDU and de-multiplexing the RLC PDUs from the MAC PDU. The physical layers 2130 and 2170 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer. Further, the physical layer uses hybrid ARQ (HARQ) to correct an additional error, and a receiving side transmits 1 bit indicating whether a packet transmitted from a transmitting side is received. The information of 1 bit is referred to as HARQ ACK/NACK information. Downlink HARQ ACK/NACK information for uplink transmission may be transmitted through a physical hybrid-ARQ indicator channel (PHICH), and uplink HARQ ACK/NACK information for downlink transmission may be transmitted through a physical uplink control channel (PUCCH) or a physical uplink shared channel (PUSCH).

Although not illustrated, there is a radio resource control (RRC) layer above the PDCP layer of each of the UE and the eNB, and the RRC layer may transmit and receive an access- and measurement-related configuration control message to control radio resources.

Figure 22:
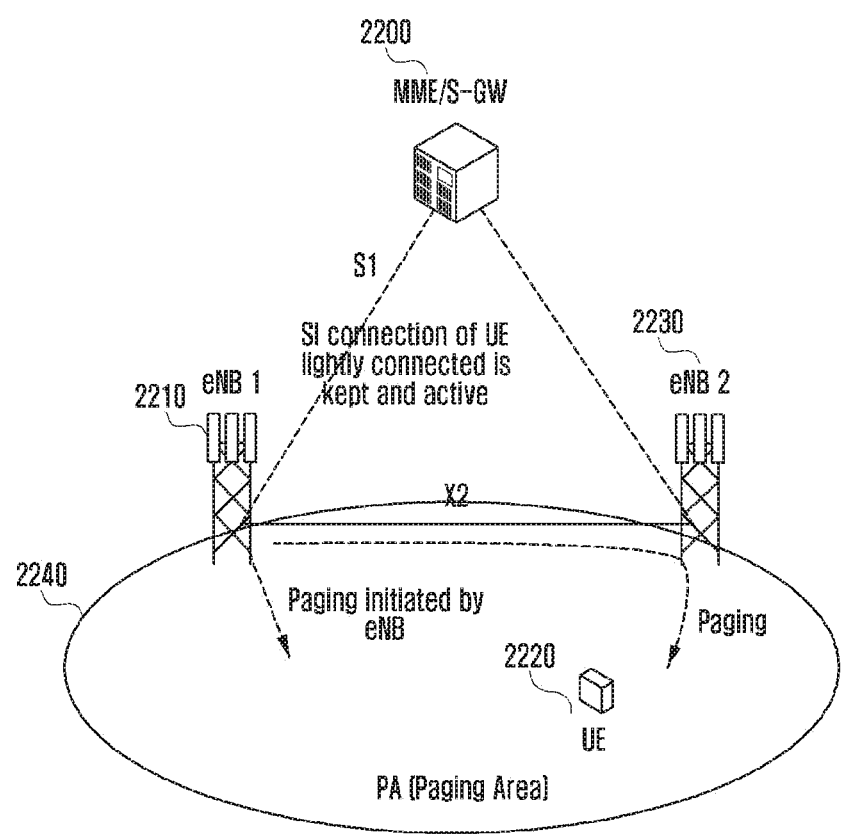
FIG. 22 illustrates the concept of a light connection.

FIG. 22 illustrates the concept of a light connection. A light connection technology defines a new UE mode other than the existing idle mode or connected mode in order to reduce signaling overhead due to the conventional handover or paging transmission operation. The new UE mode may be called a light-connected mode, an inactive mode, or other modes. Hereinafter, with respect to the light-connected-mode UE 2220, UE context may be stored, an S1 connection may be maintained, and paging for the UE may be triggered by the eNBs 2210 and 2230 or the MME.

Accordingly, the MME 2200 recognizes that the UE is in the connected mode, and thus if there is data to be transmitted to the UE, directly transmits the data to the eNB rather than first triggering paging. The eNB receiving the data forwards the paging to all eNBs in the paging area (PA) 2240, which is a predetermined area, and all the eNBs transmit the paging.

The present disclosure proposes a detailed operation of the UE and the network which can reduce battery consumption of the UE and signaling overhead in consideration of the characteristics of the light connection.

Figure 23A:
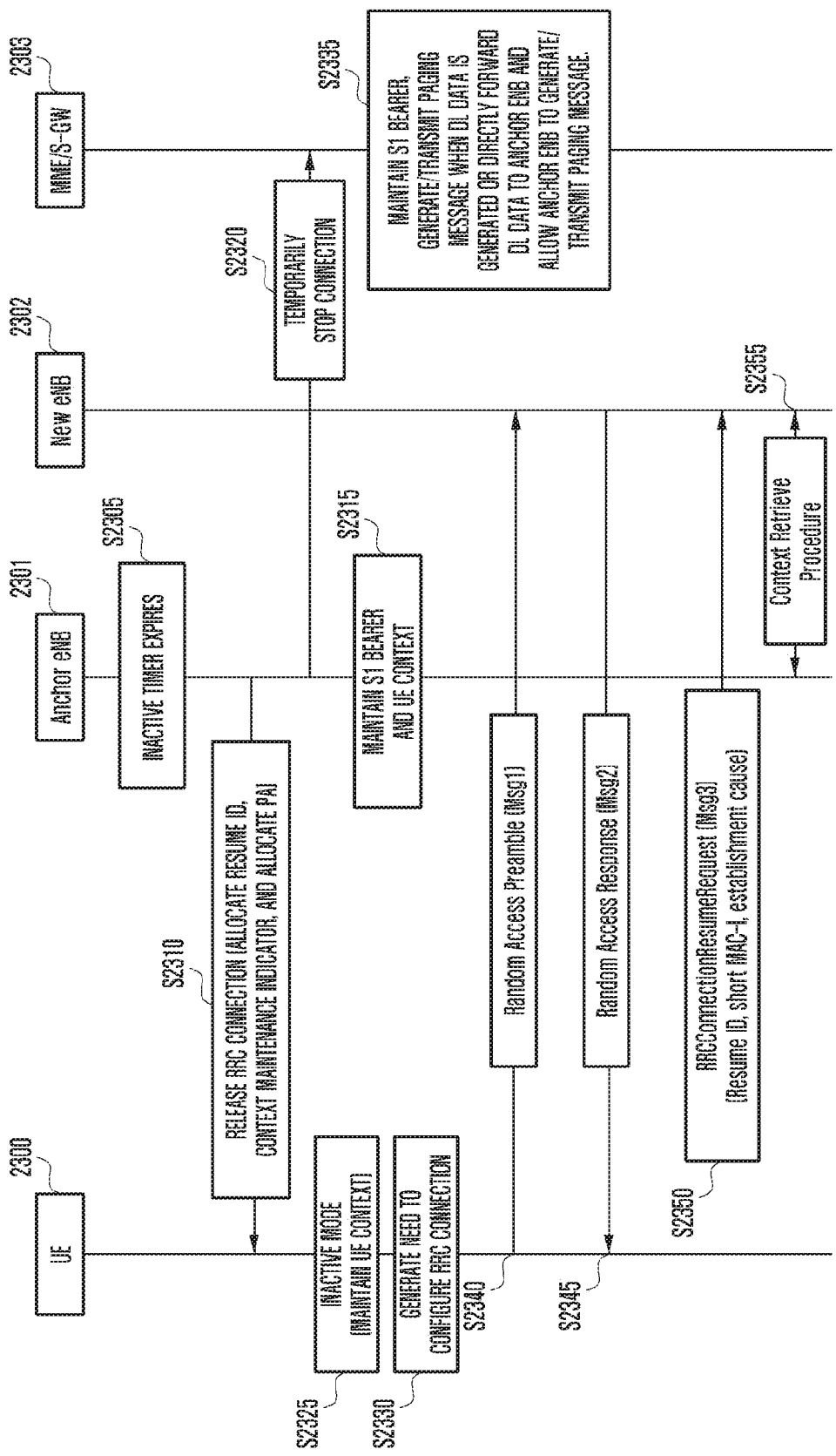
FIGS. 23A and 23B illustrate a process in which the UE and the eNB of the present disclosure reuse UE context and S1 bearer through a light connection procedure.
Figure 23B:
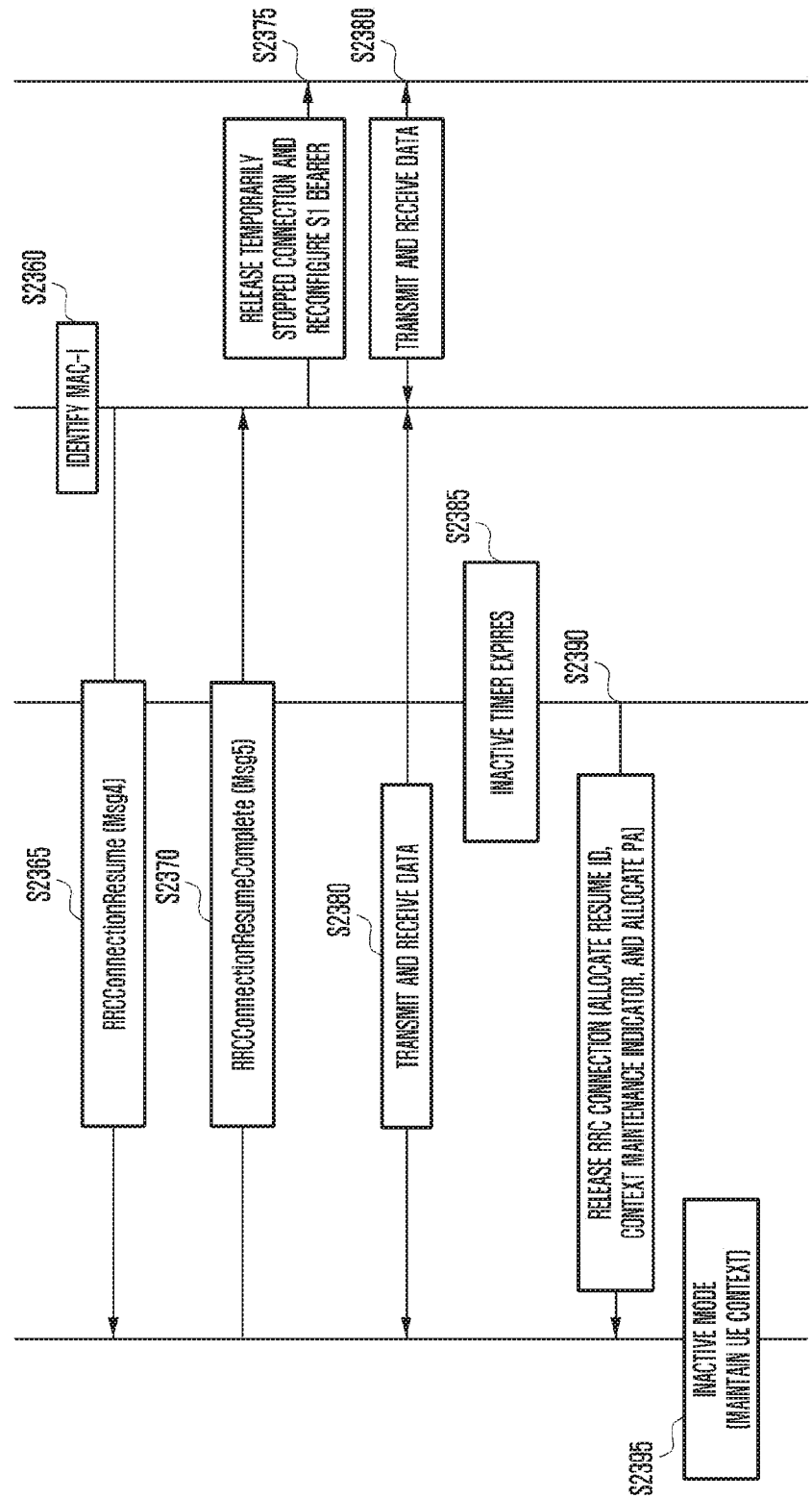

FIGS. 23A and 23B illustrate the process in which the UE and the eNB of the present disclosure reuse a UE context and an S1 bearer through a light connection procedure. In FIG. 23, operations of a UE, an anchor eNB, a new eNB, and an MME to perform the process are illustrated.

In FIGS. 23A and 23B, a UE 2300 in an RRC-connected state transmits and receives data to and from an eNB 2301. When the data transmission and reception are stopped, the eNB drives a predetermined timer. If the data transmission and reception do not resume before the timer expires in S2305, the eNB considers release of the RRC connection of the UE. After releasing the RRC connection of the UE according to a predetermined rule, the eNB stores the UE context and transmits a control message indicating the release of the RRC connection to the UE in S2310. The eNB allocates a resume ID to the UE while transmitting the control message and configures a paging area to report mobility while the UE is in the light-connected mode. At this time, due to allocation of the resume ID, the UE may recognize that the UE context should be stored or the eNB may transmit a separate UE context maintenance indicator for indicating the same through the control message. The control message may include the term during which the eNB maintains context information and a list of cells that can apply a procedure using the stored context when the UE desires to reconfigure the RRC connection within an expiration date.

After releasing the RRC connection of the UE, the eNB maintains the UE context and the S1 bearer in S2315. The S1 bearer refers to an S1-control bearer used for transmitting and receiving a control message between the eNB and the MME and an S1-user plane bearer used for transmitting and receiving user data between the eNB and the S-GW. By maintaining the S1 bearer, a procedure for configuring the S1 bearer may be omitted when the UE configures the RRC connection in the same cell or the same eNB. When the data expires, the eNB may delete the UE context and release the S1 bearer. The UE receiving the RRC connection release message in S2310 switches to the light-connected mode.

The eNB transmits a control message which makes a request for temporarily stopping the connection to the MME in S2320. The MME receiving the control message instructs the S-GW to make a request for initiating a paging procedure to the MME without transmitting downlink data when the downlink data for the UE is generated, and the S-GW operates according to the instruction in S2335. Alternatively, the S-GW directly transmits the downlink data to the anchor eNB and the anchor eNB generates a paging message and transmits the same to a neighboring eNB. That is, the anchor eNB receiving the downlink data stores the data in a buffer and performs the paging procedure. The anchor eNB refers to an eNB which maintains the UE context and the S1-U bearer.

The UE receiving the RRC connection release message including the information indicating context maintenance and the resume ID in S2310 releases the RRC connection, drives a timer corresponding to an expiration date, records a valid cell list in a memory, and maintains the current UE context without deletion in S2325. The UE context refers to various pieces of information related to RRC configuration and includes at least one piece of SRB configuration information, DRB configuration information, and security key information.

Thereafter, for some reason, the need to configure the RRC connection arises in S2330. The UE which has not received the resume ID or has not indicated to maintain context during the previous RRC connection release process initiates the general RRC connection establishment process, but the UE which has received the resume ID during the previous RRC connection release process attempts the RRC connection resume process using the stored UE context. First, the UE transmits a preamble (message 1) for random access to the eNB 2302 that the UE desires to newly access in order to perform a random access process in S2340. When resource allocation is possible according to the received preamble, the eNB 2302 allocates uplink resources corresponding thereto to the UE through message 2 in S2345. The UE transmit an RRC connection resume request message (referred to as message 3) including the resume ID previously selected on the basis of the received uplink resource information in S2350. The message may be a message modified from the RRCConnectionRequest message or a newly defined message (for example, RRCConnectionResumeRequest).

If the anchor eNB 2301 releases the connection and the UE in the light-connected mode moves to and camps on a cell of another eNB, the new eNB 2302 may receive and identify the resume ID and thus know from which the corresponding UE received service in the past. If the new eNB successfully receives and identifies the resume ID, the new eNB performs a procedure (context retrieval procedure) of retrieving the UE context from the anchor eNB in S2355. The new eNB may retrieve the UE context from a reference eNB through an S1 or X2 interface (if the new eNB receives the resume ID but does not successfully identify the UE, the new eNB transmits the RRCConnectionSetup message to the UE and returns to the existing RRC connection establishment procedure).

The new eNB identifies MAC-I on the basis of the retrieved UE context in S2330. The MAC-I is a message authentication code calculated by the UE for a control message by applying security information of the reconstructed UE context, that is, a security key and a security count. The eNB identifies the integrity of the message on the basis of the MAC-I of the message and the security key and the security counter stored in the UE context. The new eNB determines the configuration to be applied to the RRC connection of the UE and transmits an RRC connection resume (RRCConnectionResume) message reflecting the configuration information to the UE in S2335.

The RRC connection resume message may be a control message including information indicating "RRC context reuse" (reuse indicator) in the general RRC connection request message. Like the RRC connection configuration message, the RRC connection resume message includes various pieces of information related to the RRC connection configuration of the UE. If the UE receives the general RRC connection configuration (RRCConnectionSetup) message, the UE configures the RRC connection on the basis of the configuration information indicated by the RRC connection configuration message. However, if the UE receives the RRC connection resume message, the UE configures the RRC connection in consideration of both the stored configuration information and the configuration information indicated by the control message (which may be referred to as delta configuration). For example, configuration information to be applied may be determined by identifying delta information on configuration information storing the indicated configuration information (that is, change information on the stored configuration information) and configuration information or UE context may be updated. For example, if the RRC connection resume message includes SRB configuration information, the SRB is configured by applying the indicated SRB configuration information. If the RRC connection resume message does not include the SRB configuration information, the SRB is configured by applying the SRB configuration information stored in the UE context.

The UE configures the RRC connection by applying the updated UE context and configuration information and transmits an RRC connection resume completion message to the eNB in S2370. Further, the UE transmits a control message which makes a request for releasing the temporary connection stop to the MME and makes a request for reconfiguring the S1 bearer to the new eNB in S2375. When receiving the message, the MME reconfigures the S1 bearer in the new eNB and instructs the S-GW to normally process data on the UE.

When the process is completed, the UE resumes data transmission and reception in the cell in S2380. If the anchor eNB releases the connection and the UE in the light-connected mode does not move much and thus again camps on the cell of the anchor eNB during the process, the anchor eNB may search for the UE context with reference to the resume ID indicated by message 3 in step S2350 and reconfigure the connection through a method similar to the processes on the basis of the found UE context.

When the data transmission and reception are stopped, the eNB drives a predetermined timer. If the data transmission and reception do not resume until the timer expires in S2385, the eNB considers release of the RRC connection of the UE. After releasing the RRC connection of the UE according to a predetermined rule, the eNB stores a UE context and allocates the resume ID while transmitting a control message indicating release of the RRC connection to the UE and configures a paging area to report mobility while the UE is in the light-connected mode in S2390. The UE maintains the light-connected mode in S2395, and if the UE escapes the configured paging area, the UE performs a procedure of updating the paging area.

Figure 24:
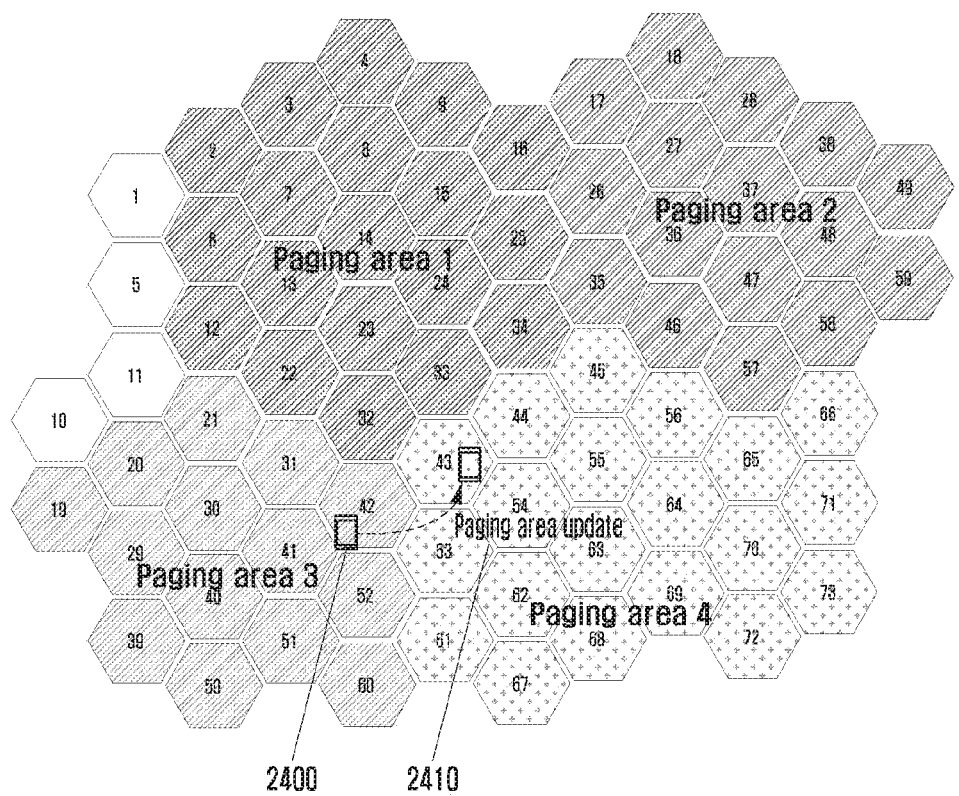
FIG. 24 illustrates a paging area configuration method of configuring a paging area in a network supporting the light connection according to an embodiment of the present disclosure.

FIG. 24 illustrates a paging area configuration method of configuring a paging area in a network supporting the light connection according to an embodiment of the present disclosure.

In FIG. 24, all cells 1 to 73 broadcast a paging area identity (PA ID) configured by the network through system information. According to the broadcasted ID, paging areas such as paging area 1, paging area 2, paging area 3, and paging area 4 are logically configured in respective cells, as illustrated in FIG. 24.

When releasing connections of respective UEs, the network allocates one or more paging area IDs. When the network releases the connection of the UE, the UE may be in an RRC connection idle state or a light-connected mode (inactive mode). During the process, the UE receiving one or more paging area IDs stores the IDs and acquires system information broadcasted by the cell whenever the UE moves. Through a process of acquiring the system information, the UE may identify the paging area ID of the corresponding cell and thus may know whether or not the cell corresponds to its own paging area.

After reading system information on the cell on which a UE 2400 of which the connection is released in the network camps and identifying the paging area ID while the UE is moving, the UE 2400 compares the identified paging area ID with paging area IDs stored in the UE. If there is no paging area ID corresponding to the broadcasted paging area ID in the stored paging area IDs, the UE determines that the UE escapes from the configured paging area in the network and performs a paging update procedure in order to report mobility. Through the paging update procedure, the UE reports mobility of the UE to the network and receives a configuration of paging area IDs again from the network.

Figure 25:
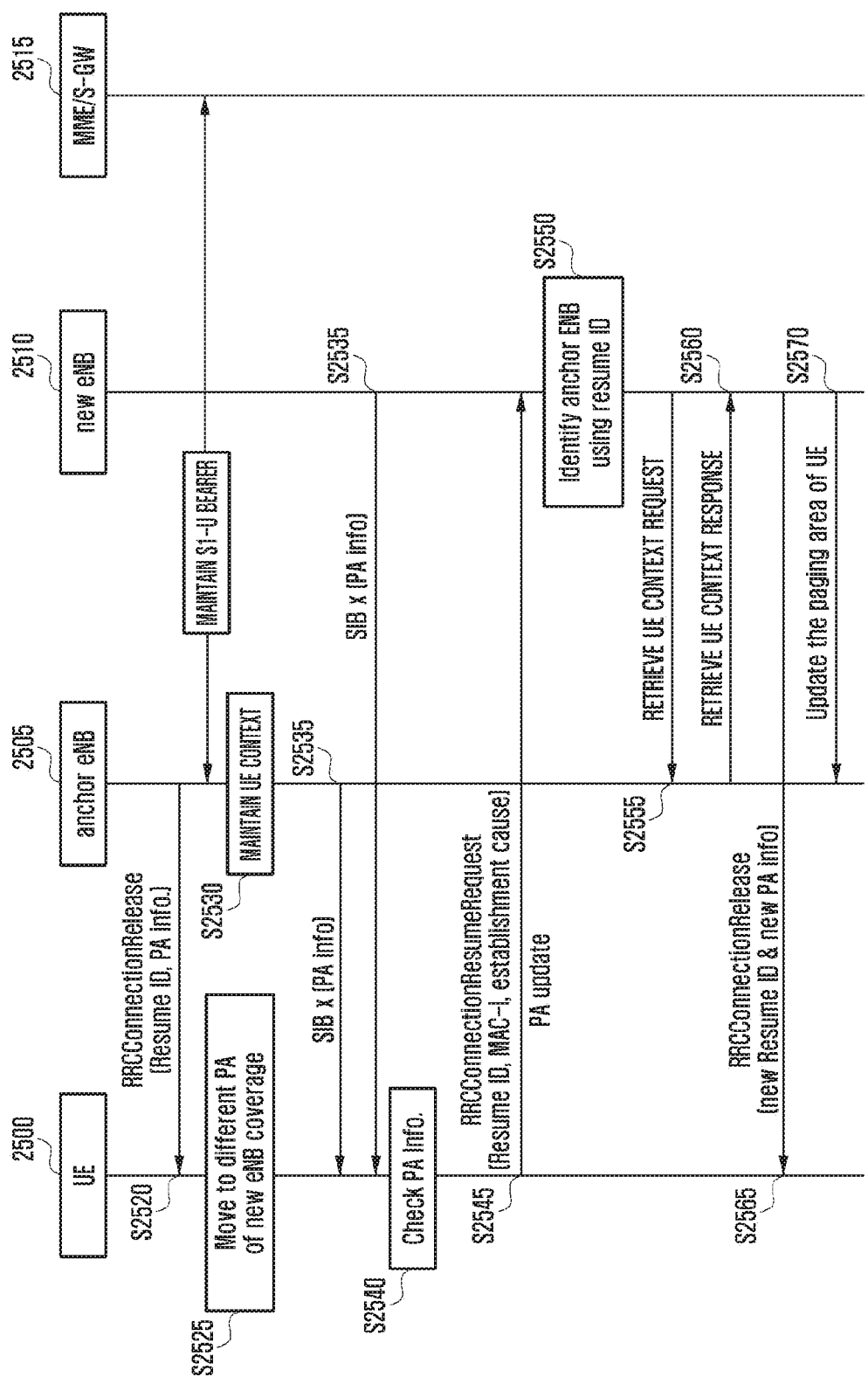
FIG. 25 illustrates a method by which the UE updates a paging area in the new eNB when the method of configuring the paging area of FIG. 24 according to the present disclosure is applied.

FIG. 25 illustrates a method by which the UE updates a paging area in the new eNB when the method of configuring the paging area according to the present disclosure is applied.

In FIG. 25, a UE 2500 connected to an anchor eNB 2502 receives an RRC connection release (RRCConnectionRelease) message from the anchor eNB in S2520. If there are no data transmission and reception to and from the UE for a predetermined time, the anchor eNB may configure the UE to be in the light-connected mode. The UE receiving the message switches to the light-connected mode. Further, the UE receiving the RRC connection release message may switch to an RRC connection idle state. The anchor eNB stores UE context information in S2530. Further, the anchor eNB may manage the mobility of the UE instead of the MME. That is, if the anchor eNB has downlink data to be transmitted to the UE, the anchor eNB may generate a paging message and transmit the same to the UE in the paging area. The UE receives allocation of a resume ID through the RRC connection release message and also receives the configuration of one or more paging area identities (PA IDs). A paging area may indicate one cell or a set of one or more cells.

The UE may move to another eNB 2510 within another paging area in S2525. Respective cells managed by eNBs broadcast their own paging area IDs through predetermined system information (SIB) in S2535. The paging area ID information corresponds to a paging area ID appointed with the network and locally forms a paging area. The UE receives system information of the cell on which the UE camps and identifies the paging area ID in S2540. If the received paging area ID is not included in the paging area IDs configured in the UE, the UE determines that the UE escapes its own paging area and transmits an RRC connection resume request (RRCConnectionResumeRequest) message in order to make a request for updating the paging area to the eNB on which the UE currently camps in S2545. The UE may newly define an establishment cause for the request for updating the paging area and add the same to the message. Alternatively, the UE may indicate the request for updating the paging area through a reserved 1 bit of the message. Further, the message may include at least one a resume ID, a MAC-I, and an establishment cause.

The eNB receiving the RRCConnectionResumeRequest message may know an anchor 2505 that previously supported the UE on the basis of the resume ID in S2550. Accordingly, the new eNB may make a request for UE context information to the anchor eNB in S2555 and S2560. The new eNB may perform a security check on the basis of the retrieved UE context information. The procedure S2555 and S2560 may be omitted if unnecessary.

The eNB transmits the RRC connection release (RRCConnectionRelease) message to the UE in S2565. At this time, the message includes a new resume ID and one or more new paging area IDs. A paging area may indicate one cell or a set of one or more cells. The new eNB 2510 may identify a mobility, a speed, and a traffic pattern of the UE through history information of the UE and reflect the same to configure paging area IDs of the UE. The history information may be received when the new eNB exchanges a message with the anchor eNB in S2555 and S2560 and may include information on the number of times the UE performs the update procedure and the cycle and the time of the paging update procedure.

The new eNB transmitting the RRCConnectionRelease message transmits a message for informing the anchor eNB of the new paging area of the UE and thus the anchor eNB updates information on the corresponding UE in S2570. This allows the anchor eNB to manage the mobility of the UE, and thus if downlink data of the corresponding UE arrives at the anchor eNB in the future, allows the anchor eNB to generate and transmit a proper paging message and easily find the UE.

Figure 26:
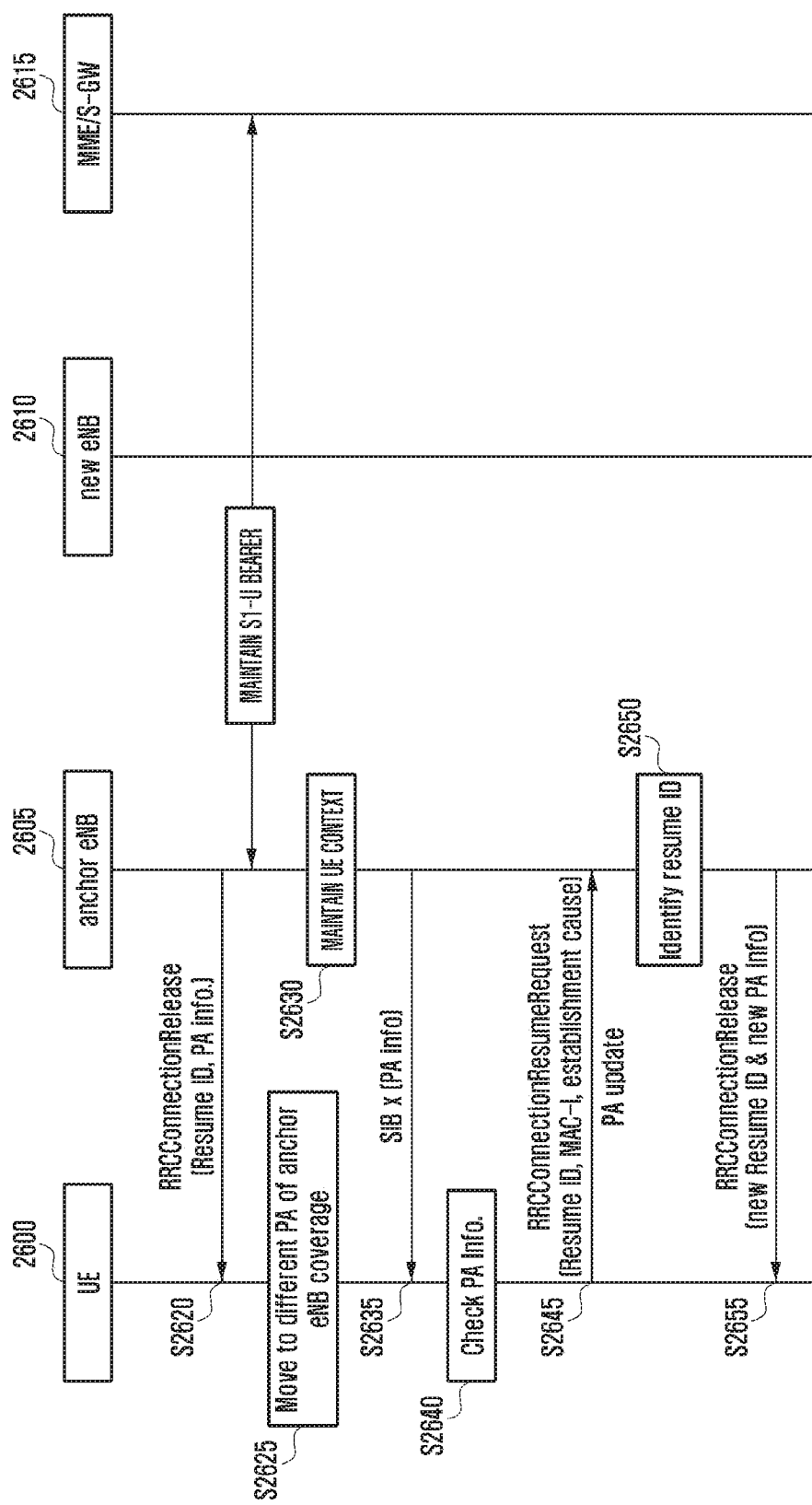
FIG. 26 illustrates a method by which the UE updates a paging area in the original anchor eNB when the method of configuring the paging area of FIG. 24 according to the present disclosure is applied.

FIG. 26 illustrates the method by which the UE updates a paging area in the original anchor eNB when the method of configuring the paging area of FIG. 24 according to the present disclosure is applied.

In FIG. 26, a UE 2600 connected to an anchor eNB 2605 receives an RRC connection release (RRCConnectionRelease) message from the anchor eNB in S2620. If there are no data transmission and reception to and from the UE, the anchor eNB may configure the UE to be in the light-connected mode. The UE receiving the message switches to the light-connected mode. Further, the UE receiving the RRC connection release message may switch to the RRC connection idle state. The anchor eNB may store UE context information in S2630. Further, the anchor eNB may manage the mobility of the UE instead of the MME. That is, if the anchor eNB has downlink data to be transmitted to the UE, the anchor eNB may generate a paging message and transmit the same to the UE in the paging area. Through the RRC connection release message, the UE may receive allocation of a resume ID and a configuration of one or more paging area IDs. A paging area may indicate one cell or a set of one or more cells.

The UE may move to another paging area controlled by the anchor eNB in S2626. Each cell managed by the eNB broadcasts its own paging area ID through predetermined system information (SIB) in S2635. The paging area ID information corresponds to a paging area ID appointed with the network and locally forms a paging area. The UE receives system information of the cell on which the UE camps and identifies the paging area ID in S2640. If the received paging area ID is not included in the paging area IDs configured in the UE, the UE determines that the UE escapes its own paging area and transmits an RRC connection resume request (RRCConnectionResumeRequest) message in order to make a request for updating the paging area to the eNB on which the UE currently camps in S2645. The UE may newly define an establishment cause for the request for updating the paging area and adds the same to the message. Alternatively, the UE may indicate the request for updating the paging area through a reserved 1 bit of the message. Further, the message includes at least one a resume ID, a MAC-I, and an establishment cause.

The eNB receiving the RRCConnectionResumeRequest message may identify information on the previous connection of the UE on the basis of the resume ID in S2650. The eNB transmits the RRC connection release (RRCConnectionRelease) message to the UE in S2655. At this time, the message includes a new resume ID and one or more new paging area IDs. A paging area may indicate one cell or a set of one or more cells. The anchor eNB 2605 may identify a mobility, a speed, and a traffic pattern of the UE through history information of the UE and reflect the same to configure paging area IDs of the UE. The history information may include the number of times the UE performs a paging update procedure and a cycle and the time of the paging update procedure. The anchor eNB transmitting the RRCConnectionRelease message stores the new paging area of the UE, and if downlink data of the UE arrives at the anchor eNB in the future, appropriately generates and transmits a paging message and easily finds the UE.

Figure 27:
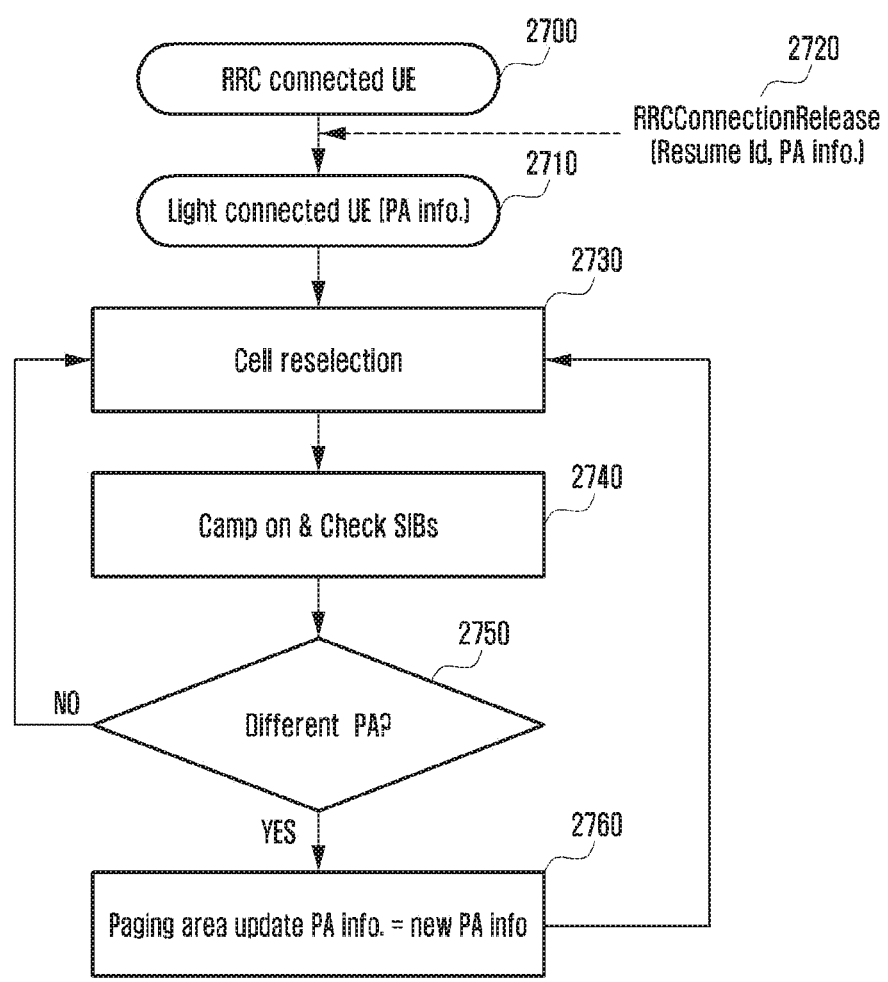
FIG. 27 illustrates an operation of the UE according to the method of configuring the paging area according to the present disclosure of FIG. 24.

FIG. 27 illustrates an operation of the UE according to the method of configuring the paging area according to the present disclosure of FIG. 24.

In FIG. 27, a UE 2700 connected to an anchor eNB receives an RRC connection release (RRCConnectionRelease) message from the anchor eNB in S2720. If there are no data transmission and reception to and from the UE, the anchor eNB may configure the UE to be in the light-connected mode. The UE receiving the message switches to the light-connected mode. Further, the UE receiving the RRC connection release message may switch to an RRC connection idle state. Through the RRC connection release message, the UE may receive allocation of a resume ID and the configuration of one or more paging area IDs. A paging area may indicate one cell or a set of one or more cells.

The UE may move to another paging area controlled by the anchor eNB or another eNB. The UE performs a cell reselection procedure to find a suitable cell during movement in step 2730. If the UE finds a suitable cell through the cell reselection procedure, the UE camps on the cell and acquires system information in step 2740. In step 2750, the UE identifies a paging area ID acquired from the system information and compares the paging area ID with paging area IDs stored therein which are configured in step 2720, and then determines whether the paging area is a paging area which is the same as or different from the paging area configured in step 2720.

If the UE does not have the same paging area ID as the paging area ID acquired from the system information, the UE determines that the current cell is another paging area. If it is determined that the UE is currently in another paging area, the UE reports mobility to the network while performing a paging area update procedure and receives a configuration of paging area IDs as new paging area IDs from the network in step 2760. If it is determined that the UE is within the same paging area, the UE continuously check the paging area as described above while performing the cell reselection procedure in step 2730.

Figure 28:
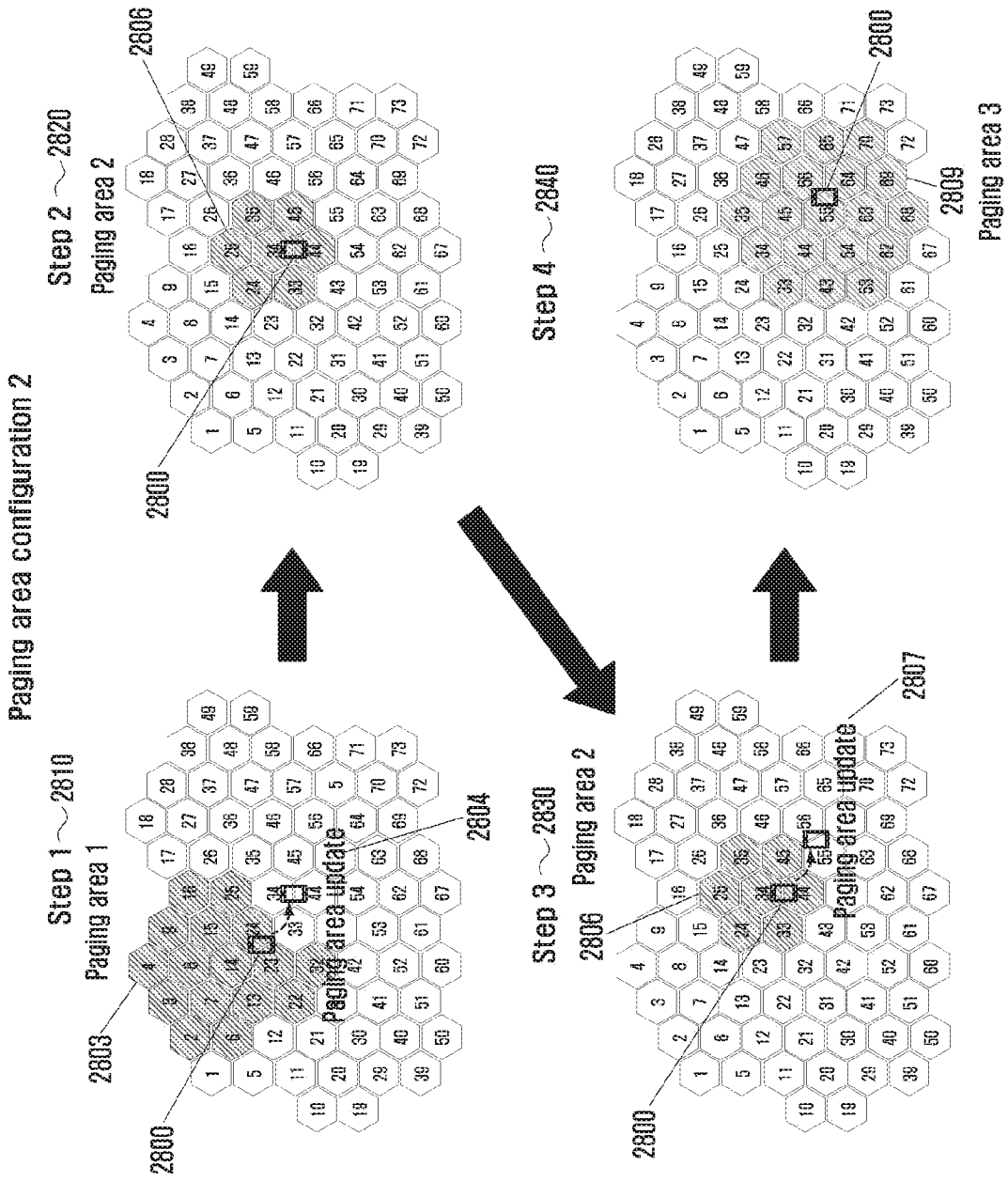
FIG. 28 illustrates another paging area configuration method of configuring the paging area in the network supporting the light connection according to an embodiment of the present disclosure.

FIG. 28 illustrates another paging area configuration method of configuring the paging area in the network supporting the light connection according to an embodiment of the present disclosure.

In FIG. 28, all UEs receive a configuration of paging areas from the network. That is, since a user-oriented paging area is configured, UEs may have different paging areas. The paging area of the UE may be configured as a list of cell identities (cell IDs). Accordingly, as illustrated in FIG. 28, each cell does not need to broadcast a separate paging area ID through system information. When releasing the connection of each UE, the anchor eNB allocates one or more cell IDs to the UE. In step #1 2810, the paging area of the UE 2800 may be configured as paging area 1. That is, the paging area of the UE may be configured as a list of cell IDs (cells 2, 3, 4, 5, 6, 7, 8, 9, 13, 14, 15, 16, 23, 24, and 25). If the network releases the connection of the UE, the UE may be in an RRC connection idle state or a light-connected mode (inactive mode). During the process, the UE receiving one or more cell IDs, stores the IDs, and acquires system information broadcasted by the cell whenever the UE moves. Through the process of acquiring the system information, the UE may identify the paging area ID of the corresponding cell and thus may know whether or not the cell corresponds to its own paging area. The UE 2800 of which the connection is released in the network reads system information of the cell on which the UE camps, identifies the cell ID of the cell, and compares the cell ID with cell IDs stored in the UE. If there is no paging area ID corresponding to the broadcasted paging area ID in the stored paging area IDs, the UE determines that the UE escapes from the configured paging area in the network and performs a paging update procedure in order to report mobility in step 2804.

When performing the paging update procedure, the eNB configures a new paging area 2 based on the cell 34 for which the UE performs the paging update procedure and allocates one or more cell IDs to the UE. Accordingly, in step #2 2820, the UE receives the configuration of the new paging area 2 from the eNB. The eNB may identify mobility, a speed, and a traffic pattern of the UE through history information of the UE and reflect the same to configure paging area IDs of the UE. The history information may include the number of times the UE performs a paging update procedure and the cycle and the time of the paging update procedure.

In step #3 2830, if the UE moves again and thus escapes the current paging area, the UE performs the paging update procedure in step 2807 and receives a configuration of a new paging area #3 2809 based on the cell 55 for which the paging update procedure is performed from the eNB in step #4 2840. The new paging area may be configured as a list of cell IDs. The new paging area may have different sizes depending on history information of the UE, that is, mobility, a speed, and a traffic pattern of the UE. That is, a large number or a small number of cell IDs may be allocated to the UE in order to allocate the paging area.

When the paging area configuration method of configuring the paging area in the network supporting the light connection of FIG. 28 according to an embodiment of the present disclosure is used, the paging area update procedure and the UE operation are the same as those in FIGS. 25, 26, and 27. However, in the paging area configuration method of FIG. 28, the list of cell IDs indicates the paging area without a separate paging area ID. That is, the paging area configuration method of FIG. 28 is different from that of FIG. 24 in that paging area (PA) information consists of cell IDs rather than paging area IDs.

Figure 29:
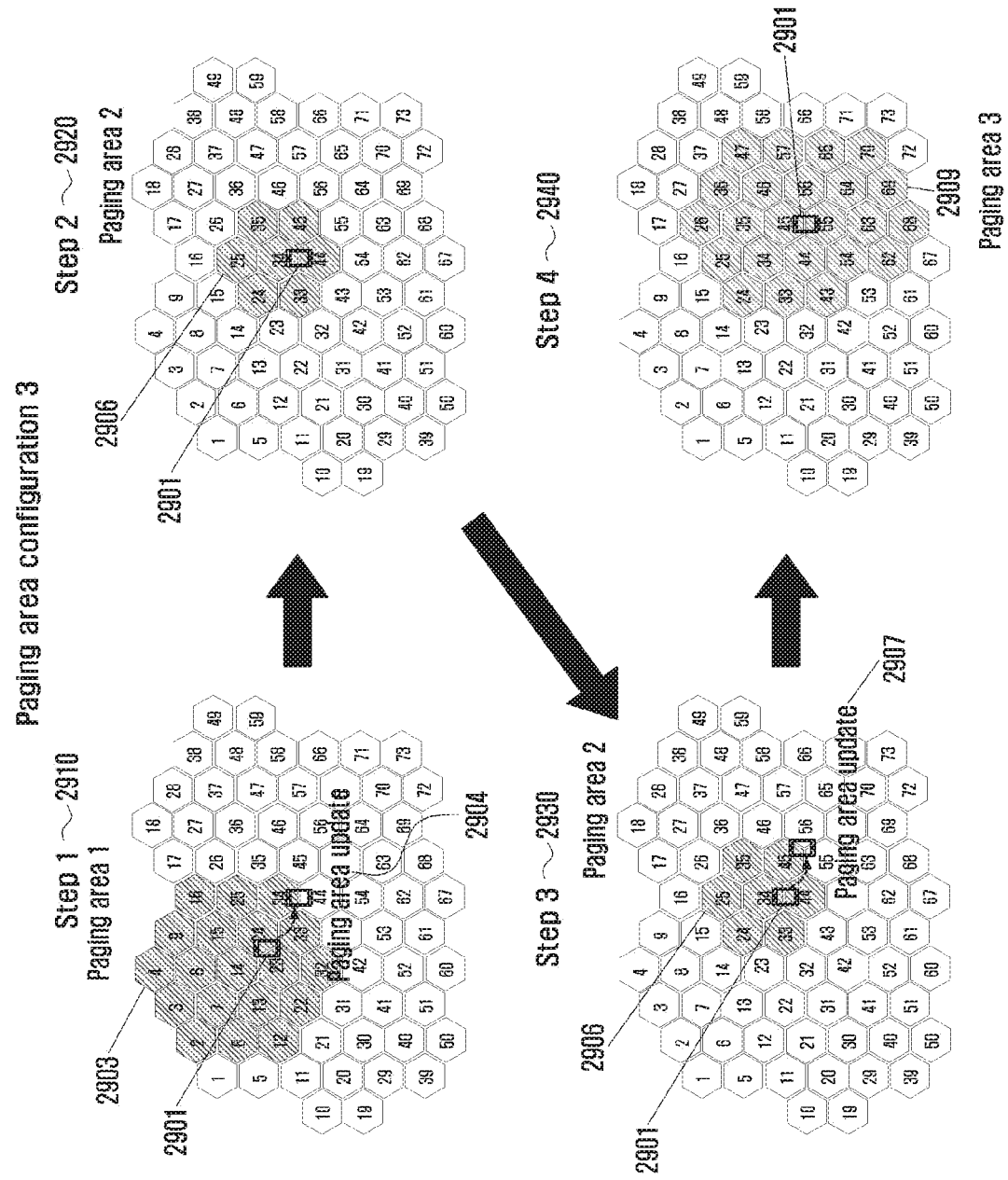
FIG. 29 illustrates another paging area configuration method of configuring the paging area in the network supporting the light connection according to an embodiment of the present disclosure.

FIG. 29 illustrates another paging area configuration method of configuring the paging area in the network supporting the light connection according to an embodiment of the present disclosure.

In FIG. 29, all UEs receive a configuration of paging areas from the network. That is, since a user-oriented paging area is configured, UEs may have different paging areas. The paging area of the UE may be configured as a list of cell identities (cell IDs). In the paging area configuration method of FIG. 29, when a paging area of each UE is configured as a list of cell IDs, the eNB may inform the UE of cells corresponding to the boundary of the paging area. When the network configures the list of cell IDs in the UE, the network may separately configure cells corresponding to the paging area boundary and cells corresponding to the inside of the paging area or may configure a 1-bit indicator before the cell ID transmitted to the UE so as to indicate whether the cell is a boundary cell of the paging area. Accordingly, as illustrated in FIG. 24, each cell does not need to broadcast a separate paging area ID through system information.

When releasing the connection of each UE, the anchor eNB allocates one or more cell IDs to the UE. In step #1 2910, the paging area of the UE 2901 may be configured as paging area 1. That is, the paging area of the UE may be configured as a list of cell IDs (cells 2, 3, 4, 5, 6, 7, 8, 9, 13, 14, 15, 16, 23, 24, and 25). Further, boundary cells of paging area 1 may be configured as cells 2, 3, 4, 9, 16, 25, 34, 33, 32, 22, 12, and 6. When the network releases the connection of the UE, the UE may be in an RRC connection idle state or a light-connected mode (inactive mode). During the process, the UE receiving allocation of the one or more cell IDs stores the IDs and acquires system information broadcasted by the cell whenever the UE moves. Through a process of acquiring the system information, the UE may identify the cell ID of the corresponding cell and thus may know whether the cell is a cell corresponding to the paging area boundary or a cell corresponding to the inside of the paging area. The UE 2901 of which the connection is released in the network reads system information of the cell on which the UE camps, identifies the cell ID of the cell, and compares the cell ID with cell IDs stored in the UE. If the broadcasted cell ID is a cell corresponding to the boundary of paging area 1 of the UE (cell 2, 3, 4, 9, 16, 25, 34, 33, 32, 22, 12, or 6), the UE performs a paging update procedure in order to report mobility to the network in step 2904.

When performing the paging update procedure, the eNB configures new paging area 2 based on the cell 34 for which the UE performs the paging update procedure and allocates one or more cell IDs to the UE. When the network configures the list of cell IDs in the UE, the network may separately configure cells corresponding to the paging area boundary and cells corresponding to the inside of the paging area or may configure a 1-bit indicator before the cell ID transmitted to the UE so as to indicate whether the cell is a boundary cell of the paging area. Accordingly, in step #2 2920, the UE receives a configuration for a new paging area 2. The eNB may identify mobility, a speed, and a traffic pattern of the UE through history information of the UE and reflect the same to configure paging area IDs of the UE. The history information may include the number of times the UE performs a paging update procedure and the cycle and the time of the paging update procedure.

In step #3 2930, if the UE moves again and thus moves to the boundary cell of the current paging area 2, the UE performs the paging update procedure in step 2907 and receives a configuration of a new paging area #3 2909 based on the cell 45 for which the paging update procedure is performed from the eNB in step #4 2940. The mew paging area 3 may be configured as a list of cell IDs. When the network configures the list of cell IDs in the UE, the network may separately configure cells corresponding to the paging area boundary and cells corresponding to the inside of the paging area, or may configure a 1-bit indicator before the cell ID transmitted to the UE so as to indicate whether the cell is a boundary cell of the paging area. The size of the new paging area 3 may vary depending on history information of the UE, that is, the mobility, speed, and traffic pattern of the UE. That is, a large number or a small number of cell IDs may be allocated to the UE in order to allocate the paging area.

Figure 30:
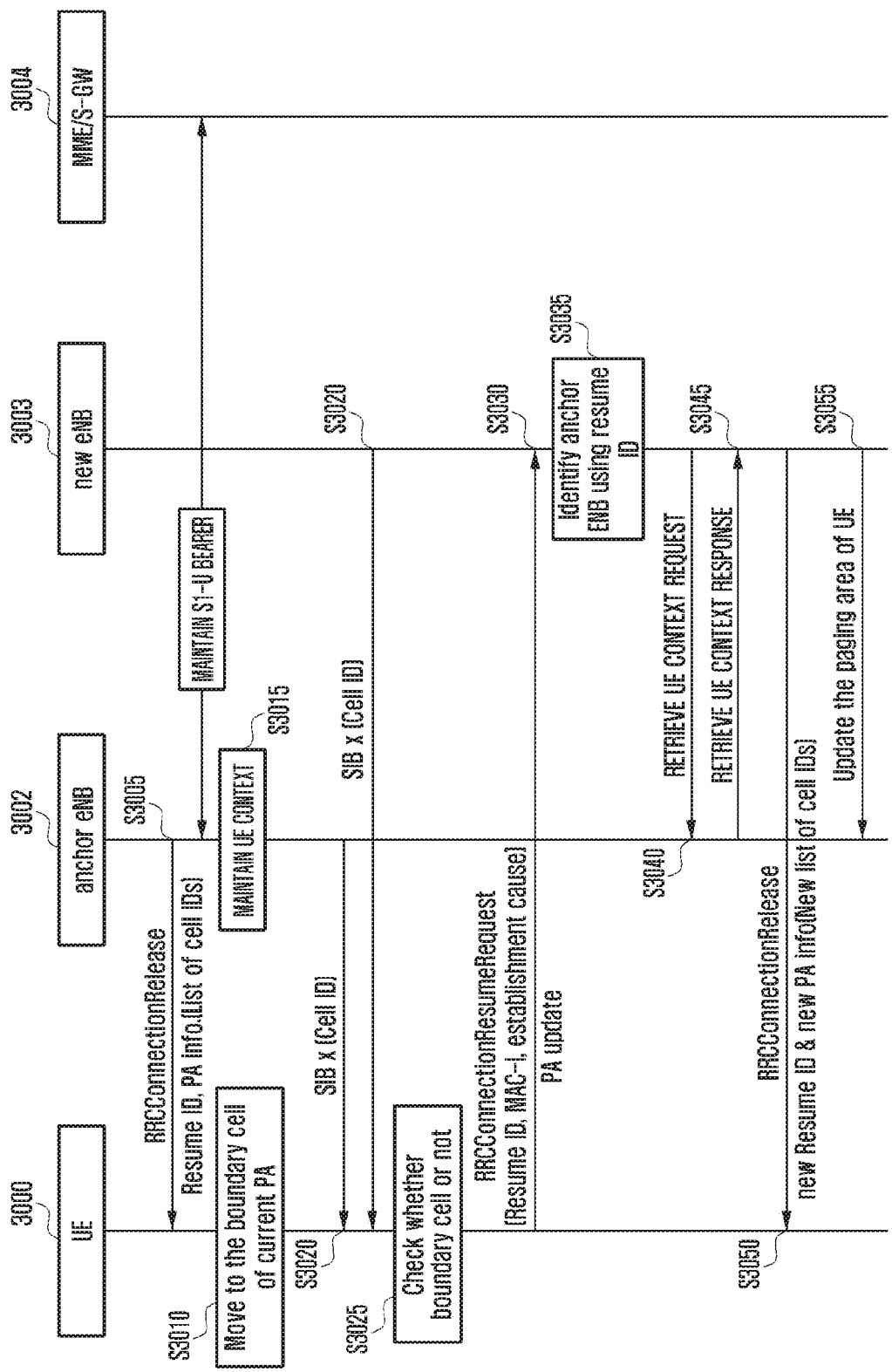
FIG. 30 illustrates a method by which the UE updates a paging area in the new eNB when the paging area configuration method according to the present disclosure of FIG. 29 is applied.

FIG. 30 illustrates a method by which the UE updates a paging area in the new eNB when the paging area configuration method according to the present disclosure of FIG. 29 is applied.

In FIG. 30, a UE 3000 connected to an anchor eNB 3002 receives an RRC connection release (RRCConnectionRelease) message from the anchor eNB in S3005. If there are no data transmission and reception to and from the UE, the anchor eNB may configure the UE to be in the light-connected mode. The UE receiving the message switches to the light-connected mode. Further, the UE receiving the RRC connection release message may switch to an RRC connection idle state. The anchor eNB may store UE context information in S3015. Further, the anchor eNB may manage the mobility of the UE instead of the MME. That is, if the anchor eNB has downlink data to be transmitted to the UE, the anchor eNB may generate a paging message and transmit the same to the UE in the paging area. The UE receives allocation of a resume ID and receives a configuration of one or more cell identities (cell IDs) in order to configure a paging area through the RRC connection release message. A paging area may indicate one cell or a set of one or more cells. When the eNB configures the list of cell IDs in the UE in the RRC connection release message, the eNB may separately configure cells corresponding to the paging area boundary and cells corresponding to the inside of the paging area, or may configure a 1-bit indicator before the cell ID transmitted to the UE so as to indicate whether the cell is a boundary cell of the paging area.

The UE may move to the boundary cell of the current paging area in S3010. Respective cells managed by eNBs broadcast their own cell IDs through predetermined system information (SIB) in S3020. The UE receives system information of the cell on which the UE camps and identifies the cell ID in S3025. If the received cell ID corresponds to the boundary cell of the paging area in the list of cell IDs configured in the UE, the UE transmits an RRC connection resume request (RRCConnectionResumeRequest) message in order to make a request for updating the paging area to the eNB of the cell on which the UE currently camps in S3030. The UE may newly define an establishment cause for the request for updating the paging area and add the same to the message. Alternatively, the UE may indicate the request for updating the paging area through a reserved 1 bit of the message. Further, the message may include at least one a resume ID, a MAC-I, and an establishment cause.

The eNB receiving the RRCConnectionResumeRequest message may recognize the anchor eNB 3002 that previously supported the UE on the basis of the resume ID in S3035. Accordingly, a new eNB 3003 may make a request for UE context information to the anchor eNB in S3040 and S3045. The new eNB may perform a security check on the basis of the retrieved UE context information. Steps S3040 and S3045 may be omitted if unnecessary.

The eNB transmits the RRC connection release (RRCConnectionRelease) message to the UE in S3050. At this time, the message includes a new resume ID and one or more new cell IDs. When the eNB configures the list of cell IDs in the UE in the message, the eNB may separately configure cells corresponding to the paging area boundary and cells corresponding to the inside of the paging area, or may configure a 1-bit indicator before the cell ID transmitted to the UE so as to indicate whether the cell is a boundary cell of the paging area. A paging area may indicate one cell or a set of one or more cells. The new eNB 3003 may identify a mobility, a speed, and a traffic pattern of the UE through history information of the UE and may reflect the same to configure paging area IDs of the UE. The history information may be received when the new eNB exchanges a message with the anchor eNB and may include the number of time the UE performs the paging update procedure and the cycle and the time of the paging update procedure.

The new eNB transmitting the RRCConnectionRelease message transmits a message for informing the anchor eNB of the new paging area of the UE and thus the anchor eNB updates information on the corresponding UE in S3055. This allows the anchor eNB to manage the mobility of the UE, and thus if downlink data of the corresponding UE is received by the anchor eNB, may allow the anchor eNB to appropriately generate and transmit a paging message and easily find the UE.

Figure 31:
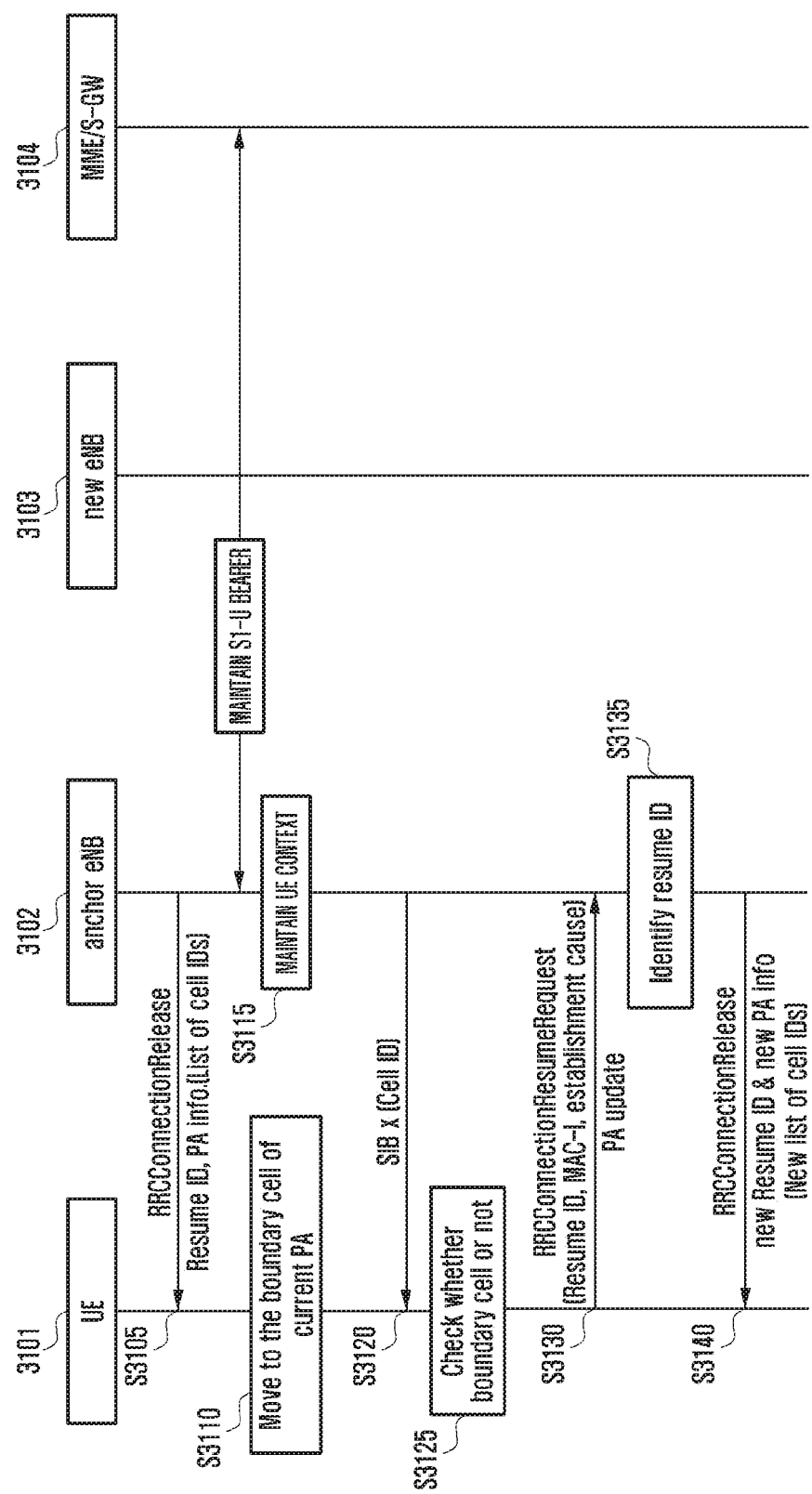
FIG. 31 illustrates a method by which the UE updates the paging area in the original anchor eNB when the paging area configuration method according to the present disclosure of FIG. 29 is applied.

FIG. 31 illustrates the method by which the UE updates the paging area in the original anchor eNB when the paging area configuration method according to the present disclosure of FIG. 29 is applied.

In FIG. 31, a UE 3101 connected to an anchor eNB 3102 receives an RRC connection release (RRCConnectionRelease) message from the anchor eNB in S3105. If there are no data transmission and reception to and from the UE, the anchor eNB may configure the UE to be in the light-connected mode. The UE receiving the message switches to the light-connected mode. Further, the UE receiving the RRC connection release message may switch to an RRC connection idle state. The anchor eNB may store UE context information in S3115. Further, the anchor eNB may manage the mobility of the UE instead of the MME. That is, the anchor BS has downlink data to be transmitted to the UE, and the anchor BS may generate a paging message and transmit the same to the UE in the paging area. The UE receives allocation of a resume ID and receives a configuration of one or more cell identities (cell IDs) in order to configure a paging area through the RRC connection release message. A paging area may indicate one cell or a set of one or more cells. When the eNB configures the list of cell IDs in the UE in the RRC connection release message, the eNB may separately configure cells corresponding to the paging area boundary and cells corresponding to the inside of the paging area, or may configure a 1-bit indicator before the cell ID transmitted to the UE so as to indicate whether the cell is a boundary cell of the paging area.

The UE may move to the boundary cell of the current paging area in S3110. At this time, the boundary cell may be included in cells managed by the anchor eNB. Respective cells managed by eNBs broadcast their own cell IDs through predetermined system information (SIB) in S3120. The UE receives system information of the cell on which the UE camps and identifies the cell ID in S3125. If the received cell ID corresponds to the boundary cell of the paging area in the list of cell IDs configured in the UE, the UE transmits an RRC connection resume request (RRCConnectionResumeRequest) message in order to make a request for updating the paging area to the eNB of the cell on which the UE currently camps in S3130. The UE may newly define an establishment cause for the request for updating the paging area and add the same to the message. Alternatively, the UE may indicate the request for updating the paging area through a reserved 1 bit of the message. Further, the message includes at least one a resume ID, a MAC-I, and an establishment cause.

The eNB receiving the RRCConnectionResumeRequest message may identify information on the previous connection of the UE to the eNB on the basis of the resume ID in S3135. The eNB transmits the RRC connection release (RRCConnectionRelease) message to the UE in S3140. At this time, the message includes a new resume ID and one or more new cell IDs. When the eNB configures the list of cell IDs in the UE in the message, the eNB may separately configure cells corresponding to the paging area boundary and cells corresponding to the inside of the paging area, or may configure a 1-bit indicator before the cell ID transmitted to the UE so as to indicate whether the cell is a boundary cell of the paging area. A paging area may indicate one cell or a set of one or more cells. The anchor eNB 3102 may identify a mobility, a speed, and a traffic pattern of the UE through history information of the UE and reflect the same to configure paging area IDs of the UE. The history information may include the number of times the UE performs a paging update procedure and the cycle and the time of the paging update procedure.

The anchor eNB transmitting the RRCConnectionRelease message stores the new paging area of the UE, and if downlink data of the UE arrives at the anchor eNB in the future, appropriately generates and transmits a paging message and easily find the UE.

Figure 32:
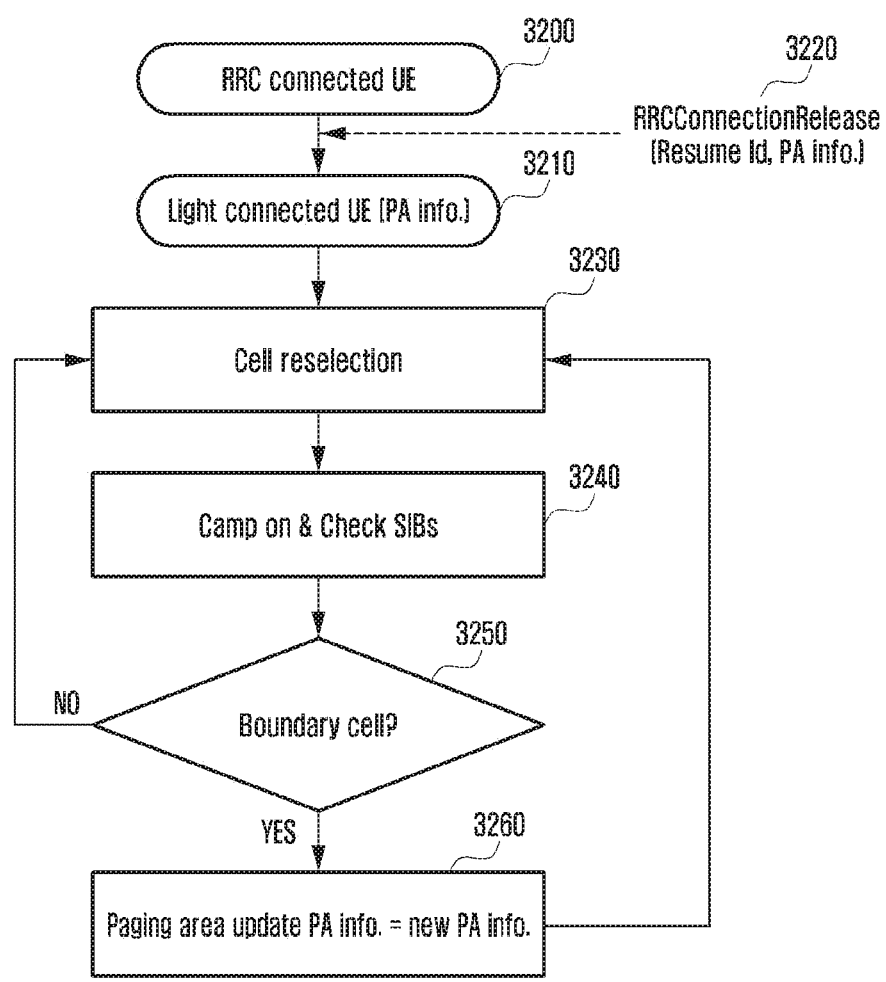
FIG. 32 illustrates an operation of the UE when the paging area configuration method according to the present disclosure of FIG. 29 is applied.

FIG. 32 illustrates the operation of the UE when the paging area configuration method according to the present disclosure of FIG. 29 is applied.

In FIG. 32, a UE 3200 connected to an anchor eNB 3102 receives an RRC connection release (RRCConnectionRelease) message from the anchor eNB in S3220. If there are no data transmission and reception to and from the UE, the anchor eNB may configure the UE to be in the light-connected mode. The UE receiving the message switches to the light-connected mode. Further, the UE receiving the RRC connection release message may switch to an RRC connection idle state.

The UE receives allocation of a resume ID and receives a configuration of one or more cell identities (cell IDs) in order to configure a paging area through the RRC connection release message. A paging area may indicate one cell or a set of one or more cells. When the eNB configures the list of cell IDs in the UE in the RRC connection release message, the eNB may separately configure cells corresponding to the paging area boundary and cells corresponding to the inside of the paging area, or may configure a 1-bit indicator before the cell ID transmitted to the UE so as to indicate whether the cell is a boundary cell of the paging area.

The UE may move to the boundary cell of the current paging area. Respective cells managed by eNBs broadcast their cell IDs through predetermined system information (SIB). The UE performs a cell reselection procedure to find a suitable cell during movement in S3230. If the UE finds a suitable cell through the cell reselection procedure, the UE camps on the cell and acquires system information in step 3240. The UE identifies the cell ID in the system information, compares the cell ID with boundary cell IDs of the paging area configured in step 3220, and then determines that the current cell is the boundary cell of the paging area in step 3250. If the UE determines that the current cell is the boundary cell of the paging area, the UE reports mobility to the network and receives a configuration of a list of new cell IDs from the network in order to configure the paging area while performing the paging area update procedure in step 3260. When the eNB configures the list of cell IDs in the UE, the eNB may separately configure cells corresponding to the paging area boundary and cells corresponding to the inside of the paging area, or may configure a 1-bit indicator before the cell ID transmitted to the UE so as to indicate whether the cell is a boundary cell of the paging area. If it is determined that the current cell is the cell inside the paging area, the UE continuously checks whether the current cell is the boundary cell of the paging area as described above while performing the cell reselection procedure in step 3230.

Figure 33:
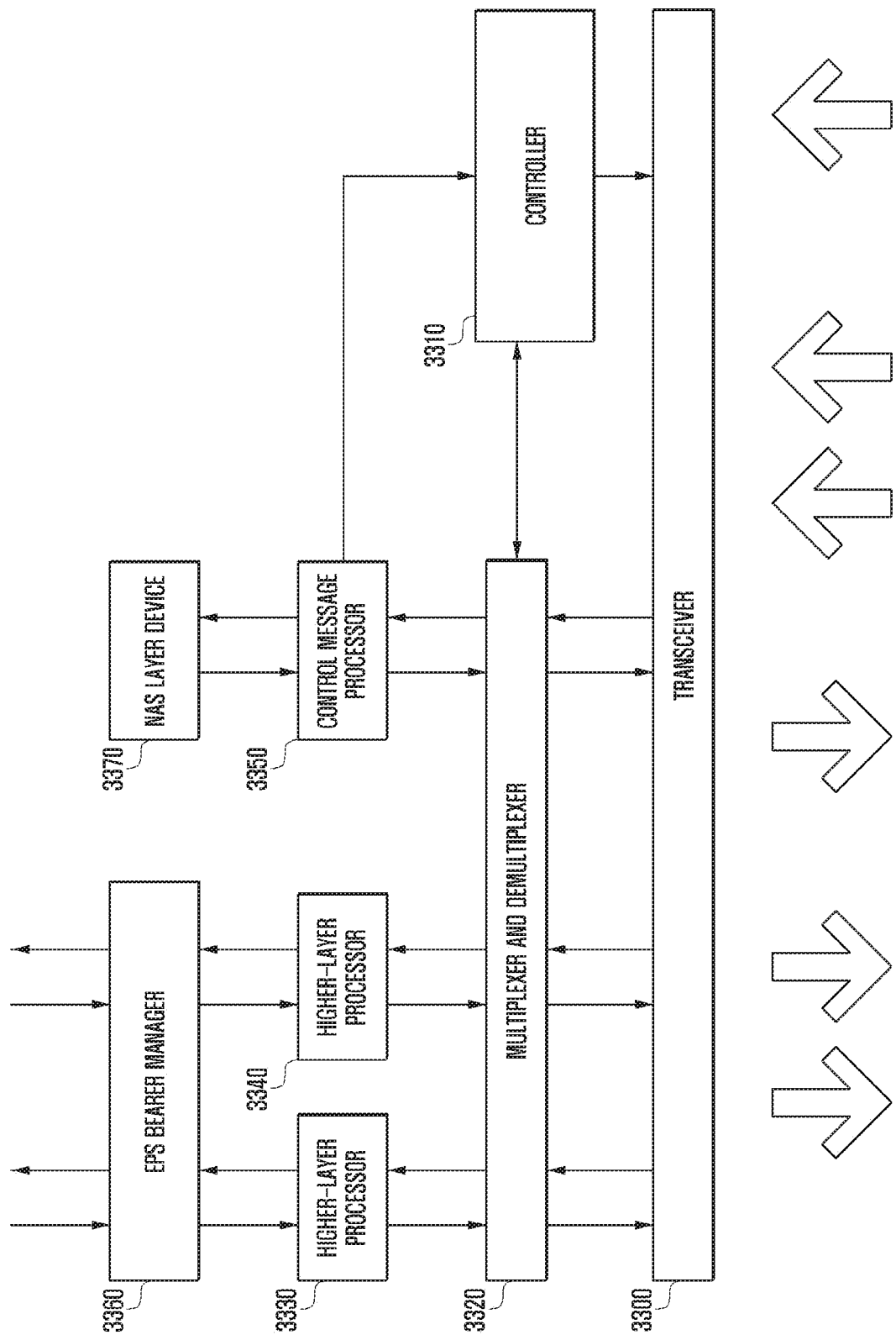
FIG. 33 is a block diagram illustrating a structure of the UE capable of implementing an embodiment of the present disclosure.

FIG. 33 is a block diagram illustrating a structure of the UE capable of implementing an embodiment of the present disclosure.

Referring to FIG. 33, the UE according to an embodiment of the present disclosure includes a transceiver 3300, a controller 3310, a multiplexer and demultiplexer 3320, a control message processor 3350, various higher-layer processors 3330 and 3340, an EPS bearer manager 3360, and a NAS layer device 3370.

The transceiver 3300 receives data and a predetermined control signal through a forward channel of a serving cell, and transmits data and a predetermined control signal through a backward channel. When a plurality of serving cells is configured, the transceiver 3300 transmits and receives data and a control signal through the plurality of serving cells.

The multiplexer and demultiplexer 3320 multiplexes data generated by the higher-layer processors 3330 and 3340 or the control message processor 3350, or de-multiplexes data received by the transceiver 3300 and transmits the data to the suitable higher-layer processors 3330 and 3340 or the control message processor 3350.

The control message processor 3350 is an RRC layer device and processes the control message received from the eNB to perform a necessary operation. For example, when an RRC connection configuration (RRC CONNECTION SETUP) message is received, an SRB and a temporary DRB are configured.

The higher-layer processors 3330 and 3340 are DRB devices and may be configured for each service. The higher-layer processor processes data generated by a user service, such as a file transfer protocol (FTP) or Voice-over-Internet protocol (VoIP) and transfers the processed data to the multiplexer and demultiplexer 3320, or processes data transferred from the multiplexer and demultiplexer 3320 and transfers the processed data to a service application of a higher layer. One service may be mapped to one EPS bearer and one higher-layer processor in one-to-one correspondence.

The controller 3310 identifies a scheduling instruction received through the transceiver 3300, for example, backward grants, and controls the transceiver 3300 and the multiplexer and demultiplexer 3320 to perform backward transmission through suitable transmission resources at an appropriate time point.

Figure 34:
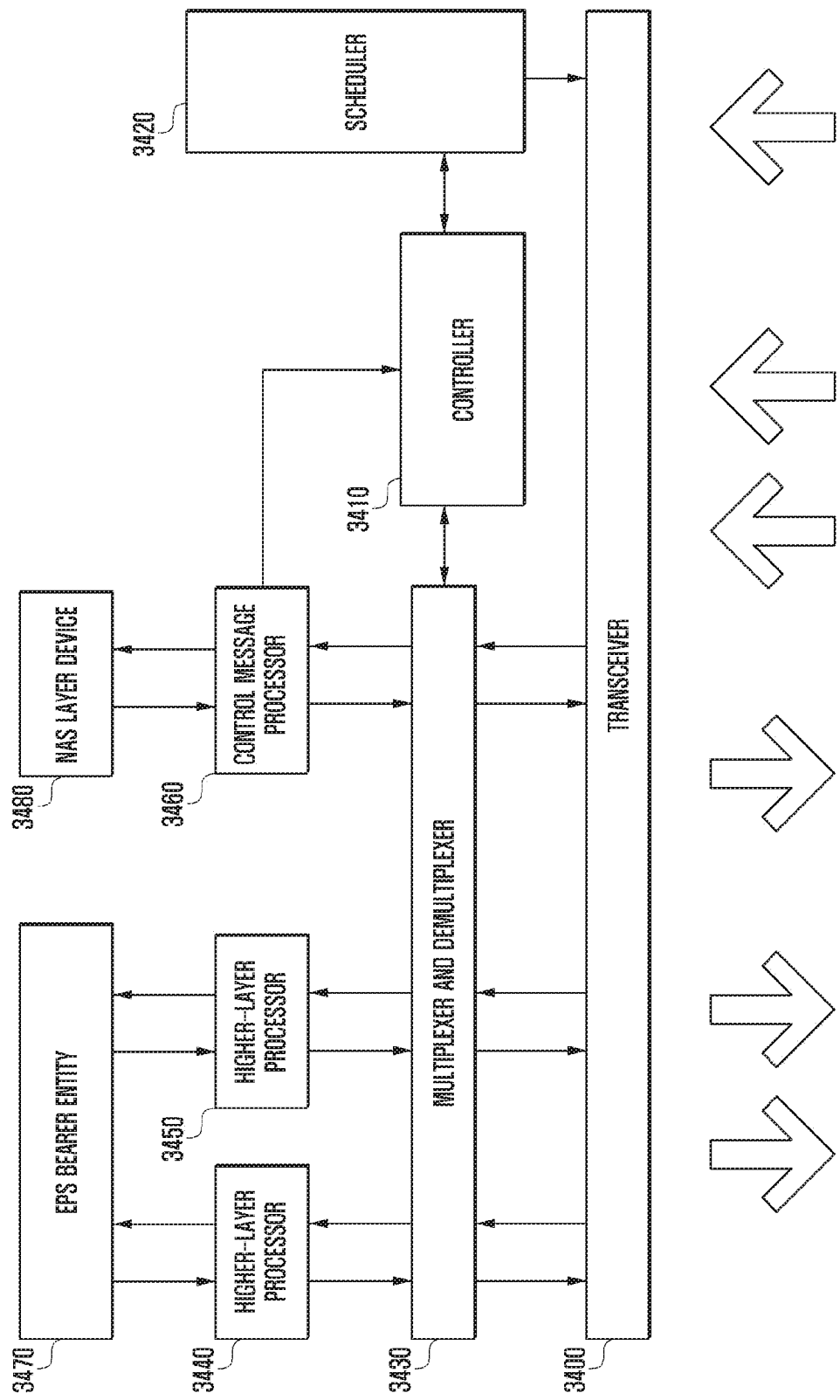
FIG. 34 is a block diagram illustrating configurations of the eNB, the MME, and the S-GW device according to an embodiment of the present disclosure.

FIG. 34 is a block diagram illustrating configurations of the eNB, the MME, and the S-GW device according to an embodiment of the present disclosure. The device of FIG. 34 (particularly, the device may be an eNB) includes a transceiver 3400, a controller 3410, a multiplexer and demultiplexer 3430, a control message processor 3460, various higher-layer processors 3440 and 3450, a scheduler 3420, an EPS bearer device 3470, and a NAS layer device 3480. The EPS bearer device is located in the S-GW and the NAS layer device is located in the MME.

The transceiver 3400 transmits data and a predetermined control signal through a forward carrier and receives data and a predetermined control signal through a backward carrier. When a plurality of carriers is configured, the transceiver 3400 transmits and receives data and a control signal through the plurality of carriers.

The multiplexer and demultiplexer 3430 serves to multiplex data generated by the higher-layer processors 3440 and 3450 or the control message processor 3460 or to demultiplex data received by the transceiver 3400 and transfers the data to the suitable higher-layer processors 3440 and 3450, the control message processor 3460, or the controller 3410. The control message processor 3460 processes a control message transmitted by the UE to perform a necessary operation or generates a control message to be transmitted to the UE and transfers the control message to a lower layer.

The higher-layer processors 3440 and 3450 may be configured for each EPS bearer, and configure data transmitted from the EPS bearer device in the RLC PDU and transmit the same to the multiplexer and demultiplexer 3430 or configure the RLC PDU transmitted from the multiplexer and demultiplexer 3430 in the PDCP SDU and transmit the same to the EPS bearer device.

The scheduler 3420 allocates transmission resources to the UE at a suitable time point in consideration of a buffer status, a channel status, and the like of the UE and enables the transceiver to process a signal received from the UE or to transmit a signal to the UE.

The EPS bearer device 3470 is configured for each EPS bearer, and processes data transmitted from the higher-layer processor and transmits the processed data to the next network node.

The higher-layer processors 3440 and 3450 and the EPS bearer device 3470 are connected to each other through an S1-U bearer. The higher-layer processor, corresponding to a common DRB, is connected to the EPS bearer for the common DRB through the common S1-U bearer.

The NAS layer device 3480 processes an IP packet in the NAS message and transfers the processed IP packet to the S-GW.

Fourth Embodiment

Hereinafter, the operating principle of the present disclosure will be described in detail with reference to the accompanying drawings. In describing the present disclosure below, a detailed description of related known configurations or functions incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be made based on the contents throughout the specification. In the following description, terms for identifying access nodes, terms referring to network entities, terms referring to messages, terms referring to interfaces between network entities, and terms referring to various pieces of identification information are used for convenience of description. Therefore, the present disclosure is not limited by the terminologies provided below, and other terms that indicate subjects having equivalent technical meanings may be used.

For convenience of description, the present disclosure uses terms and names defined in a $3^{rd}$-generation partnership project long-term evolution (3GPP LTE). However, the present disclosure is not limited to the terms and the names, and may be equally applied to systems that comply with other standards.

The present disclosure relates to user data security in a mobile communication system and also a method and an apparatus for selectively ciphering user data for each data radio bearer and packet.

Since data communicated between the eNB and the UE is transmitted through a radio channel in a mobile communication system, the data can be received by another UE in the middle of communication, and thus security is an important issue. Accordingly, the mobile communication system prevents tapping or falsification by another UE and provides a security function to guarantee privacy of subscribers to a mobile communication network. Particularly, in LTE, basic security functions are classified into three stages, namely LTE authentication, non-access stratum (NAS) security, and access stratum (AS) security. LTE authentication is a process for identifying if the UE that desires to access a mobile communication network is permitted to access the network provided by the corresponding service provider, and NAS security performs integrity checking and ciphering on NAS signaling in a radio link between a mobility management entity (MME) and the UE. AS security functions to safely transfer data on the radio link between the eNB and the UE, and to perform integrity checking and ciphering on an RRC signaling message on a control plane (CP) and performs ciphering on an internet protocol (IP) packet on a user plane (UP). The integrity key and the ciphering key used for the NAS security and the AS security are generated from the highest-level key in the access network, which is KASME. However, since they are acquired through different algorithms, different values are used. This follows a rule for not transmitting a key wirelessly in order to prevent tapping or falsification of a radio link, and each of the UE, the eNB, and the MME generates a key according to a key generation algorithm and verifies the others' keys.

The present disclosure describes a method of reducing complexity in AS security, especially ciphering, in order to decrease the processing load imposed by decryption of user data transmitted at a higher data transmission rate.

Figure 35:
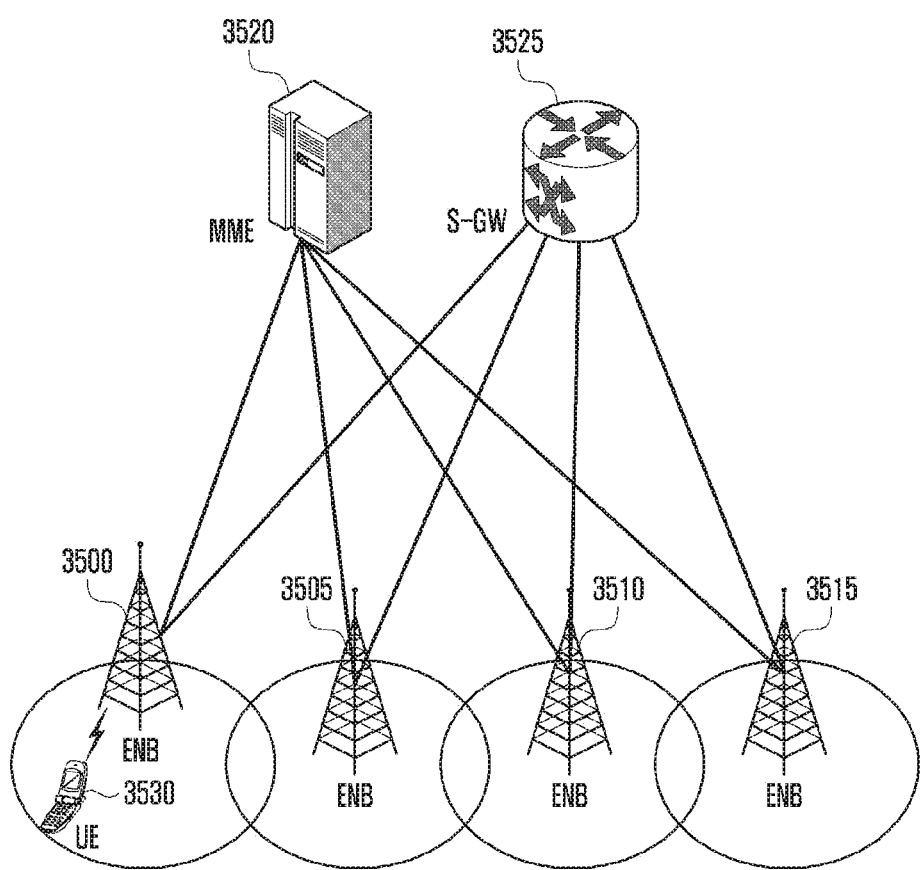
FIG. 35 illustrates the structure of an LTE system to which the present disclosure is applied.

FIG. 35 illustrates the structure of an LTE system to which the present disclosure is applied.

Referring to FIG. 35, the wireless communication system includes a plurality of eNBs 3500, 3510, 3520, and 3530, an MME 3520, and a serving-gateway (S-GW) 3525. A UE 3530 accesses an external network through the eNBs 3500, 3510, 3520, and 3530 and the S-GW 3525. The eNBs 3500, 3510, 3520, and 3530 are access nodes of a cellular network and provide radio access to UEs accessing the network. That is, in order to serve traffic of users, the eNBs 3500, 3510, 3520, and 3530 perform scheduling on the basis of collected status information such as buffer statuses, available transmission power statuses, and channel statuses of UEs and support connection between the UEs and a core network (CN).

The MME 3520 is a device performing a function of managing mobility of the UE and various control functions and is connected to a plurality of eNBs, and the S-GW 3525 is a device providing a data bearer. The MME and the S-GW further perform authentication for the UE accessing the network and bearer management and process packets received from the eNBs 3500, 3510, 3520, and 3530 or packets to be transferred to the eNBs 3500, 3510, 3520, and 3530.

Figure 36:
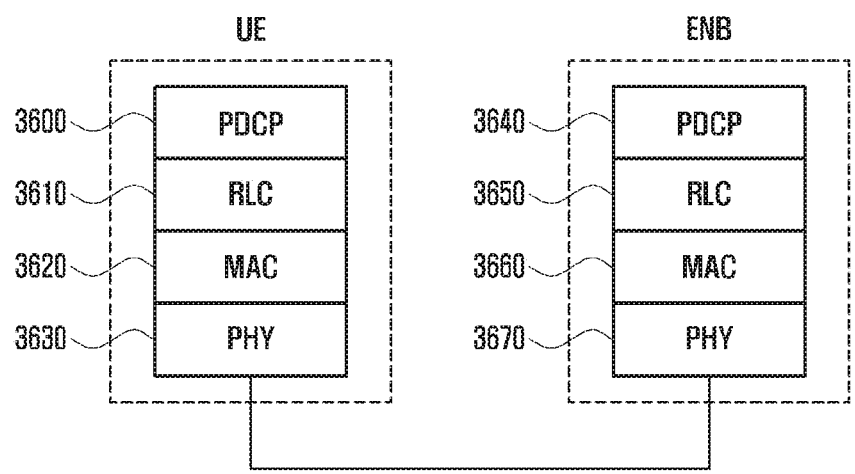
FIG. 36 illustrates a wireless protocol structure of the LTE system to which the present disclosure is applied.

FIG. 36 illustrates a wireless protocol structure of the LTE system to which the present disclosure is applied.

Referring to FIG. 36, the UE and the eNB include packet data convergence protocols (PDCP) 3600 and 3640, radio link controls (RLC) 3610 and 3650, and medium access controls (MAC) 3620 and 3660, respectively, in the wireless protocol of the LTE system. The PDCPs 3600 and 3640 perform an operation of compressing and reconstructing an IP header, and the RLCs 3610 and 3650 reconfigure a PDP packet data unit (PDU) to have a proper size. The MACs 3620 and 3660 are connected with various RLC layer devices included in one UE and perform an operation for multiplexing RLC PDUs to the MAC PDU and de-multiplexing the RLC PDUs from the MAC PDU. The physical layers 3630 and 3670 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer. Further, the physical layer uses hybrid ARQ (HARQ) in order to correct an additional error. A receiving side transmits 1 bit indicating whether a packet transmitted from a transmitting side is received, and the 1 bit is HARQ ACK/NACK information. Downlink HARQ ACK/NACK information for uplink transmission may be transmitted through a physical hybrid-ARQ indicator channel (PHICH), and uplink HARQ ACK/NACK information for downlink transmission may be transmitted through a physical uplink control channel (PUCCH) or a physical uplink shared channel (PUSCH).

Although not illustrated, there is a radio resource control (RRC) layer above the PDCP layer of each of the UE and the eNB, and the RRC layer may transmit and receive an access- and measurement-related configuration control message to control radio resources.

Figure 37:
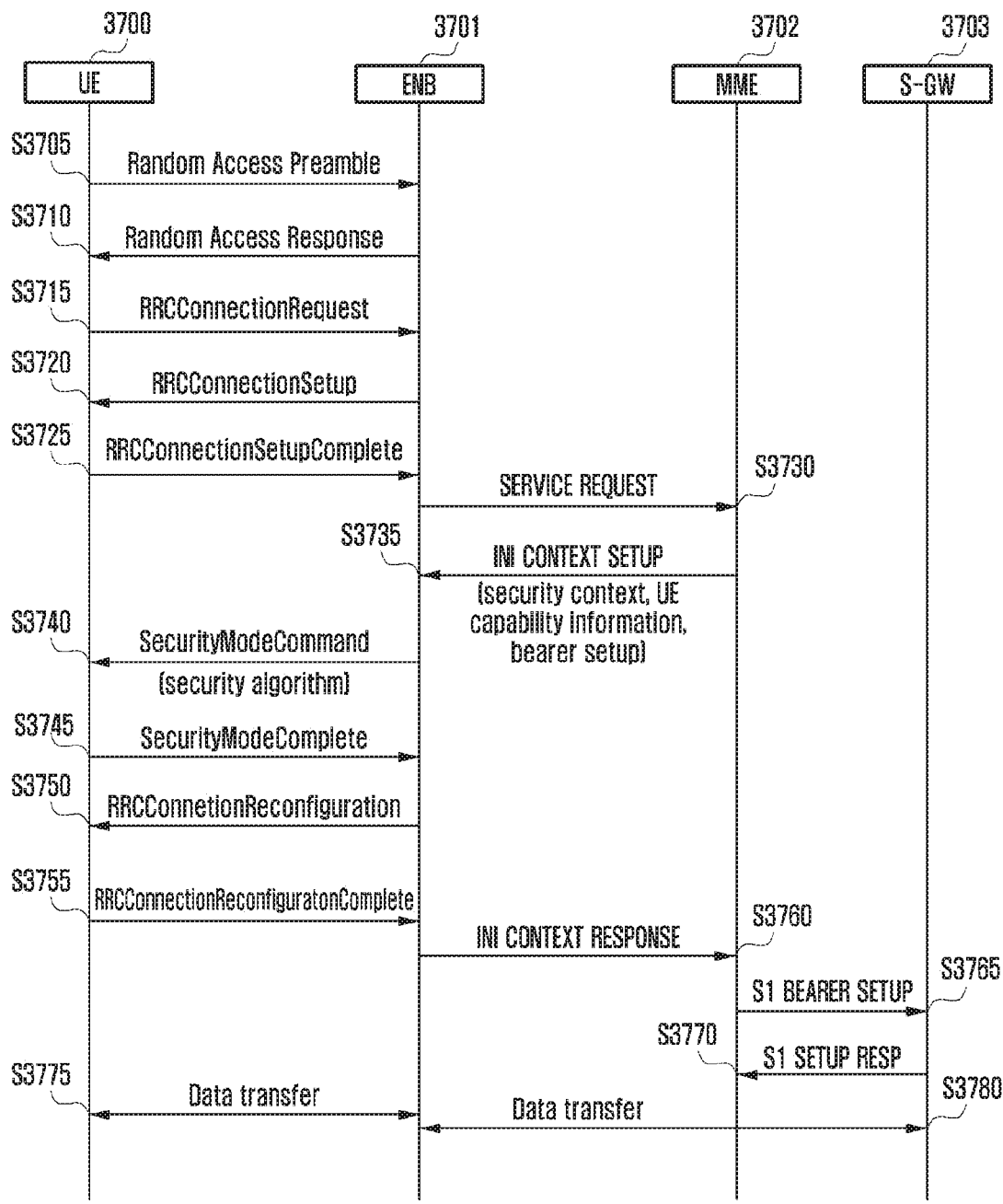
FIG. 37 illustrates a process in which the UE transmits data to the eNB in the LTE system.

FIG. 37 illustrates a process in which the UE transmits data to the eNB in the LTE system.

Referring to FIG. 37, when a UE 3700 having no configured RRC connection accesses the network in the LTE system, the UE performs a random access process. The UE 3700 receives a parameter for random access through system information (SystemInformationBlockType2 (SIB2) broadcasted from an eNB 3701. The system information includes information on a range of a preamble identifier belonging to a random access channel (RACH) preamble group A, information on a range of a preamble identifier belonging to a random access channel (RACH) preamble group B, a threshold value (THRES) of the transmission message size of the UE 3700, and information on an offset (OFFSET) of a channel status. Since the accurate names of parameters are described in 3GPP standard TS 36.331, reference is to be made thereto for more information.

If the UE 3700 selects a preamble group and a preamble, the UE transmits the same to the eNB 3701 through physical random access channel (PRACH) resources in S3705. When receiving the preamble, the eNB 3701 transmits preamble identifier information indicating the received preamble (random access preamble ID (RAPID)), timing advance (TA) information for adjusting uplink timing, uplink resource allocation information (UL grant) for transmitting an RRC-ConnectionRequest message, and temporary UE identifier information (temporary C-RNTI) through a random access response (RAR) message, which is an RACH response message, in S3710. Through the RAR message, the above-described information may be transmitted for a plurality of preambles. In other words, one RAR message may include a plurality of RAPIDs, TAs, pieces of uplink resource allocation information, and pieces of temporary UE ID information. The UE 3700 may distinguish information for the UE itself through the RAPID. If a plurality of UEs uses the same preamble in step S3705, a collision may occur. In such a collision situation, in order to accurately inform which UE transmitted the preamble that is received by the eNB, the eNB 3702 transmits a collision resolution message (RRCConnectionSetup) including unique UE ID information (S-TMSI) or a random number received through the RRCConnectionRequest that the UE transmitted in S3715 to the UE 3700 in S3720. The plurality of UEs using the same preamble for preamble transmission in S3705 receives the RRCConnectionSetup message in S3720 and checks whether unique UE ID information or random number information included therein is the same as the value that the UE previously transmitted in S3715. The UE continues an RRC connection establishment process if the UE ID information or random number information is unchanged and restarts the RACH process if the UE ID information or random number information is has changed.

In the RRC connection establishment process, the UE 3700 establishes backward transmission synchronization with the eNB 3701 through the random access process and transmits the RRCConnectionRequest message to the eNB 3701 in S3715. The message includes a reason to configure the connection to the UE ID. The eNB 3701 transmits the RRCConnectionSetup message together with the collision resolution message to allow the UE 3700 to configure the RRC connection in S3720. The message includes RRC connection configuration information. The RRC connection is also referred to as a signaling radio bearer (SRB), and is used for transmitting and receiving an RRC message, which is a control message, between the UE 3700 and the eNB 3701.

The UE 3700 configuring the RRC connection transmits an RRCConnectionSetupComplete message to the eNB in S3725. The message may include a control message corresponding to a service request by which the UE 3700 makes a request for configuring a bearer for a predetermined service to the MME 3702. The eNB 3701 transmits the service request message included in the RRCConnection-SetupComplete message to the MME 3702 in S3730, and the MME 3702 determines whether to provide the service requested by the UE 3700. If it is determined to provide the service requested by the UE on the basis of the determination result, the MME 3702 transmits a message corresponding to an initial context setup request to the eNB 3701 in S3735. The message includes quality of service (QoS) information to be applied to data radio bearer (DRB) configuration and security-related information to be applied to the DRB (for example, a security key and a security algorithm) In order to configure security with the UE 3700, the eNB 3701 exchanges a SecurityModeCommand message in S3740 and a SecurityModeComplete message in S3745.

When the security configuration is completed through the process, the eNB 3701 transmits an RRCConnectionReconfiguration message to the UE 3700 in S3750. The message includes configuration information of the DRB for processing user data, and the UE 3700 configures the DRB by applying the information and transmits an RRCConnectionReconfigurationComplete message to the eNB 3701 in S3755.

The eNB 3701, having completed the DRB configuration with the UE 3700, transmits an initial context configuration setup complete message to the MME 3702 in S3760, and the MME 3702 receiving the initial context configuration setup complete message exchanges an S1 bearer setup message and an S1 bearer setup response message with the S-GW 3703 in order to configure the S1 bearer in S3765 and S3770. The S1 bearer is a bearer for a data transmission connection configured between the S-GW 3703 and the eNB 3701, and corresponds to the DRB in a one-to-one manner. When the process is fully completed, the UE 3700 transmits and receives data to and from the eNB 3701 through the S-GW 3703 in 53775 and 53780.

Figure 38:
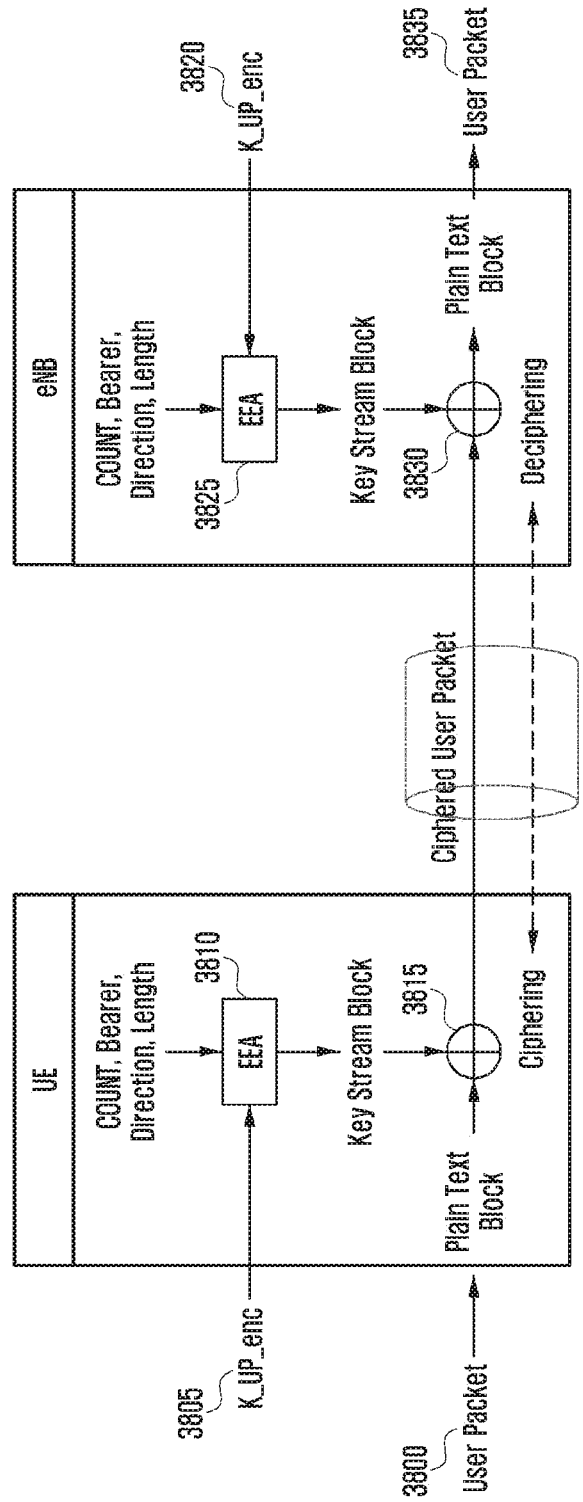
FIG. 38 illustrates a ciphering process in AS security of the LTE system.

FIG. 38 illustrates a ciphering process in AS security of the LTE system.

Referring to FIG. 38, a series of processes for ciphering uplink data of the user generated by the UE, transmitting the data to the eNB, and then deciphering the data are illustrated. Since a backward (downlink) ciphering and deciphering operation can also be equally applied herein, the operation is omitted in FIG. 38. In LTE, all packets are transferred without being ciphered before AS security is activated, and all traffic (CP and UP data) is transmitted while being ciphered after AS security is activated. That is, when the UE and the eNB exchange a SecurityModeCommand message and a SecurityModeComplete message and security configuration is completed, all RRC messages exchanged between the UE and the eNB are transmitted while being integrity-protected and ciphered, and IP packets are transmitted while being ciphered.

If uplink data is generated as indicated by reference numeral 3800 after AS security configuration (setup), the UE performs exclusive OR 3815 on a key stream block and a plain uplink data block acquired through a key generation algorithm (EPS encryption algorithm) 3810 for ciphering of the UE and generates a ciphered user packet. The key stream block for ciphering may be acquired after execution of a key generation algorithm having, as input, parameters such as a key ($K_{Upenc}$) 3805 for ciphering a user plane acquired from a $K_{eNB}$, COUNT (a 32-bit uplink NAS count value), Bearer (bearer identifier), Direction (message transmission direction, 0: uplink and 1: downlink), Length (the length of the key stream block).

The eNB receives the user data packet ciphered by the UE, executes an algorithm such as the key generation algorithm applied by the UE, generates the key stream block, which is the same as that used for ciphering, and performs exclusive OR as indicated by reference numeral 3930. As in the algorithm executed by the UE, the key stream block for ciphering may be acquired with input parameters such as a key ($K_{Upenc}$) 3805 for ciphering a user plane acquired from a KeNB, COUNT (32-bit uplink NAS count value), Bearer (bearer identifier), Direction (message transmission direction, 0: uplink and 1: downlink), Length (a length of the key stream block).

If a data transmission rate increases in the system for ciphering and transmitting all data packets such as the LTE system, the processing load of a receiving side required for deciphering the ciphered data packets increases, which influences system performance. Further, if ciphering is not performed on user data, thus decreasing complexity, security is seriously influenced. Therefore, for data transmission supporting a high data transmission rate and requiring a suitable security level, a new ciphering and deciphering scheme for reducing a processing load and maintaining a security level which is the same as the case in which all data packets are ciphered is required. The operation may be applied to post-LTE next-generation mobile communication system (new RAT (NR)).

In order to solve the problem, the present disclosure proposes a selective ciphering scheme for determining whether to perform ciphering according to a DRB and a data packet and then performing selective ciphering. The present disclosure includes a first method of ciphering and transmitting all data, as in an LTE network, and a second method of selectively ciphering and transmitting data packets according to the DRB type and an indication of the eNB. The first method and the second method may be simultaneously used within one system and the operations may be distinguished according to each DRB.

According to an embodiment, for a service requiring a data transmission rate and a security level which are the same as those of LTE, the first method may be applied to the corresponding DRB. In another embodiment, for a service requiring a higher data transmission rate, the second method may be applied to the corresponding DRB. This may be understood to reduce decryption complexity in reception. Whether the first method or the second method is applied may be indicated to the UE by the eNB through RRC signaling and may be determined according to a predefined rule (selection of a method according to the type of DRB and the service). A hacker who is not aware of a ciphering key may feel that the difficulty of hacking is similar between the case in which all packets are ciphered and that in which some packets are ciphered and others are transmitted in plain text. This is because the hacker does not know which packets are ciphered and which packets are plain text. Particularly, as the ciphering pattern becomes more complex, this tendency further increases.

For the DRB determined to use selective ciphering corresponding to the second method, some data packets are ciphered and the remaining data packets are transmitted in plain text. Selective ciphering includes a first stage of checking a PDCP sequence number (SN) transmitted to the corresponding DRB and determining whether to perform ciphering, a second stage of performing actual ciphering through exclusive OR with a key stream block generated for the packet determined to be ciphered through a ciphering key generation algorithm, and a third stage of concatenating the packet indicated to be not ciphered in the first stage and the packet indicated to be ciphered through the second stage so as to reconfigure the data packet. The selectively ciphered data packet of the user generated through the stages is transmitted through radio resources. The receiving side may perform selective deciphering by inversely applying the ciphering stages on the transmitting side.

Figure 39:
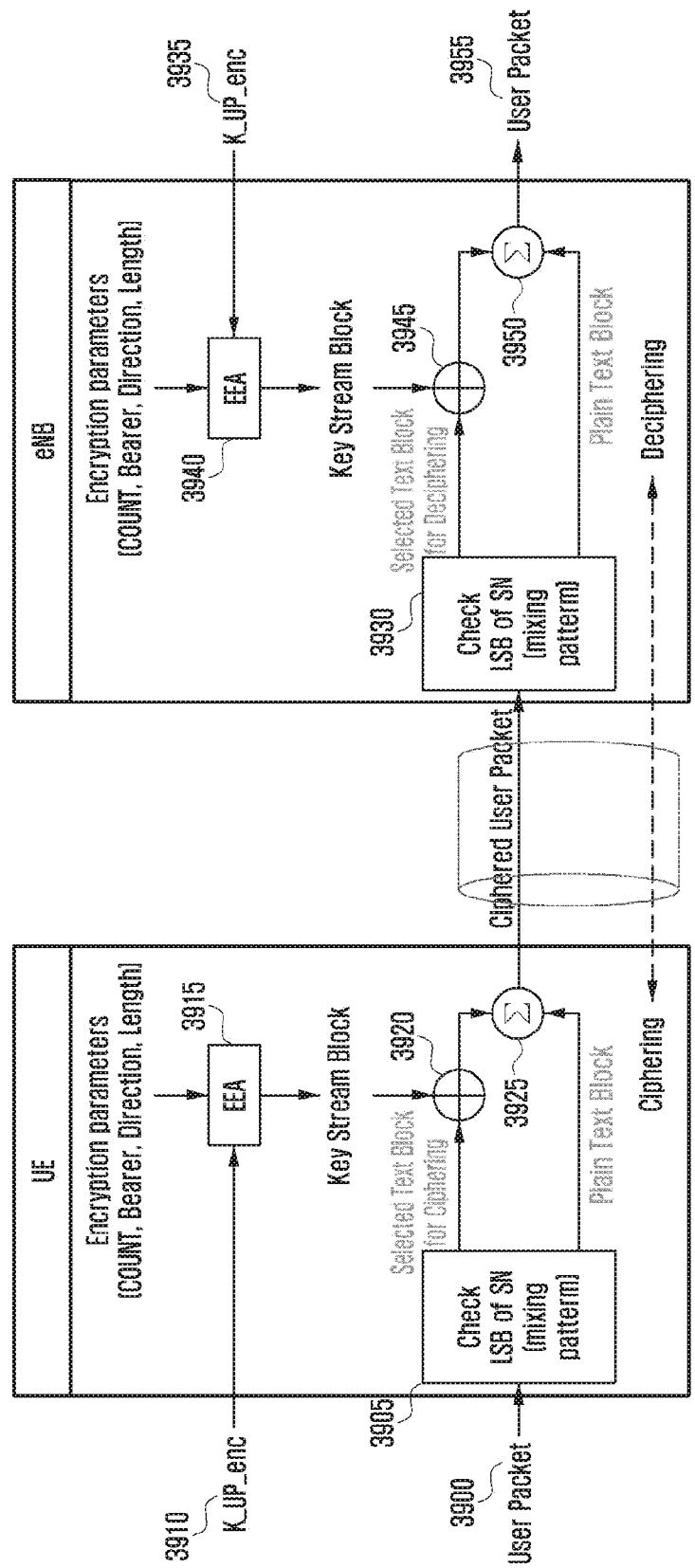
FIG. 39 illustrates a selective ciphering operation proposed by the present disclosure.

FIG. 39 illustrates a selective ciphering operation proposed by the present disclosure.

Referring to FIG. 39, a series of processes in which selective ciphering is performed on uplink data of the user generated by the UE and then the update data is transmitted to the eNB and deciphered is illustrated. Since a backward (downlink) ciphering and deciphering operation can also be equally applied herein, the operation is omitted in FIG. 39.

The eNB determines whether the DRB for corresponding data operates through the first method or the second method according to the type of data packet or the service generated in the UE, as indicated by reference numeral 3900. Whether to apply the first method or the second method may be indicated to the UE by the eNB through RRC signaling and may be determined according to a predefined rule (selection of a method according to the type of DRB and a service). When the data packet determined to operate through the second method is received, the UE determines the packet to be ciphered using a mixing pattern received during the DRB configuration procedure in a first stage 3905.

The mixing pattern may have a variable value (2n bitmap) according to a required security level and complexity, and the eNB may directly transmit the mixing pattern through RRC signaling or indicate the mixing pattern by transmitting an identifier of a predetermined mixing pattern table. Each bit of the bitmap of the received mixing pattern is mapped to LSB n bits of the input PDCP SN. For example, if an 8-bit mixing pattern of 10101100 is received, the corresponding PDCP data packet is ciphered in the case in which LSB 3 bits of the PDCP SN are 000 (decimal 0), 010 (decimal 2), 100 (decimal 4), or 101 (decimal 5), and the corresponding PDCP data packet is not ciphered in the case in which the LSB 3 bits of the PDCP SN are 001 (decimal 1), 011 (decimal 3), 110 (decimal 6), or 111 (decimal 7). Further, a value of the number of pattern repetitions (count_reverting) is defined, and if the number of uses of the mixing pattern reaches the number of pattern repetitions, the mixing pattern bitmap may be used in reverse. This may replace a procedure for receiving a new mixing pattern and may increase security performance compared to the case in which the mixing pattern is not updated. The value of the number of pattern repetitions may be directly transmitted to the UE by the eNB in a DRB setup stage, or may be indicated through an identifier of a table value of a predetermined pattern repetition.

The data packet is ciphered (exclusive OR) 3920 by applying, in the second stage, a key stream block acquired through an LTE-based key generation algorithm 3915 or a new type of key generation algorithm 3915 to the data packet (or text block) determined to be ciphered in the first stage. The input of the key generation algorithm may include a ciphering key ($K_{Upenc}$) 3910 generated by the UE and parameters required for a ciphering algorithm, for example, COUNT, Bearer, Direction, and Length in the LTE system.

In the third stage, the data packet is reconfigured by concatenating the packet indicated not to be ciphered in the first stage and the packet ciphered in the second stage, as indicated by reference numeral 3925. The selectively ciphered data packet of the user generated through the stages is transmitted to the eNB through radio resources. The receiving side may perform selective deciphering by inversely applying the ciphering stages on the transmitting side. First, the ciphered packet and the plain packet are distinguished by comparing the PDCP SN with the mixing pattern as indicated by reference numeral 3930. The ciphered packet is deciphered to the original data packet by regenerating the key stream block used by the UE for ciphering, as indicated by reference numeral 3945. The input of the key generation algorithm used for regenerating the key stream block may include a ciphering key ($K_{Upenc}$) 3935 generated by the eNB and parameters required for a ciphering algorithm, for example, COUNT, Bearer, Direction, and Length. As indicated by reference numeral 3955, the original data packet is reconstructed by concatenating the packet determined not to be ciphered, indicated by reference numeral 3950, and the packet acquired through deciphering.

Figure 40:
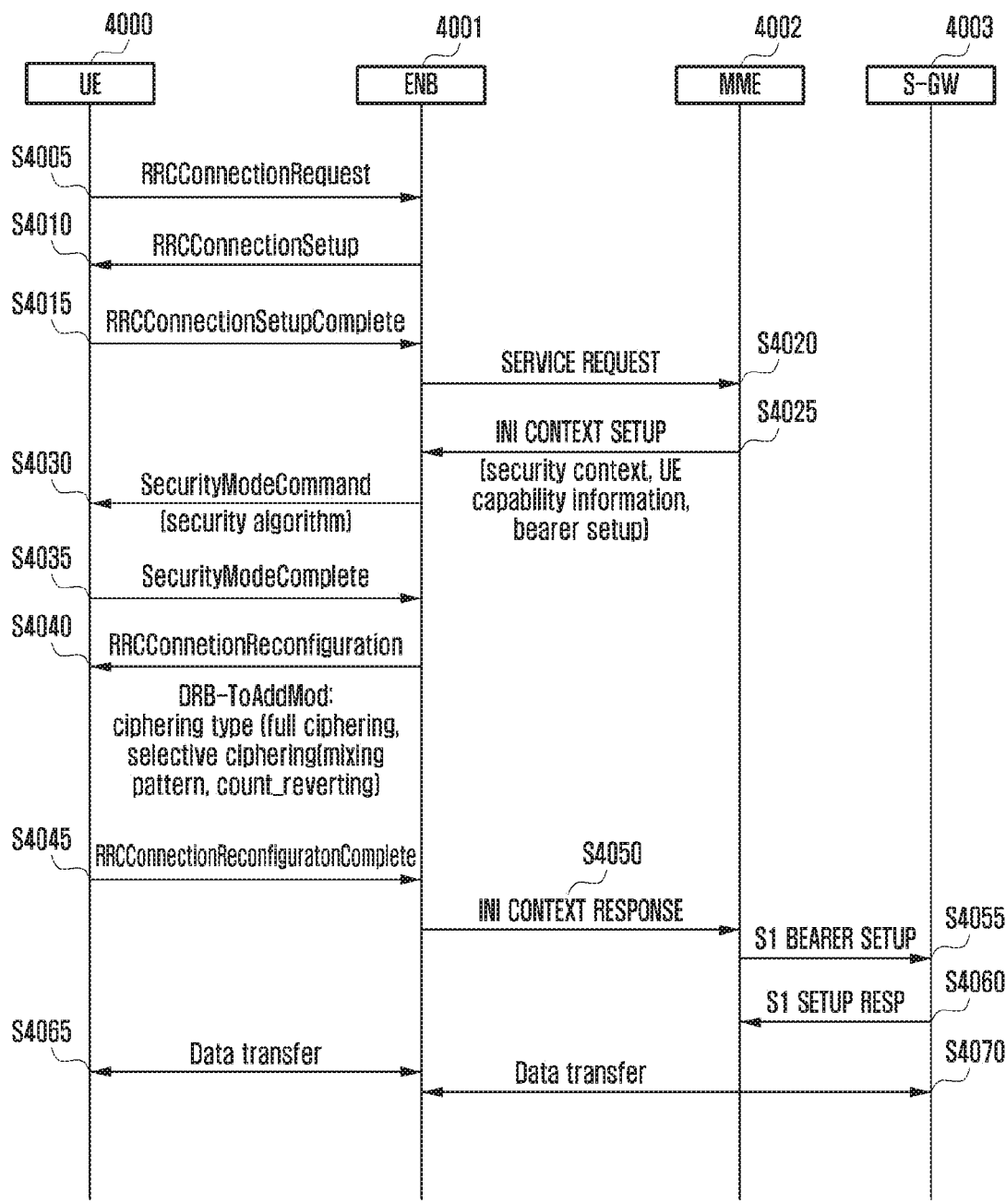
FIG. 40 illustrates an embodiment of a selective ciphering operation corresponding to a second method proposed by the present disclosure.

FIG. 40 illustrates an embodiment of a selective ciphering operation corresponding to a second method proposed by the present disclosure.

The present disclosure proposes a process of transmitting and receiving configuration information and parameters for an embodiment (hereinafter, referred to as a first operation) of selective ciphering proposed by the present disclosure in a message transmission process for data transmission between the UE and the eNB. The first operation of selective ciphering is an operation for directly transmitting, through RRC signaling, parameters such as a mixing pattern and the number of pattern repetitions (count_reverting) for determining whether to perform packet ciphering while the eNB performs a DRB configuration procedure. Further, the first operation of selective ciphering is applied to a DRB determined to pass through selective ciphering.

In the RRC connection establishment process, the UE 4000 establishes backward transmission synchronization with the eNB 4001 through the random access process and transmits the RRCConnectionRequest message to the eNB 4001 in S40055. The message includes a reason to configure the connection to an identifier of the UE 4000. The eNB 4001 transmits an RRCConnectionSetup message together with a collision resolution message to allow the UE 4000 to configure the RRC connection in S4010. The message includes RRC connection configuration information. The RRC connection is also referred to as a signaling radio bearer (SRB), and is used for transmitting and receiving an RRC message, which is a control message between the UE 4000 and the eNB 4001. The UE 4000 configuring the RRC connection transmits an RRCConnectionSetupComplete message to the eNB in S4015. The message includes a control message corresponding to a service request by which the UE 4000 makes a request for configuring the bearer for a predetermined service to the MME 4002.

The eNB 4001 transmits the service request message included in the RRCConnectionSetupComplete message to the MME 4002 in S3720, and the MME 4002 determines whether to provide the service requested by the UE 4000. If it is determined to provide the service requested by the UE on the basis of the determination result, the MME 4002 transmits a message corresponding to an initial context configuration request to the eNB 4001 in S4025. The message includes quality of service (QoS) information to be applied to data radio bearer (DRB) configuration, UE capability information, and security-related information to be applied to the DRB (for example, a security key and a security algorithm).

In order to configure security with the UE 4000, the eNB 4001 exchanges a SecurityModeCommand message and a SecurityModeComplete message in S4030 and S4035. If the security configuration is completed through the process, the eNB 4001 transmits an RRCConnectionReconfiguration message to the UE 4000 in S4040. The message includes configuration information of the DRB for processing user data in a DRB-ToAddMod information element (IE), and corresponds to information for determining the operation of the first method (full ciphering) and the second method (selective ciphering). Further, configuration information for selective ciphering (for example, at least one piece of information on a mixing pattern and the number of pattern repetitions) proposed by the present disclosure may be included in DRB-ToAddMod as the information for configuring the operation of the second method. That is, the eNB may include a predetermined rule or suitable selective ciphering configuration information (for example, at least one of a mixing pattern and the number of pattern repetitions) according to the service required by the UE or the DRB type. Information on the mixing pattern and the number of pattern repetitions may have a variable value (2n bitmap, constant) according to a required security level and complexity.

The UE 4000 configures the DRB by applying DRB configuration information received from the eNB and configuration information for selective ciphering and transmits an RRCConnectionReconfigurationComplete message to the eNB 4001 in S4055. The eNB 4001 completing the DRB configuration with the UE 4000 transmits an initial context configuration completion message to the MME 4002 in S4050, and the MME 4002 receiving the message exchanges an S1 bearer configuration message and an S1 bearer configuration response message with the S-GW 4003 in order to configure the S1 bearer in S4055 and S4060. The S1 bearer is a bearer for a data transmission connection configured between the S-GW 4003 and the eNB 4001 and corresponds to the DRB in a one-to-one manner. When the process is fully completed, the UE 4000 transmits and receives data to and from the eNB 4001 through the S-GW 4003 by applying the selective ciphering configuration in S4065 and 4070.

Figure 41:
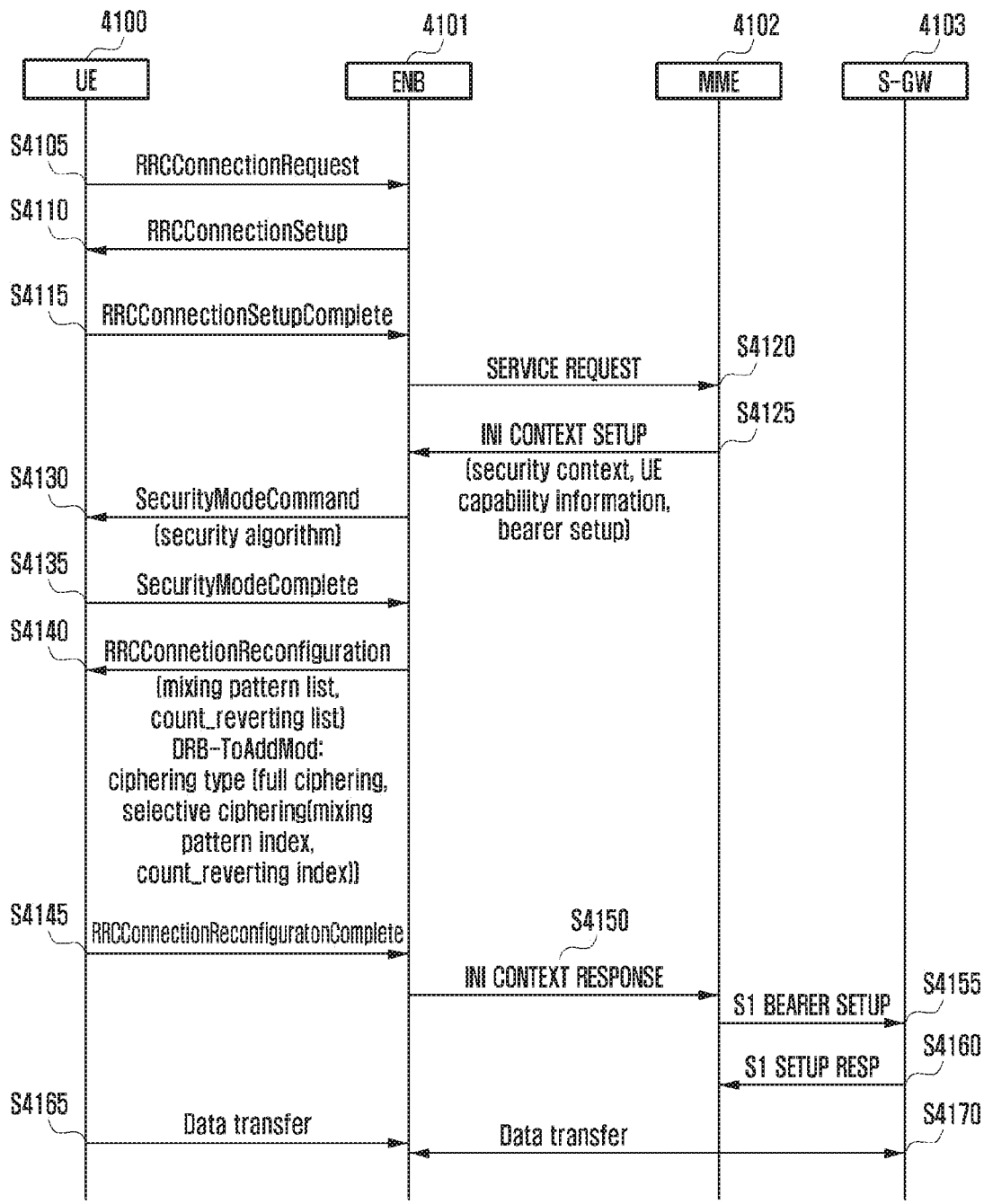
FIG. 41 illustrates an embodiment of the selective ciphering operation corresponding to the second method proposed by the present disclosure.

FIG. 41 illustrates an embodiment of the selective ciphering operation corresponding to the second method proposed by the present disclosure. Specifically, the present disclosure proposes an operation for transmitting and receiving configuration information and parameters for another embodiment (hereinafter, referred to as a second operation) of selective ciphering proposed by the present disclosure in a message transmission process for data transmission between the UE and the eNB. For the second operation of selective ciphering, the eNB transmits an RRCConnectionReconfiguration message including parameters such as a mixing pattern and the number of pattern repetitions (count_reverting) for determining whether to perform packet ciphering in a table form. The corresponding table is listed according to bits or complexity used for a ciphering pattern, and the eNB indicates a mixing pattern to be used for the corresponding DRB by transmitting an identifier of a predetermined table while the DRB configuration procedure is performed. A value of the number of pattern repetitions may be determined in advance with reference to a table, or may be directly designated as a random constant. Similarly, the second operation of selective ciphering is applied to the DRB determined to perform selective ciphering.

In the RRC connection establishment process, the UE 4100 establishes backward transmission synchronization with the eNB 4101 through the random access process and transmits the RRCConnectionRequest message to the eNB 4001 in S4105. The message includes a reason to configure the connection to an identifier of the UE. The eNB 4101 transmits an RRCConnectionSetup message together with a collision resolution message to allow the UE 4100 to configure the RRC connection in S4110. The message includes RRC connection configuration information. The RRC connection is also referred to as a signaling radio bearer (SRB), and is used for transmitting and receiving an RRC message, which is a control message between the UE 4100 and the eNB 4101. The UE 4100 configuring the RRC connection transmits an RRCConnectionSetupComplete message to the eNB in S4115. The message includes a control message corresponding to a service request by which the UE 4100 makes a request for configuring the bearer for a predetermined service to the MME 4102. The eNB 4101 transmits the service request message included in the RRCConnectionSetupComplete message to the MME 4102 in S4120, and the MME 4102 determines whether to provide the service requested by the UE 4100. If it is determined to provide the service requested by the UE on the basis of the determination result, the MME 4102 transmits a message corresponding to an initial context configuration request to the eNB 4001 in S4125. The message includes quality of service (QoS) information to be applied to data radio bearer (DRB) configuration, UE capability information, and security-related information to be applied to the DRB (for example, a security key and a security algorithm).

In order to configure security with the UE 4100, the eNB 4101 exchanges a SecurityModeCommand message and a SecurityModeComplete message in S4130 and S4135. If the security configuration is completed through the process, the eNB 4101 transmits an RRCConnectionReconfiguration message to the UE 4000 in S4140. Through the message, parameters such as a mixing pattern and the number of pattern repetitions for determining whether to perform packet ciphering may be transmitted in a table form. The corresponding table is listed according to bits or complexity used for a ciphering pattern, and information for determining whether the corresponding DRB operates through the first method (full ciphering) or the second method (selective ciphering) (included in a DRB-ToAddMode information element) is also transmitted while the DRB configuration procedure is performed. Further, information indicating the operation through the second method includes a table identifier of the mixing pattern and the number of pattern repetitions to be used for selective ciphering.

That is, the RRCConnectionReconfiguration message includes configuration information of the DRB for processing user data in the DRB-ToAddMod information element, and configuration information (mixing pattern and the number of pattern repetitions) for selective ciphering proposed by the present disclosure may also be included in the DRB-ToAddMod information element. The eNB may allocate a predetermined rule or suitable selective ciphering configuration information (mixing pattern and number of pattern repetitions) according to the service required by the UE or the DRB type. The table of the mixing pattern and the number of pattern repetitions is transmitted as a list in consideration of all options according to a security level and complexity. For example, the mixing pattern and the number of pattern repetitions used for selective ciphering may be defined in the way shown in [Table 1] and [Table 2] below.

TABLE 1

| index | Type of ciphering | DRB Type (length of bitmap) | Mixing pattern |
|---|---|---|---|
| 1 | 0: Full ciphering | 1 | |
| 2 | 1: Selective ciphering | 2 | 1100 |
| 3 | 1: Selective ciphering | 2 | 1010 |
| 4 | 1: Selective ciphering | 2 | 1001 |
| 5 | 1: Selective ciphering | 2 | 0110 |
| 6 | 1: Selective ciphering | 2 | 0101 |
| 7 | 1: Selective ciphering | 2 | 0011 |
| 8 | 1: Selective ciphering | 3 | 11110000 |
| 9 | 1: Selective ciphering | 3 | 11101000 |
| ... | ... | ... | ... |
| 1023 | 1: Selective ciphering | 4 | 1010101011001100 |

TABLE 1-continued

| index | Type of ciphering | DRB Type (length of bitmap) | Mixing pattern |
|---|---|---|---|
| 1024 | 1: Selective ciphering | 4 | 0000111110101111 |

TABLE 2

| Index | count_reverting |
|---|---|
| 1 | 2 |
| 2 | 4 |
| 3 | 8 |
| 4 | 16 |

The UE 4100 configures the DRB by applying DRB configuration information received from the eNB and configuration information for selective ciphering and transmits an RRCConnectionReconfigurationComplete message to the eNB 4101 in S4155. The eNB 4101 completing the DRB configuration with the UE 4100 transmits an initial context configuration completion message to the MME 4102 in S4150, and the MME 4102 receiving the message exchanges an S1 bearer configuration message and an S1 bearer configuration response message with the S-GW 4103 in order to configure the S1 bearer in S4155 and S4160. The S1 bearer is a bearer for a data transmission connection configured between the S-GW 4103 and the eNB 4101 and corresponds to the DRB in a one-to-one manner. When the process is fully completed, the UE 4100 transmits and receives data to and from the eNB 4101 through the S-GW 4103 by applying the selective ciphering configuration in S4165 and S4170.

Figure 42:
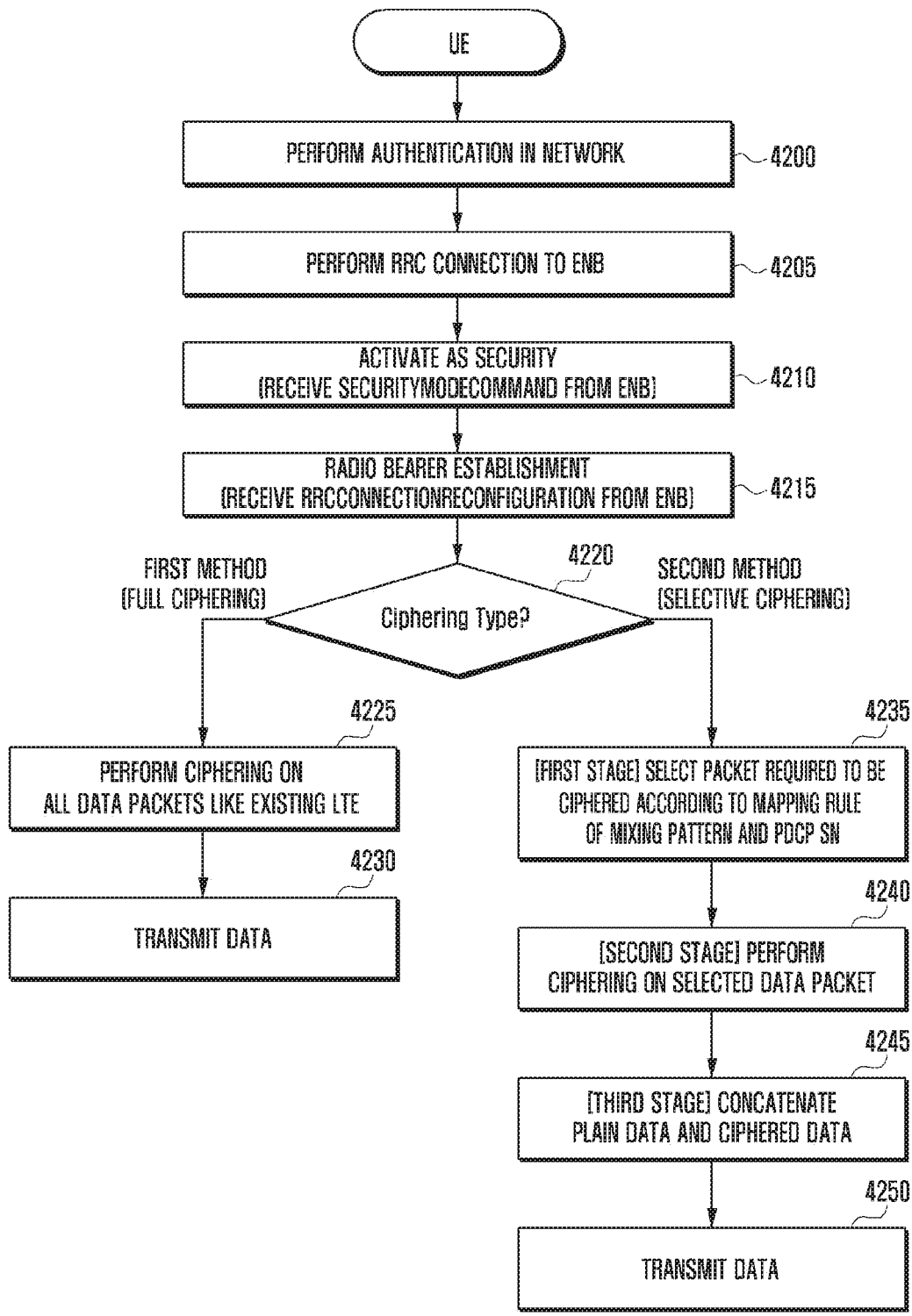
FIG. 42 illustrates an operation of the UE to which selective ciphering proposed by the present disclosure is applied.

FIG. 42 illustrates an operation of the UE to which selective ciphering proposed by the present disclosure is applied.

The UE and the eNB used by the present disclosure may be the existing LTE UE and eNB or a new UE and eNB for next-generation mobile communication (new RAT (NR)). First, an authentication step, in which the UE that desires to access a mobile communication network accesses the network provided by a corresponding service provider and identifies whether connection for service is possible, is performed in S4200. In step 4205, the UE and the eNB establish the RRC connection for data transmission and reception. In step 4210, the UE exchanges a SecurityModeCommand message and a SecurityModeComplete message with the eNB in order to configure security. Since AS security is activated and SRB1 is generated through the process, RRC control messages received thereafter are transmitted while being ciphered.

When the security configuration is completed, the UE receives an RRCConnectionReconfiguration message from the eNB to configure the DRB in step 4215. Parameters, such as a mixing pattern for determining whether to perform packet ciphering and the number of pattern repetitions, which are defined in a table according to each type depending on the number of bits or the complexity used for a ciphering pattern, may be included in the message and transmitted. Further, information for determining whether the corresponding DRB will operate through the first method (full ciphering) or the second method (selective ciphering) may be included (DRB-ToAddMod information element) while the DRB configuration procedure is performed. If an indicator indicating the operation of the second method is included, a mixing pattern and a table identifier of the number of pattern repetitions to be used for selective ciphering may be transmitted through a detailed configuration. If a mixing pattern table for selective ciphering is not configured in the RRCConnectionReconfiguration message, configuration information (mixing pattern and the number of pattern repetitions) for selective ciphering proposed by the present disclosure may be included in the DRB-ToAddMod information element. That is, the UE may receive a predetermined rule or suitable selective ciphering configuration information (mixing pattern and number of pattern repetitions) from the eNB according to a service or the DRB type.

The UE may determine the following operation by identifying information indicating the ciphering type included in the DRB-ToAddMod information element of the RRCConnectionReconfiguration message. Specifically, the UE determines whether the first method is indicated or the second method is indicated in step 4220. If the ciphering-type indication information indicates the first method, the UE performs ciphering on all data packets like conventional LTE in step 4225 and transmits the ciphered data in step 4230. For the DRB determined to use selective ciphering, corresponding to the second method, some data packets are ciphered and the remaining data packets are transmitted in plain text. If the ciphering-type indication information indicates the second method, in step 4240, the UE determines a packet required to be ciphered on the basis of a mapping rule of the mixing pattern and the PDCP SN received in step 4215. This corresponds to the first stage of selective ciphering described above. For the packet determined to be ciphered, the UE performs actual ciphering through exclusive OR with a key stream block generated through a ciphering key generation algorithm in step 4245 (second stage of selective ciphering). At this time, the key stream block used for ciphering may be acquired through the same method as LTE or through a new type of key generation algorithm. For a method of determining a key used for ciphering, reference is to be made to the document "3GPP System Architecture Evolution (SAE); Security Architecture", 3GPP TS 33.401. The UE reconfigures the data packet by concatenating the packet indicated not to be ciphered in the first stage 4235 and the data packet ciphered through the second stage 4240 in step 4545 (third stage of selective ciphering), and transmits the reconfigured data packet to which selective ciphering is applied in step 4250.

Figure 43:
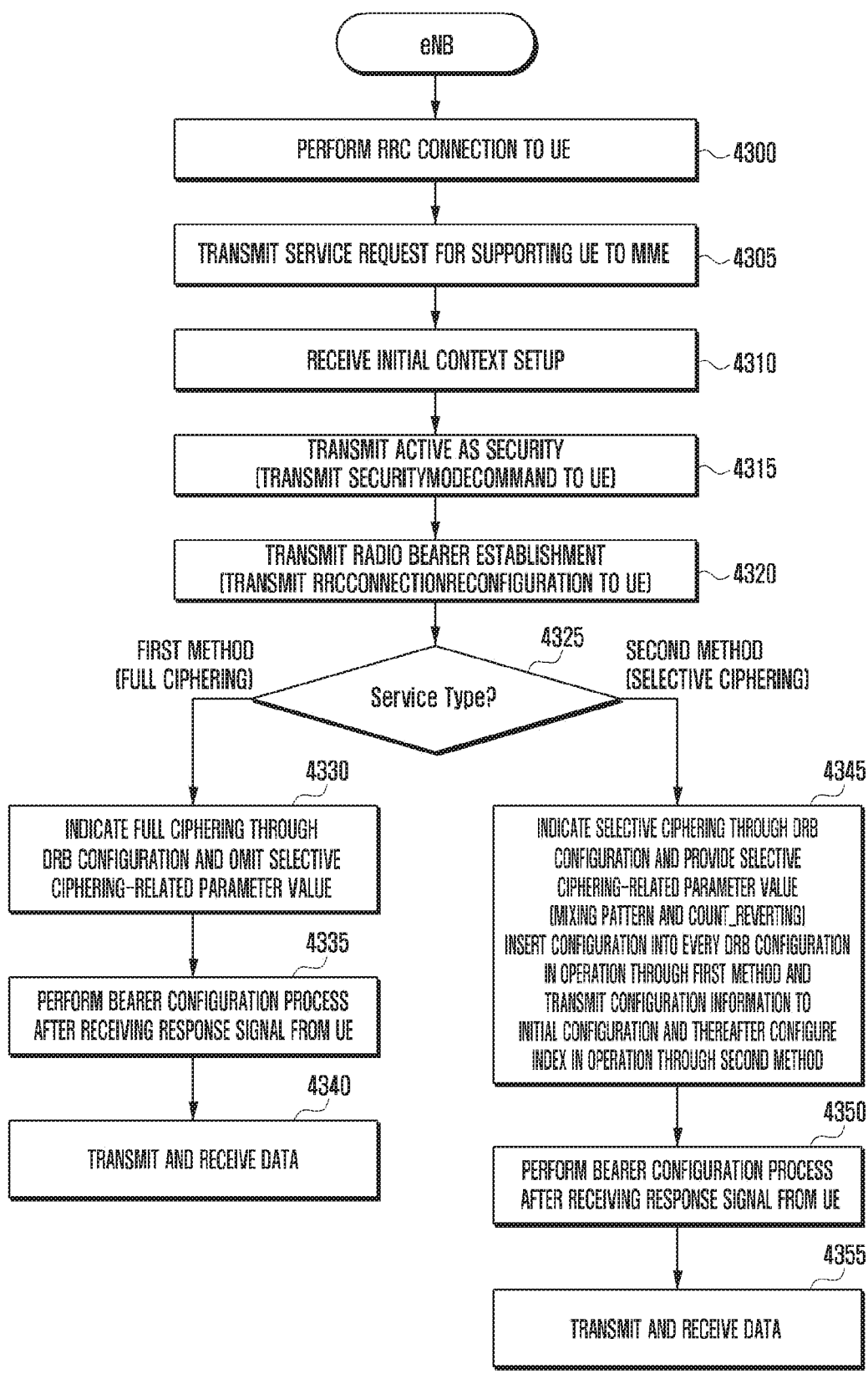
FIG. 43 illustrates an operation of the eNB according to an embodiment of the present disclosure.

FIG. 43 illustrates an operation of the eNB according to an embodiment of the present disclosure.

In step 4300, the UE and the eNB establish the RRC connection for data transmission and reception. The eNB transmits a service request message for supporting the UE connected to the MME to the eNB in step 4305, and the eNB receives an initial context configuration message including a security context for the UE, UE capability information, and bearer configuration information from the MME in step 4310. In step 4315, the eNB exchanges a SecurityModeCommand message and a SecurityModeComplete message with the UE in order to configure security. Since AS security is activated and SRB1 is generated through the process, RRC control messages received thereafter are transmitted while being ciphered.

When security configuration is completed, the eNB transmits an RRCConnectionReconfiguration message in order to configure the DRB for the UE in step 4320. The message may include parameters, such as a mixing pattern for determining whether to perform packet ciphering and the number of pattern repetitions, which are defined in a table according to the type depending on the number of bits or the complexity used for a ciphering pattern. Further information for determining whether the corresponding DRB operates through the first method or the second method may be included in the DRB-ToAddMod information element while the DRB configuration procedure is performed. The eNB determines information to be included in step 4325.

If the information indicating the operation through the second method is included, a mixing pattern and a table identifier of the number of pattern repetitions to be used for selective ciphering may be transmitted to the UE through a detailed configuration. The eNB may basically determine a ciphering method depending on the service to be supported for the UE. For example, the first method may be configured in a signal or a control signal requiring high-reliability transmission such as URLLC, and the second method may be applied to a data packet requiring a high data transmission rate. The eNB may configure a mixing pattern table for selective ciphering in an RRCConnectionReconfiguration message and transmit the message through the transmission operation, and configuration information (mixing pattern and the number of pattern repetitions) for selective ciphering proposed by the present disclosure may be included in the DRB-ToAddMod information element. That is, the eNB may transmit a predetermined rule or suitable selective ciphering configuration information (mixing pattern and the number of pattern repetitions) according to the service or the DRB type.

If the information indicating the operation through the first method is included in step 4325, information indicating full ciphering may be included in the DRB-ToAddMod information element of the RRCConnectionReconfiguration message, and transmission of a selective ciphering-related parameter value may be omitted in step 4330. Thereafter, the eNB performs a bearer configuration process with the MME and the SGW after receiving a response signal from the UE in step 4335 and transmits and receives data to and from the UE through the configured bearer in step 4340.

If the information indicating the operation through the second method is included in step 4325, it is determined to use selective ciphering, so that the eNB inserts information indicating selective ciphering into the DRB-ToAddMod information element of the RRCConnectionReconfiguration message and also inserts parameters (mixing pattern and the number of pattern repetitions) for ciphering some data packets and transmitting the remaining data packets in plain text in step 4345. If the UE and the eNB operate through the method illustrated in FIG. 40, the configuration is inserted into every DRB configuration. If the UE and the eNB operate through the method illustrated in FIG. 41, configuration information (in a table form) related to the mixing pattern and the number of pattern repetitions is transmitted at the time of initial configuration, and thereafter table indexes are configured in step 4345. Thereafter, the eNB performs a bearer configuration process with the MME and the SGW after receiving a response signal from the UE in step 4350 and transmits and receives data to and from the UE through the configured bearer in step 4355.

Figure 44:
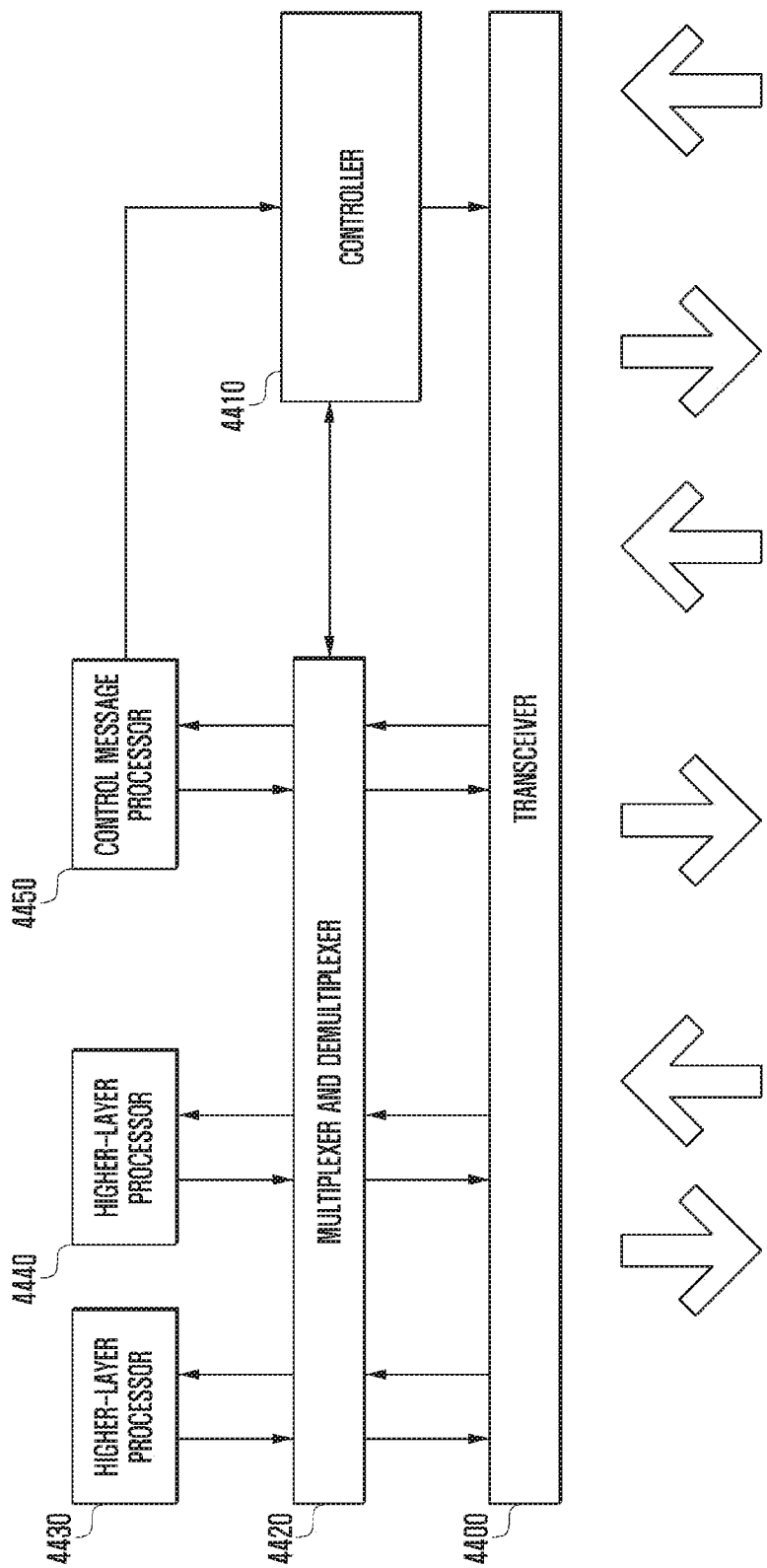
FIG. 44 is a block diagram illustrating the configuration of the UE according to an embodiment of the present disclosure.

FIG. 44 is a block diagram illustrating the configuration of the UE according to an embodiment of the present disclosure.

As illustrated in FIG. 44, the UE according to an embodiment of the present disclosure includes a transceiver 4400, a controller 4410, a multiplexer and demultiplexer 4420, various higher-layer processors 4430 and 4440, and a control message processor 4450. The transceiver 4400 receives data and a predetermined control signal through a forward channel of a serving cell, and transmits data and a predetermined control signal through a backward channel. When a plurality of serving cells is set, the transceiver 4400 transmits and receives data and a control signal through the plurality of serving cells. The multiplexer and demultiplexer 4420 multiplexes data generated by the higher-layer processors 4430 and 4440 or the control message processor 4450, or de-multiplexes data received by the transceiver 4400 to transmit the data to the suitable higher-layer processors 4430 and 4440 or the control message processor 4450. The control message processor 4450 transmits and receives a control message from the eNB and performs a necessary operation. The operation includes a function of processing control messages such as an RRC message and a MAC control element (CE). The higher-layer processors 4430 and 4440 are DRB devices and may be configured for each service. The higher-layer processor processes data generated by a user service, such as a file transfer protocol (FTP) or Voice-over-Internet protocol (VoIP), and transfers the processed data to the multiplexer and demultiplexer 4420, or processes data transferred from the multiplexer and demultiplexer 44420 and transfers the processed data to a service application of a higher layer. The controller 4410 identifies a scheduling instruction received through the transceiver 4400, for example, backward grants, and controls the transceiver 4400 and the multiplexer and demultiplexer 4420 to perform backward transmission through suitable transmission resources at an appropriate time point. Meanwhile, it has been described that the UE includes a plurality of blocks and that respective blocks perform different functions, but this is only an embodiment, and the present disclosure is not necessarily limited thereto. For example, the function performed by the demultiplexer 4420 may be performed by the controller 4410.

Figure 45:
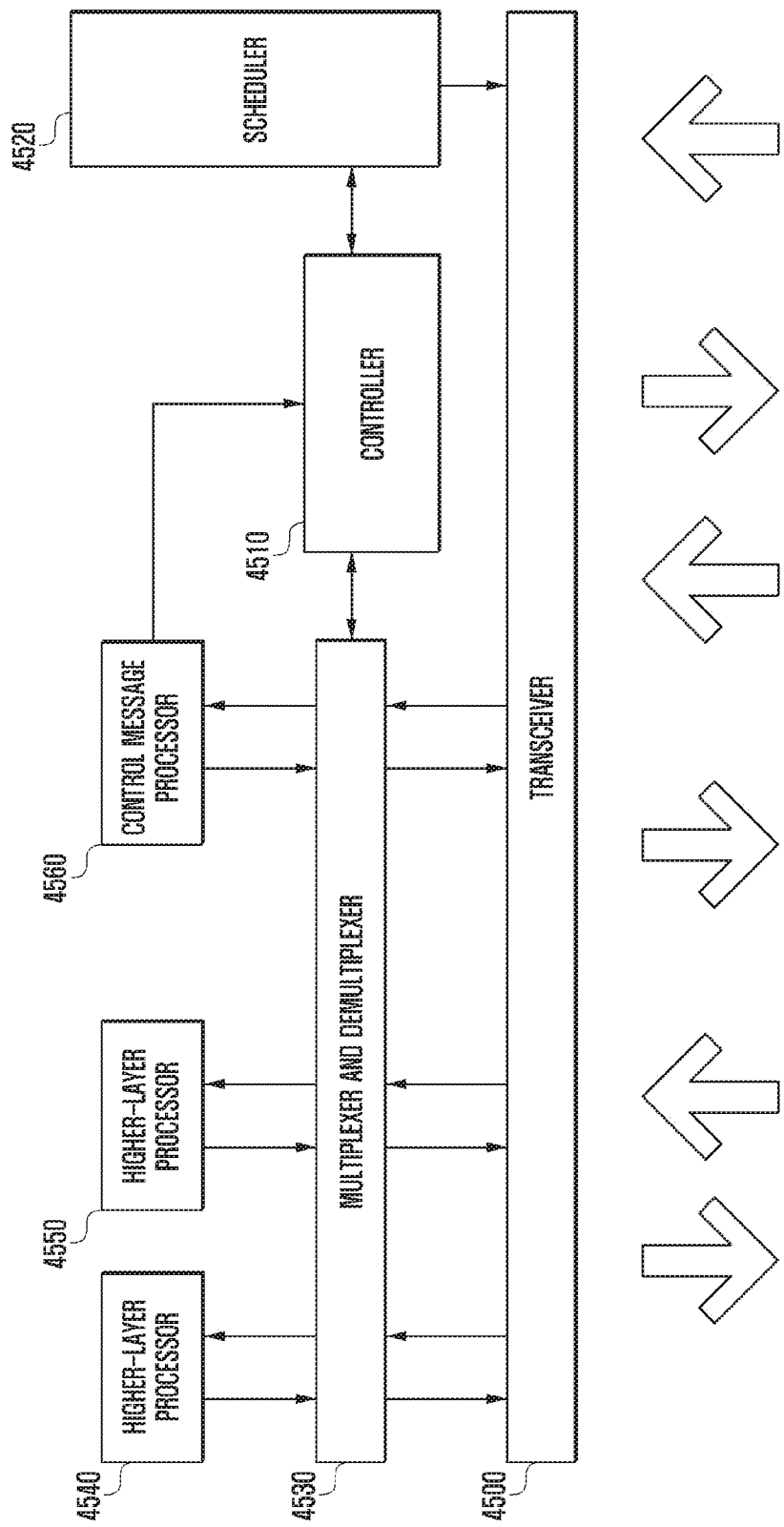
FIG. 45 is a block diagram illustrating the configuration of the eNB according to an embodiment of the present disclosure.

FIG. 45 is a block diagram illustrating the configuration of the eNB according to an embodiment of the present disclosure.

As illustrated in FIG. 45, the eNB according to the present disclosure may include a transceiver 4500, a controller 4510, a scheduler 4520, a multiplexer and demultiplexer 4530, various higher-layer processors 4540 and 4550, and a control message processor 4560.

The transceiver 4500 transmits data and a predetermined control signal through a forward carrier and receives data and a predetermined control signal through a backward carrier. When a plurality of carriers is configured, the transceiver 4500 transmits and receives data and a control signal through the plurality of carriers. The multiplexer and demultiplexer 4530 serves to multiplex data generated by the higher-layer processors 4540 and 4550 or the control message processor 4560 or to de-multiplex data received by the transceiver 4500 and transfer the data to the suitable higher-layer processors 4540 and 4550, the control message processor 4560, or the controller 4510. The control message processor 4560 performs necessary operations by processing a control message such as an RRC message transmitted by the UE or a MAC CE, or generates a control message to be transferred to the UE and transfers the generated control message to a lower layer. The higher-layer processors 4540 and 4550 may be configured for each UE or each service, and may process data generated by a user service, such as a file transfer protocol (FTP) or Voice-over-Internet protocol (VoIP), and transfer the processed data to the multiplexer and demultiplexer 4530, or process data transferred from the multiplexer and demultiplexer 4530 and transfer the processed data to a service application of a higher layer. The scheduler 4520 allocates transmission resources to the UE at a suitable time point in consideration of the buffer status of the UE, the channel status, the active time of the UE, and the service request, and processes a signal, which the UE transmits to the transceiver 4000, or transmits the signal to the UE.

In the above-described detailed embodiments of the present disclosure, the number of elements included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, multiple elements expressed in the description may be configured into a single element or a single element in the description may be configured into multiple elements.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

Fifth Embodiment

In the following description, terms for identifying access nodes, terms referring to network entities, terms referring to messages, terms referring to interfaces between network entities, and terms referring to various pieces of identification information are used for convenience of description. Therefore, the present disclosure is not limited by the terminologies provided below, and other terms that indicate subjects having equivalent technical meanings may be used.

For convenience of description, the present disclosure uses terms and names defined in $3^{rd}$ generation partnership project, long-term evolution (3GPP LTE), which is the most recent standard among existing communication standards. However, the present disclosure is not limited to the terms and names, and may be equally applied to a system according to another standard. Particular, the present disclosure may be applied to 3GPP new radio (NR, $5^{th}$ generation mobile communication standard).

Figure 46:
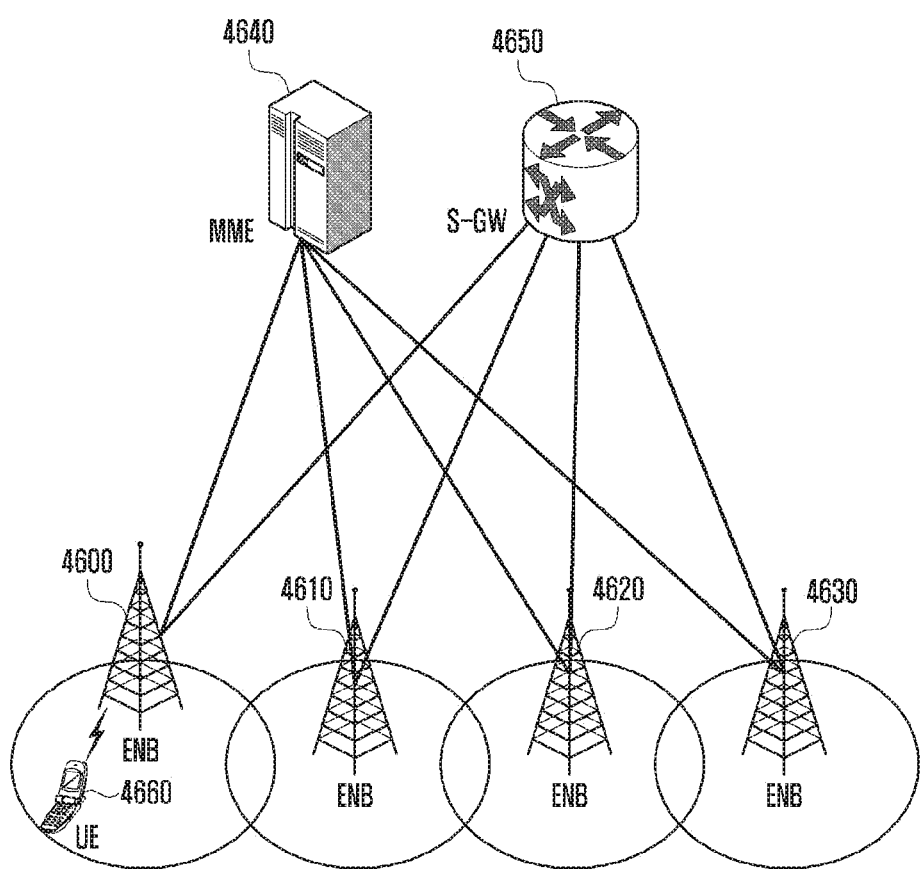
FIG. 46 illustrates the structure of the LTE system which can be referred to for description of the present disclosure.

FIG. 46 illustrates a structure of the LTE system which can be referred to for description of the present disclosure.

Referring to FIG. 46, the wireless communication system includes a plurality of eNBs 4600, 4610, 4620, and 4630, a mobility management entity (MME) 4640, and a serving-gateway (S-GW) 4650. A User Equipment (hereinafter, referred to as a UE or a terminal) 4660 accesses an external network through the eNBs 4600, 4610, 4620, and 4630 and the S-GW 4650.

The eNBs 4600, 4610, 4620, and 4630 are access nodes of a cellular network and provide radio access to UEs accessing the network. That is, in order to serve traffic of users, the eNBs 4600, 4610, 4620, and 4630 performs scheduling on the basis of collected status information such as buffer statuses, available transmission power statuses, and channel statuses of UEs and support connection between the UEs and a core network (CN). The MME 4640 is a device performing a function of managing mobility of the UE and various control functions and is connected to a plurality of eNBs, and the S-GW 4650 is a device providing a data bearer. The MME 4640 and the S-GW 4650 further perform authentication for the UE accessing the network and bearer management and process packets received from the eNBs 4600, 4610, 4620, and 4630 or packets to be transferred to the eNBs 4600, 4610, 4620, and 4630.

Figure 47:
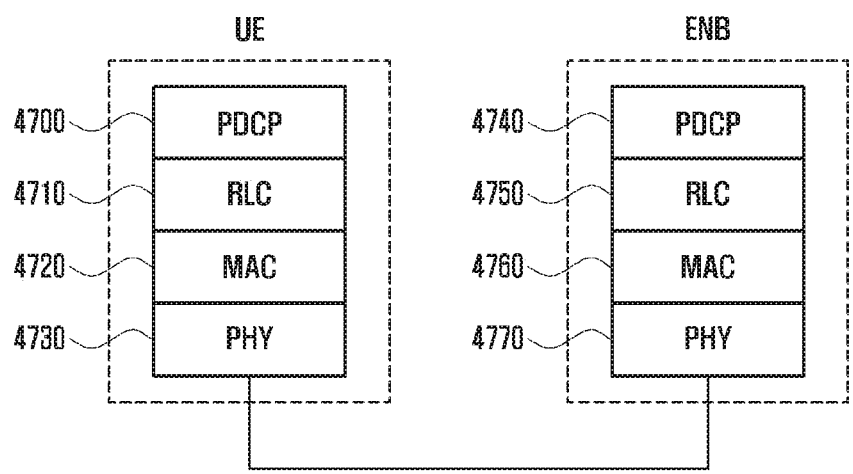
FIG. 47 illustrates the structure of a wireless protocol of the LTE system which can be referred to for description of the present disclosure.

FIG. 47 illustrates the structure of a wireless protocol of the LTE system, which can be referred to for description of the present disclosure.

Referring to FIG. 47, the UE and the eNB include packet data convergence protocols (PDCP) 4700 and 4740, radio link controls (RLC) 4710 and 4750, and medium access controls (MAC) 4720 and 4760, respectively, in the wireless protocol of the LTE system. The PDCPs 4700 and 4740 perform an operation of compressing and reconstructing an IP header, and the RLCs 4710 and 4750 reconfigure a PDP packet data unit (PDU) to have a proper size. The MACs 4720 and 4760 are connected with various RLC layer devices included in one UE and perform an operation for multiplexing RLC PDUs to the MAC PDU and de-multiplexing the RLC PDUs from the MAC PDU.

The physical layers 4730 and 4770 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer. Further, the physical layer uses hybrid ARQ (HARQ) to correct an additional error, and a receiving side transmits 1 bit of information on whether a packet transmitted by a transmitting side was received. The 1 bit of information is referred to as HARQ ACK/NACK information. Downlink HARQ ACK/NACK information for uplink transmission may be transmitted through a physical hybrid-ARQ indicator channel (PHICH), and uplink HARQ ACK/NACK information for downlink transmission may be transmitted through a physical uplink control channel (PUCCH) or a physical uplink shared channel (PUSCH).

The HARQ transmission scheme includes asynchronous HARQ and synchronous HARQ. Asynchronous HARQ is a scheme in which, if (re)transmission fails, the timing at which retransmission is performed is not fixed. Synchronous HARQ is a scheme in which, if (re)transmission fails, the timing at which retransmission is performed is fixed (for example, 8 ms). A plurality of transmissions/receptions may be simultaneously performed in parallel for downlink and uplink of the UE, and each transmission is identified by an HARQ process identifier.

Meanwhile, since retransmission timing is not determined in asynchronous HARQ, information indicating which HARQ process includes this transmission and information on whether this transmission is initial transmission or retransmission are provided by the eNB through a physical downlink control channel (PDCCH) in every transmission. Specifically, the information indicating which HARQ process includes this transmission is transmitted through an HARQ process ID field within downlink control information (DCI) transmitted through the PDCCH, and the information on whether this transmission is initial transmission or retransmission is indicated through a new data indicator (NDI) bit within the PDCCH. The NDI corresponds to retransmission if the corresponding bit is not changed compared to the existing value, and corresponds to new transmission when the corresponding bit is changed to another value. Accordingly, the UE detects a detailed matter for the corresponding transmission by receiving resource allocation information within the DCI transmitted by the eNB. The UE receives downlink data through a physical downlink shared channel (PDSCH) in the downlink and transmits uplink data through a physical uplink shared channel (PUSCH) in the uplink.

Although not illustrated, there is a radio resource control (RRC) layer above the PDCP layer of each of the UE and the eNB, and the RRC layer may transmit and receive an access- and measurement-related configuration control message to control radio resources.

Figure 48:
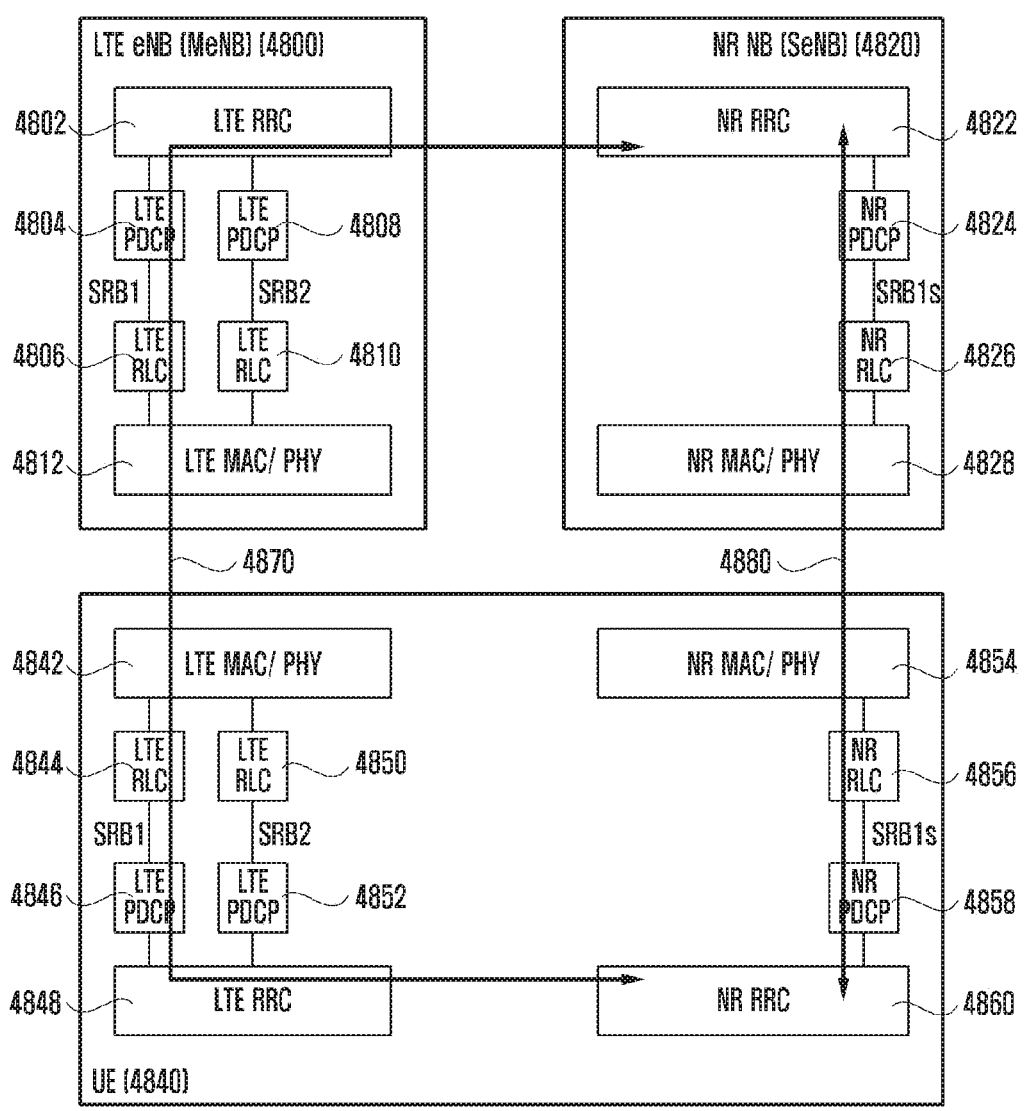
FIG. 48 illustrates a connection structure between the UE and different eNBs to which the present disclosure is applied.

FIG. 48 illustrates a connection structure between the UE and different types of eNBs to which the present disclosure is applied.

In FIG. 48, a scenario is assumed in which a UE 4840 simultaneously accesses a 4G NB (LTE evolved Node B (LTE eNB)) 4800 and a 5G NB (new radio Node B (NR NB)) 4820. That is, a scenario is assumed in which the UE is simultaneously connected to different types of eNBs using different technologies. As described above, if the two eNBs are connected to the UE, the eNBs are divided into a master eNB (MeNB) and a secondary eNB (SeNB) according to their roles. Although the scenario in which, among two eNBs, the LTE eNB is an MeNB and the 5G NB is an SeNB is described in FIG. 48, the present disclosure can be applied to the following combinations.

Scenario 1: MeNB: LTE (4G), SeNB: LTE (4G)
Scenario 2: MeNB: LTE (4G), SeNB: NR (5G)
Scenario 3: MeNB: NR (5G), SeNB: LTE (4G)
Scenario 4: MeNB: NR (5G), SeNB: NR (5G)

Meanwhile, in FIG. 48, it is assumed that there is an RRC layer performing separate control in each eNB of the different types of eNBs. Accordingly, it is assumed that the LTE eNB and the NR NB have respective RRC layers (RRC layer 4802 in the case of the LTE eNB and RRC layer 4822 in the case of the NR NB), and the UE simultaneously connected to both the eNBs has RRC layers 4848 and 4860 corresponding thereto. Further, in order to transmit a message generated by each RRC layer, a packet should be transmitted through PDCP, RLC, and MAC layers which are the same as or similar to those illustrated in FIG. 47. To this end, it is required to generate a "channel" for each traffic having a similar characteristic. The "channel" is referred to as a bearer. For example, a bearer for transmitting and receiving a control message and a bearer for transmitting and receiving user data are separately generated, wherein the bearer for transmitting and receiving the control message is referred to as a signaling radio bearer (SRB) and the bearer for transmitting and receiving the user data is referred to as a data radio bearer (DRB). Further, there is a plurality of bearers according to the signaling type and there are SRB1 and SRB2 between the LTE eNB and the UE in FIG. 48.

Although the UE and the BS have the RRC layers, important configuration information is transmitted through the MeNB as indicated by reference numeral 4870. Meanwhile, since it is assumed that different types of eNBs are merged in the present disclosure, a scenario in which particular configuration information is directly transmitted to the SeNB without passing through the MeNB may be considered. Accordingly, the present disclosure proposes the use of an additional signaling radio bearer (SRB1s) 4880. If the SRB1s is additionally introduced, a rule for transmitting a particular message generated by the NR NB and/or the LTE eNB or generated by the UE to the UE or a particular eNB and/or both eNBs is required.

With respect to downlink messages (message transmitted from the eNB to the UE), the present disclosure proposes that the SRB1s be used for transmitting independent configuration information specific to the SeNB (which is described as the NR NB in the present disclosure, but may be changed depending on the scenario) among messages generated by the SeNB (which is described as the NR NB in the present disclosure, but may be changed depending on the scenario). The corresponding message is a message that can be directly interpreted by an NR RRC 4860 of the UE. That is, the message that the UE receives through the SRB1s can be interpreted by the NR RRC without being transferred to an LTE RRC 4848, and thus corresponding configuration information can be processed.

Further, the present disclosure proposes that SRB1, which is a signaling radio bearer of LTE, be used for transmitting configuration information influenced by LTE configuration information among the messages generated by the SeNB. To this end, a container message or a container field within the existing LTE message may be defined in the LTE standard to carry the message generated by the SeNB and the (RRC) message generated by the SeNB may be carried thereon and transmitted. The UE receiving the container message or the container field may transfer the corresponding message to the NR RRC and thus the NR RRC may process the corresponding information.

Further, with respect to the uplink messages (messages transmitted from the UE to the eNB), two situations may broadly be considered. A first scenario is a scenario in which the eNB transmits a response message in response to a message transmitted to the UE, in which case the present disclosure proposes that an uplink message response message be transmitted to the eNB that transmitted the downlink message. The response message may include, for example, an RRCConnectionReconfiguration Complete message or various confirmation messages. A second scenario is a scenario in which the UE transmits a message to the UE for itself, in which case the present disclosure proposes a method by which the UE follows a specified rule to transmit a particular message to a particular eNB (which may be defined in the standard) or a method by which, when transmitting the corresponding message, the UE receives, from the eNB, a configuration indicating the eNB to which the corresponding message is transmitted and follows the configuration. Particularly, in the method by which the eNB directly configures the eNB to which the uplink message is transmitted, the UE may be configured to use at least one method of transmitting the corresponding message to the MeNB, transmitting the corresponding message to the SeNB, transmitting the corresponding message to either of them (that is, transmitting the message to any of the two eNBs) and transmitting the corresponding message to both of them (that is, transmitting the message to the two eNBs).

Further, the present disclosure proposes a scheme of transmitting the same message to different eNBs according to corresponding information of the message. For example, if it is configured to report the measurement result for a currently connected serving cell and a non-connected neighboring cell to the UE, the eNB configuring the corresponding measurement may configure the UE to report the measurement result from a frequency related to LTE to the MeNB and the measurement result from a frequency related to NR to the SeNB.

Figure 49:
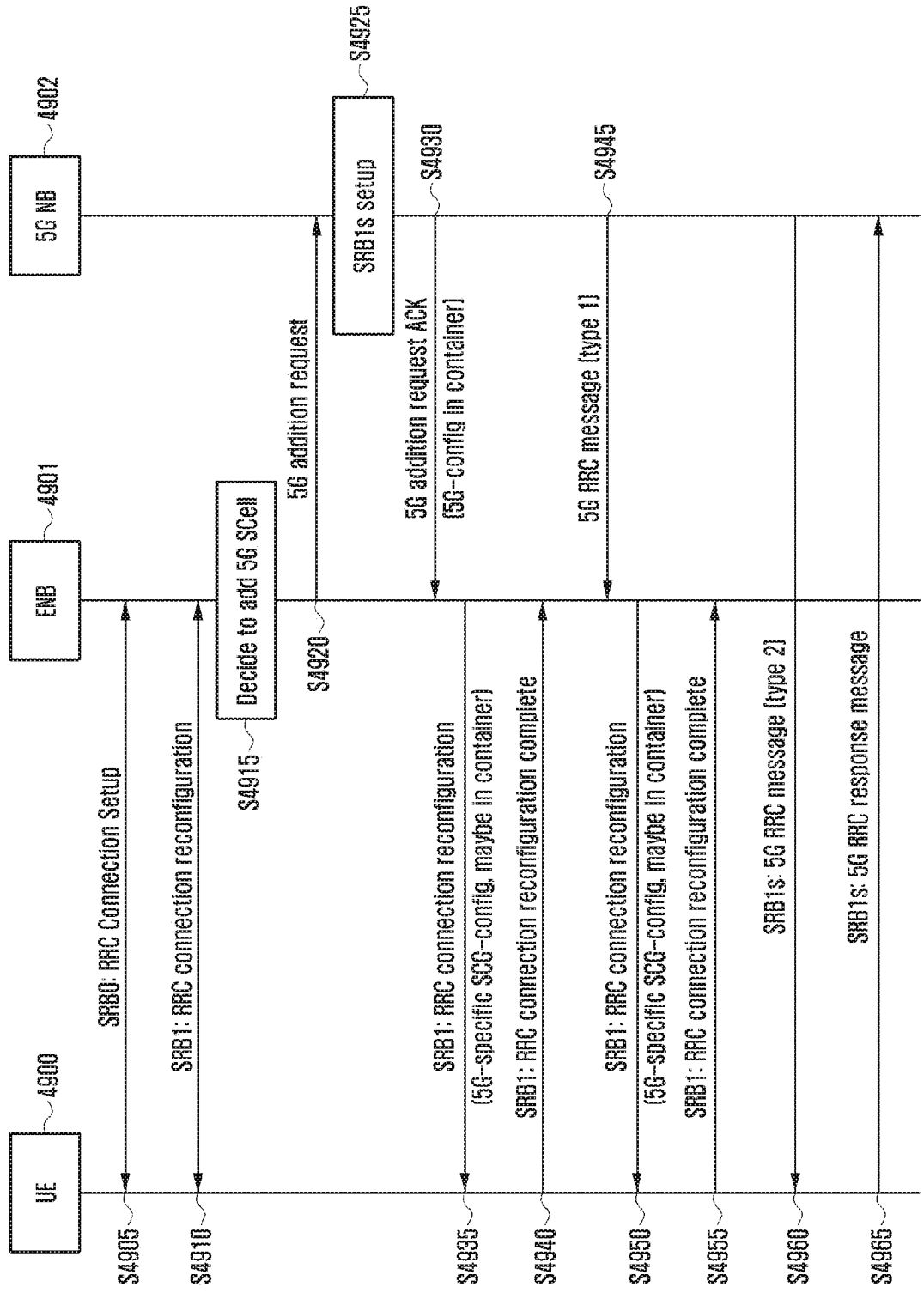
FIG. 49 illustrates a flow of messages for configuring a signaling bearer when a signaling message transmission method proposed by the present disclosure is used.

FIG. 49 illustrates the flow of messages for configuring a signaling bearer when a signaling message transmission method proposed by the present disclosure is used. In FIG. 49, it is assumed that the LTE eNB is an MeNB and that the NR NB is an SeNB, as in the above-described example, but this varies depending on the scenario.

Accordingly, it is assumed that a UE 4900 first attempts access to an LTE eNB 4901 corresponding to an MeNB in S4905. For the access operation, the UE transmits an RRCConnectionRequest message of an LTE RRC layer, receives an RRCConnectionSetup message from the LTE eNB, and transmits an RRCConnectionSetupComplete message in response thereto, so as to perform the connection to the LTE eNB in S4905. Through the operation, an SRB1 bearer is generated between the UE and the LTE eNB, and in the future, the UE may exchange a control message with the eNB through the SRB1 bearer in S4910. The control message transmitted through SRB1 includes, for example, an RRCConnectionReconfiguration message, and the LTE eNB may configure an additional DRB in the UE or perform a measurement configuration such that the UE measures a neighboring eNB through the message.

Accordingly, the UE may measure the signal intensity of a neighboring 5G NB and accordingly may report the corresponding measurement result to the LTE eNB. The LTE eNB may determine to additionally use the 5G NB according to the measurement information in S4915. If the LTE eNB determines to additionally use the 5G NB, the LTE eNB transmits an addition request message to the 5G NB 4902 to add the 5G NB in S4920. The 5G NB receiving the message generates configuration information to add SRB1s to the corresponding UE in S4925 and transmits a response message including the configuration information to the LTE eNB in S4930. At this time, as described above, the corresponding information is transmitted to the container which can be interpreted by the LTE eNB and accordingly the LTE eNB may finally determine whether to configure SRB1s of the 5G NB.

If the LTE eNB determines to add the 5G NB according to the corresponding configuration information, the LTE eNB transfers the corresponding configuration information including the configuration information received from the 5G NB to the UE in S4935. That is, among the messages in step S4930, the message contained in a particular container defined in the standard is transferred to the UE and the remaining messages are processed by the LTE eNB and are not transferred to the UE. As described above, even when the configuration information is transferred to the UE, the RRCConnectionReconfiguration message may be used, and the UE receiving the message transmits an RRCConnectionReconfigurationComplete message to inform the eNB that the corresponding configuration was successfully received in S4940. Accordingly, SRB1s is completely configured between the UE and the 5G NB.

Thereafter, if a control message to be transmitted by the 5G NB is generated, it is determined, according to the message type, whether the control message is transmitted through the LTE eNB in S4945, S4950, and S4955 or is directly transmitted to the UE through SRB1s in S4960 and S4965. The control message directly transmitted to the UE may include, for example, physical layer-related configuration information requiring low latency, 5G NB-related measurement information, and broadcasting information.

Although not illustrated, if data to be transmitted by the UE is generated (that is, in the case of uplink transmission), the present disclosure proposes that an uplink message response message be transmitted to the eNB that transmitted the corresponding downlink message in the scenario for transmitting a response message of the message that the eNB transmitted to the UE as described above. Further, as described above, in the scenario in which the UE transmits the message to the eNB for itself, the present disclosure proposes a method by which the UE follows the rule specified in the standard such that a particular message is transmitted to a particular eNB or a method by which the UE receives, from the eNB, a configuration indicating the eNB to which the corresponding message will be transmitted. Particularly, in the method by which the eNB directly configures the eNB to which the uplink message will be transmitted, the UE may be configured to use one method of transmitting the corresponding message to the MeNB, to the SeNB, to either of them, and to both of them.

Further, the present disclosure proposes a scheme for transmitting corresponding information of the same message to different eNBs. For example, if it is configured to report the measurement result for a currently connected serving cell and a non-connected neighboring cell to the UE, the eNB configuring the corresponding measurement may configure the UE to report the measurement result from a frequency related to LTE to the MeNB and the measurement result from a frequency related to NR to the SeNB.

Figure 50:
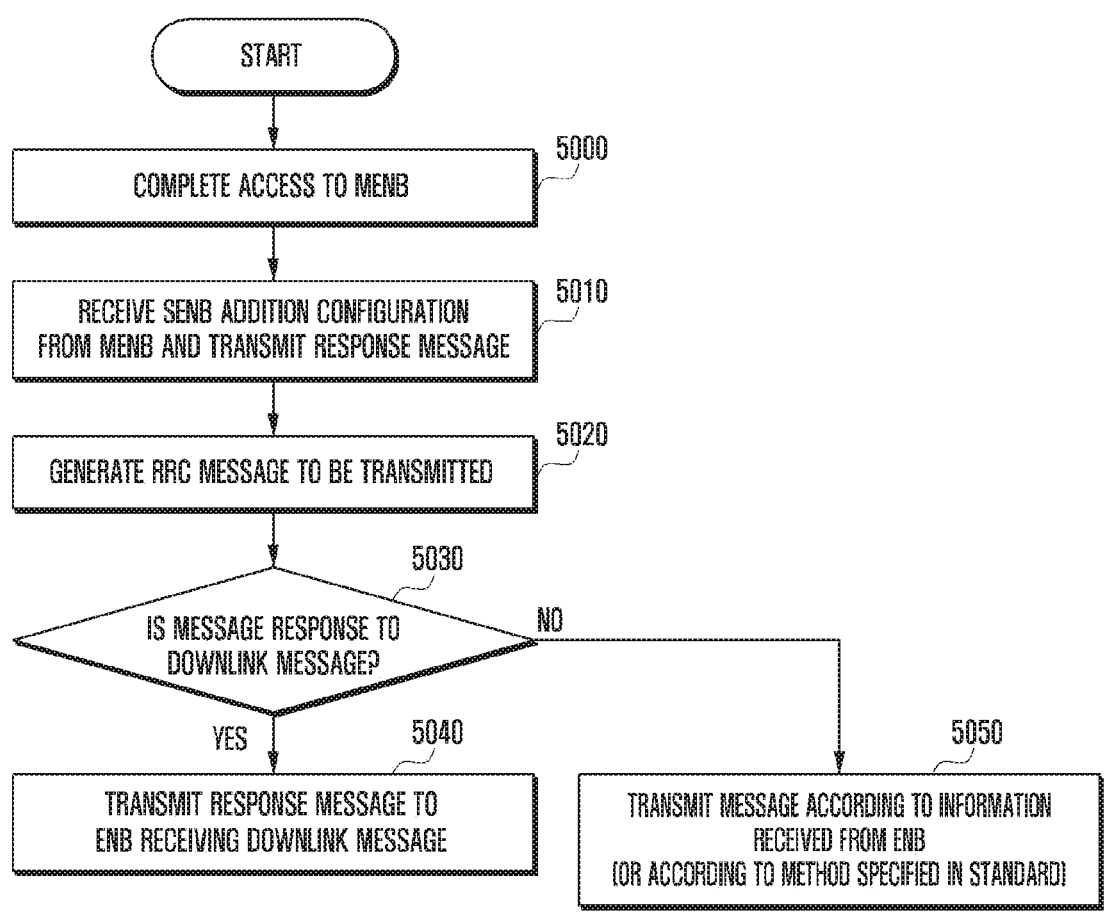
FIG. 50 is flowchart illustrating the operation of the UE according to an embodiment of the present disclosure.

FIG. 50 is flowchart illustrating the operation of the UE according to an embodiment of the present disclosure.

It is assumed that the LTE eNB is an MeNB and the NR NB is an SeNB, like in the example described above in connection with FIG. 50, but the present disclosure is not limited thereto. The UE attempts access to the MeNB, which is the LTE eNB, and completes the access in step 5000. As described above, when the access to the MeNB is completed, SRB1 is generated between the UE and the eNB. Thereafter, although not illustrated, the UE may receive measurement configuration information for neighboring cells including a cell controlled by the 5G NB from the MeNB, and accordingly reports the measurement result to the MeNB. Thereafter, the UE receives a configuration for adding the 5G NB as the SeNB from the MeNB and transmits a response message as acknowledge of the configuration in step 5010. According to the process, SRB1s is generated between the UE and the 5G NB.

Thereafter, when an RRC message that the UE transmits to the 5B NB is generated in S5020, the UE determines whether the corresponding message is a response message to a message previously received in the downlink in step 5030. If the corresponding message is such a response message, the UE transmits to the response message to the eNB associated with receiving the downlink message in step 5040. Otherwise, if the UE receives a configuration indicating whether to transmit the corresponding message from the eNB, the UE determines the eNB to which the UE will transmit the corresponding message and transmits the corresponding message to the eNB according to configuration information (or according to a method specified in the standard) in step 5050. For example, the UE may receive, from the eNB, configuration for allowing the UE to use at least one method of transmitting the corresponding message to the MeNB, transmitting the corresponding message to the SeNB, transmitting the corresponding message to either of them (that is, transmitting the message to any of the two eNBs) and transmitting the corresponding message to both of them (that is, transmitting the message to the two eNBs).

Figure 51:
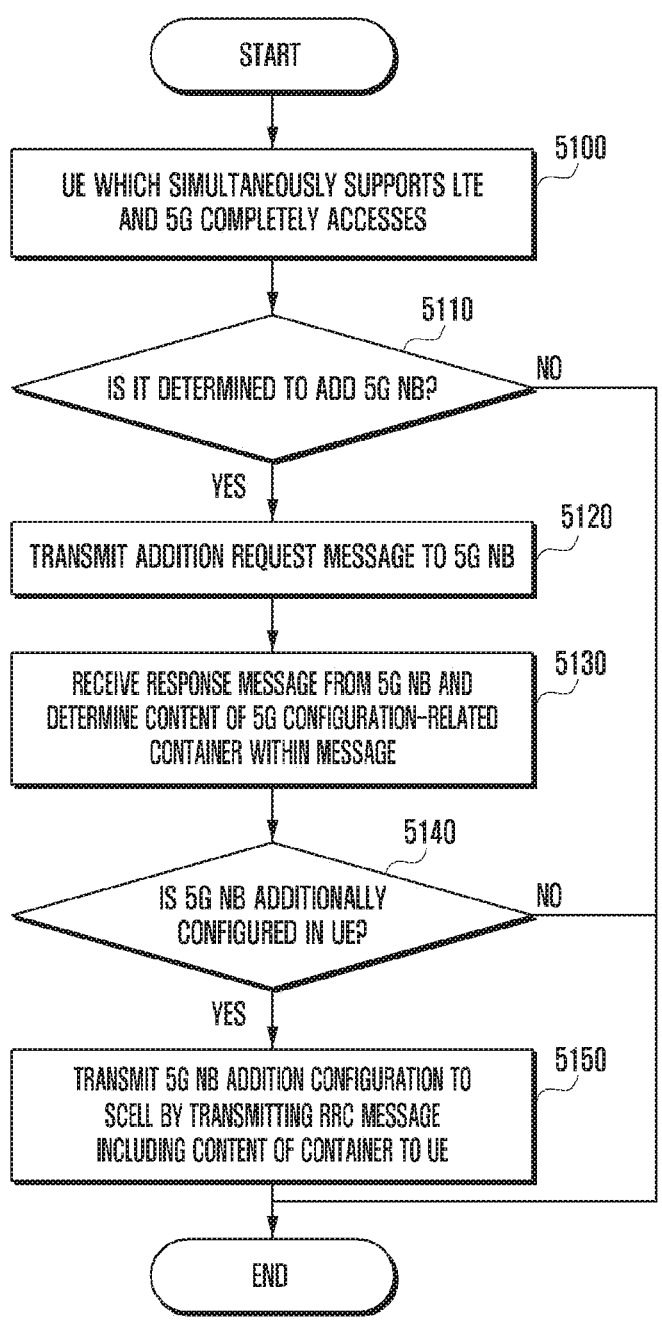
FIG. 51 is a flowchart illustrating the operation of the LTE eNB (MeNB) according to an embodiment of the present disclosure

FIG. 51 is a flowchart illustrating the operation of the LTE eNB (MeNB) according to an embodiment of the present disclosure.

It is assumed that the LTE eNB is an MeNB and the NR NB is an SeNB, as in the example described above in connection with FIG. 51, but the present disclosure is not limited thereto. Accordingly, the UE supporting the simultaneous connection to the LTE eNB and the 5G NB completes access to the LTE eNB in step 5100. Thereafter, the LTE eNB determines whether to add the 5G NB by determining whether the simultaneous connection function of the UE is supported and the signal intensity of the neighboring 5G NB in step 5110. If the LTE eNB determines to add the 5G NB, the LTE eNB transmits an addition request message to the 5G NB, requesting addition thereof, in step 5120. Thereafter, the LTE eNB receives a response message to the addition request from the 5G NB and determines whether the 5G NB accepts the addition request and the content of a 5G configuration-related container within the response message in step 5130. According to the determination result, it is determined whether the LTE eNB additionally configures the 5G NB in the UE in step 5140. When it is determined to add the 5G NB, the LTE eNB transmits a configuration for adding the 5G NB as an SCell by transmitting an RRC message including the content of the 5G configuration-related container to the UE in step 5150, and thus SRB1s is generated according to the configuration.

When it is determined not to add the 5G NB in step 5110, the operation ends.

Figure 52:
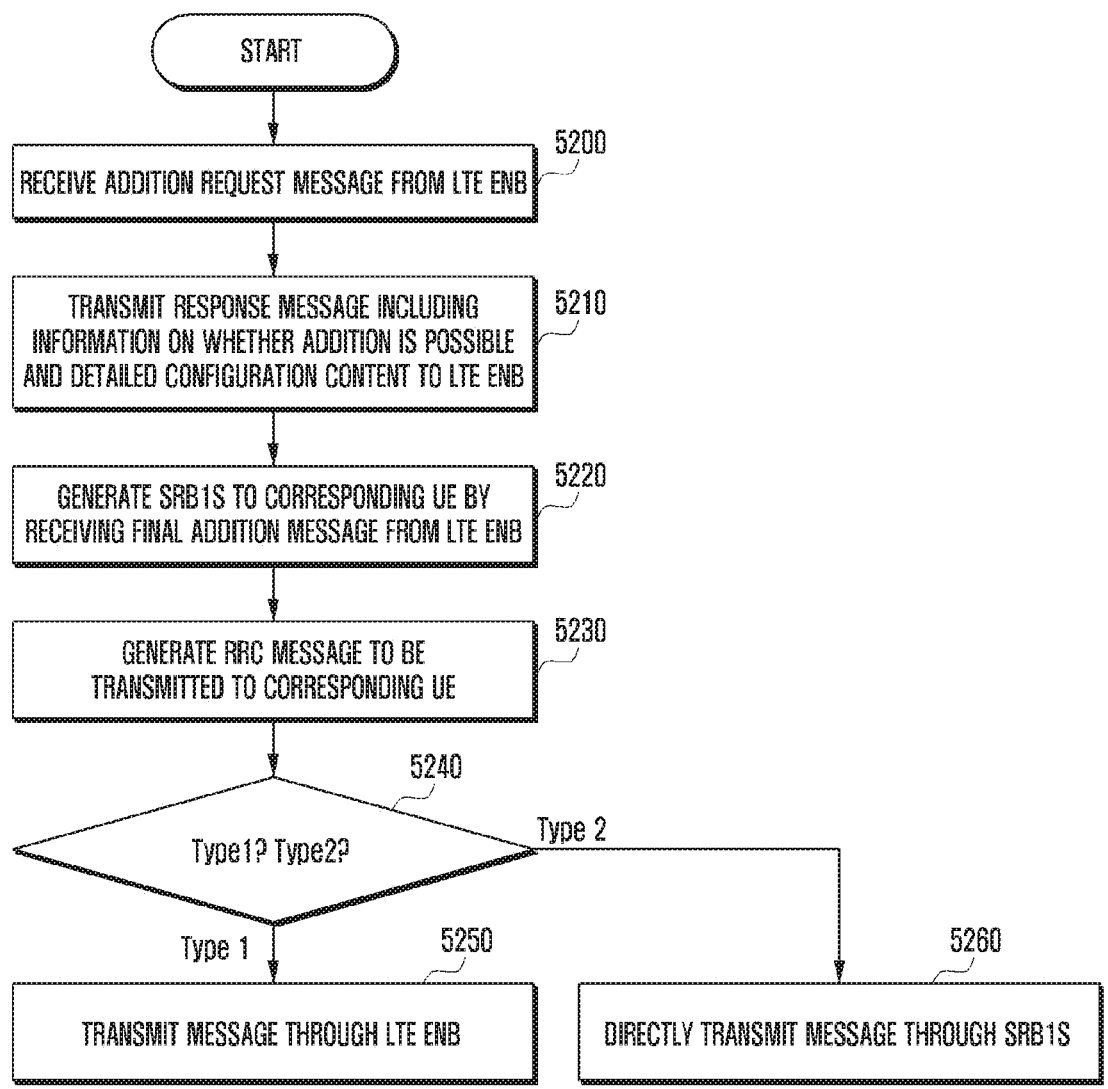
FIG. 52 is a flowchart illustrating the operation of the NR NB (SeNB) according to an embodiment of the present disclosure.

FIG. 52 is a flowchart illustrating the operation of the NR NB (SeNB) according to an embodiment of the present disclosure.

It is assumed that the LTE eNB is an MeNB and the NR NB is an SeNB, like in the example described above in connection with FIG. 51, but the present disclosure is not limited thereto. Accordingly, the NR NB receives a message which makes a request for allowing one UE to additionally use the NR NB from the LTE eNB in step 5200. Accordingly, the NR NB transmits a response message including information on whether the corresponding request is accepted and the detailed configuration content if the request is accepted to the LTE eNB in step 5210. Thereafter, the NR NB receives a final addition identification message from the LTE eNB, and SRB1s is generated between the corresponding UE and the NR NB in step 5230.

Next, if the NR NB generates an RRC message to be transmitted to the corresponding UE in step 5240, the NR NB determines whether the generated RRC message is a Type 1 RRC message or a Type 2 RRC message in step 5240. If the generated RRC message is a Type 1 message, the NR NB transmits the message through the LTE eNB, that is, transmits the message through SRB1 in step 5250. If the generated RRC message is a Type 2 message, the NR NB directly transmits the message through SRB1s in step 5260. The message directly transmitted to the UE, such as Type 2, may include, for example, configuration information related to a physical layer requiring low latency or measurement information and broadcasting information related to the 5G NB.

Figure 53:
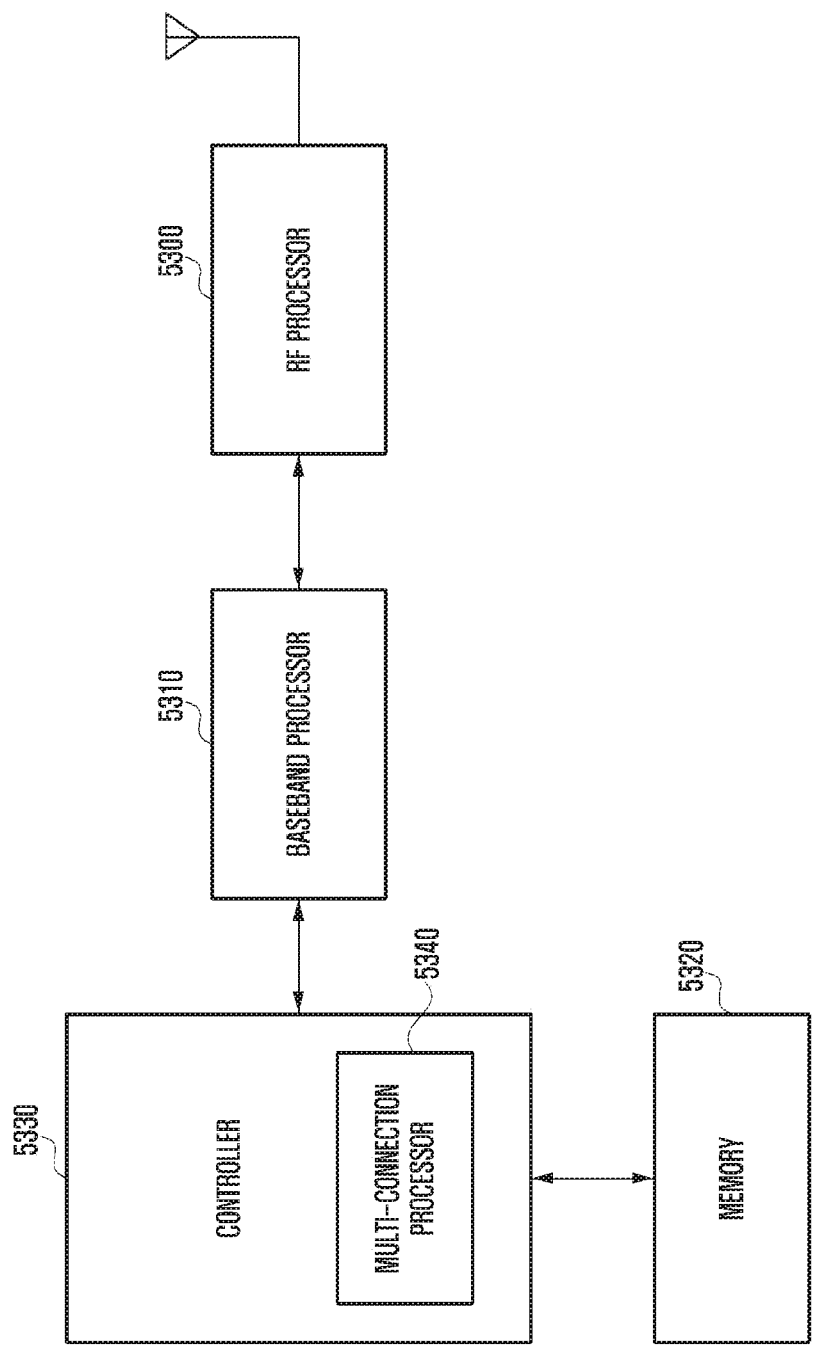
FIG. 53 is a block diagram illustrating the configuration of the UE according to an embodiment of the present disclosure.

FIG. 53 is a block diagram illustrating the configuration of a UE according to an embodiment of the present disclosure.

Referring to FIG. 53, the UE includes a radio frequency (RF) processor 5300, a baseband processor 5310, a memory 5320, and a controller 5330.

The RF processor 5300 performs a function for transmitting and receiving a signal through a wireless channel, such as band conversion and amplification of a signal. The RF processor 5300 up-converts a baseband signal provided from the baseband processor 5310 into an RF band signal, transmits the RF band signal through an antenna, and down-converts the RF band signal received through the antenna into a baseband signal. For example, the RF processor 5300 may include a transmission filter, a reception filter, an amplifier, a mixer, an oscillator, a digital-to-analog convertor (DAC), an analog-to-digital convertor (ADC), and the like. Although only one antenna is illustrated in FIG. 53, the UE may include a plurality of antennas. In addition, the RF processor 5300 may include a plurality of RF chains. Moreover, the RF processor 5300 may perform beamforming. For the beamforming, the RF processor 5300 may control the phase and the size of each signal transmitted/received through a plurality of antennas or antenna elements.

The baseband processor 5100 performs a function for conversion between a baseband signal and a bitstream according to a physical layer standard of the system. For example, in data transmission, the baseband processor 5310 generates complex symbols by encoding and modulating a transmission bitstream. In addition, the baseband processor 5310, upon receiving data, reconstructs the reception bitstream through the demodulation and decoding of the baseband signal provided from the RF processor 5300. For example, in an orthogonal frequency division multiplexing (OFDM) scheme, when data is transmitted, the baseband processor 5310 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, in data reception, the baseband processor 5310 divides the baseband signal provided from the RF processor 5300 in units of OFDM symbols, reconstructs the signals mapped to the subcarriers through a fast Fourier transform (FFT) operation, and then reconstructs the reception bitstream through demodulation and decoding.

The baseband processor 5310 and the RF processor 5300 transmit and receive signals as described above. Accordingly, the baseband processor 5310 and the RF processor 5300 may be referred to as a transmitter, a receiver, a transceiver, or a communicator. In addition, at least one of the baseband processor 5310 and the RF processor 5300 may include different communication modules to process signals of different frequency bands. Further, the different frequency bands may include a super-high-frequency (SHF) (for example, 2.5 GHz and 5 GHz) band and a millimeter (mm) wave (for example, 60 GHz) band.

The memory 5320 stores data such as a basic program, an application program, and setting information for the operation of the UE.

The controller 5330 controls the overall operation of the UE. For example, the controller 5330 transmits and receives a signal through the baseband processor 5310 and the RF processor 5300. In addition, the controller 5330 may record data in the memory 5320 and read the data. To this end, the controller 5330 may include at least one processor. For example, the controller 5330 may include a CP (communication processor) that performs control for communication, and an AP (application processor) that controls a higher layer such as an application program. According to an embodiment of the present disclosure, the controller 5330 includes a multi-connection processor 5340 for processing an operation in a multi-connection mode. For example, the controller 5330 may control the UE to perform the process illustrated in the UE operation in FIG. 50. When the controller according to an embodiment of the present disclosure receives SeNB configuration information from an MeNB, the controller adds an SeNB, and thereafter, if an SeNB-related control message is generated, determines the eNB to which the message will be transmitted and the bearer (SRB1 or SRB1s) through which the message will be transmitted and then transmits the message to the corresponding eNB.

Figure 54:
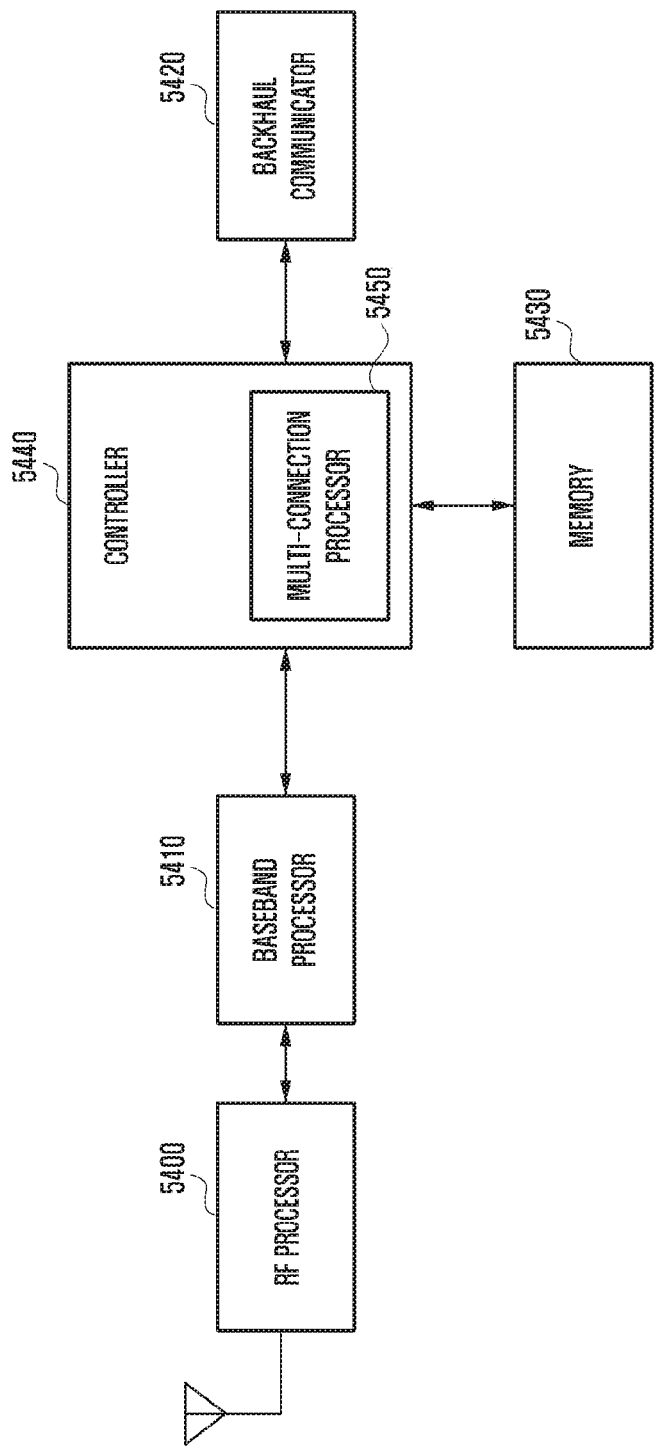
FIG. 54 is a block diagram illustrating the configuration of an LTE eNB (MeNB) according to an embodiment of the present disclosure.

FIG. 54 is a block diagram illustrating the configuration of an LTE eNB (MeNB) according to an embodiment of the present disclosure.

As illustrated in FIG. 54, the LTE eNB includes an RF processor 5400, a baseband processor 5410, a backhaul communicator 5420, a memory 5430, and a controller 5440.

The RF processor 5400 performs a function for transmitting and receiving a signal through a wireless channel, such as band conversion and amplification of a signal. That is, the RF processor 5400 up-converts a baseband signal provided from the baseband processor 5410 into an RF band signal, transmits the RF band signal through an antenna, and then down-converts the RF band signal received through the antenna into a baseband signal. For example, the RF processor 5400 may include a transmission filter, a reception filter, an amplifier, a mixer, an oscillator, a DAC, and an ADC. Although only one antenna is illustrated in FIG. 54, the LTE eNB may include a plurality of antennas. In addition, the RF processor 5400 may include a plurality of RF chains. Moreover, the RF processor 5400 may perform beamforming. For the beamforming, the RF processor 5400 may control a phase and a size of each of the signals transmitted and received through a plurality of antennas or antenna elements.

The baseband processor 5410 performs a function of performing conversion between a baseband signal and a bitstream according to a physical layer standard of the first radio access technology. For example, in data transmission, the baseband processor 5410 generates complex symbols by encoding and modulating a transmission bitstream. In addition, in data reception, the baseband processor 5410 reconstructs a reception bitstream through demodulation and decoding of the baseband signal provided from the RF processor 5400. For example, in an OFDM scheme, when data is transmitted, the baseband processor 5410 generates complex symbols by encoding and modulating a transmission bitstream, maps the complex symbols to subcarriers, and then configures OFDM symbols through an IFFT operation and CP insertion. Further, when data is received, the baseband processor 5410 splits the baseband signal provided from the RF processor 1510 in units of OFDM symbols, reconstructs the signals mapped to the subcarriers through an FFT operation, and then reconstructs the reception bitstream through demodulation and decoding. The baseband processor 5410 and the RF processor 5400 transmit and receive signals as described above. Accordingly, the baseband processor 5410 and the RF processor 5400 may be referred to as a transmitter, a receiver, a transceiver, a communicator, or a wireless communicator.

The backhaul communicator 5420 provides an interface for communicating with other nodes within the network. That is, the backhaul communicator 5420 converts a bitstream transmitted to a different node, for example, another access node or a core network from the LTE eNB, into a physical signal and converts a physical signal received from the different node into a bitstream.

The memory 5430 stores data such as a basic program, an application program, and setting information for the operation of the LTE eNB. Particularly, the memory 5430 may store information on a bearer allocated to the accessed UE and a measurement result reported from the accessed UE. Further, the memory 5430 may store information which is a reference for determining whether to provide or interrupt multiple connections to the UE. In addition, the memory 5430 provides stored data according to a request from the controller 5440.

The controller 5440 controls the overall operation of the LTE eNB. For example, the controller 5440 transmits and receives a signal through the baseband processor 5410 and the RF processor 5400 or through the backhaul communicator 5420. In addition, the controller 5440 may record data in the memory 5430 and read the data. To this end, the controller 5440 may include at least one processor. According to an embodiment of the present disclosure, the controller 5440 communicates with a 5G NB through the backhaul communicator 5420 according to whether a function of adding the 5G NB is supported by the UE and adds the 5G NB to the corresponding UE, and then if a message received from the backhaul communicator 5420 includes a predetermined container, transfers the container to the UE.

Figure 55:
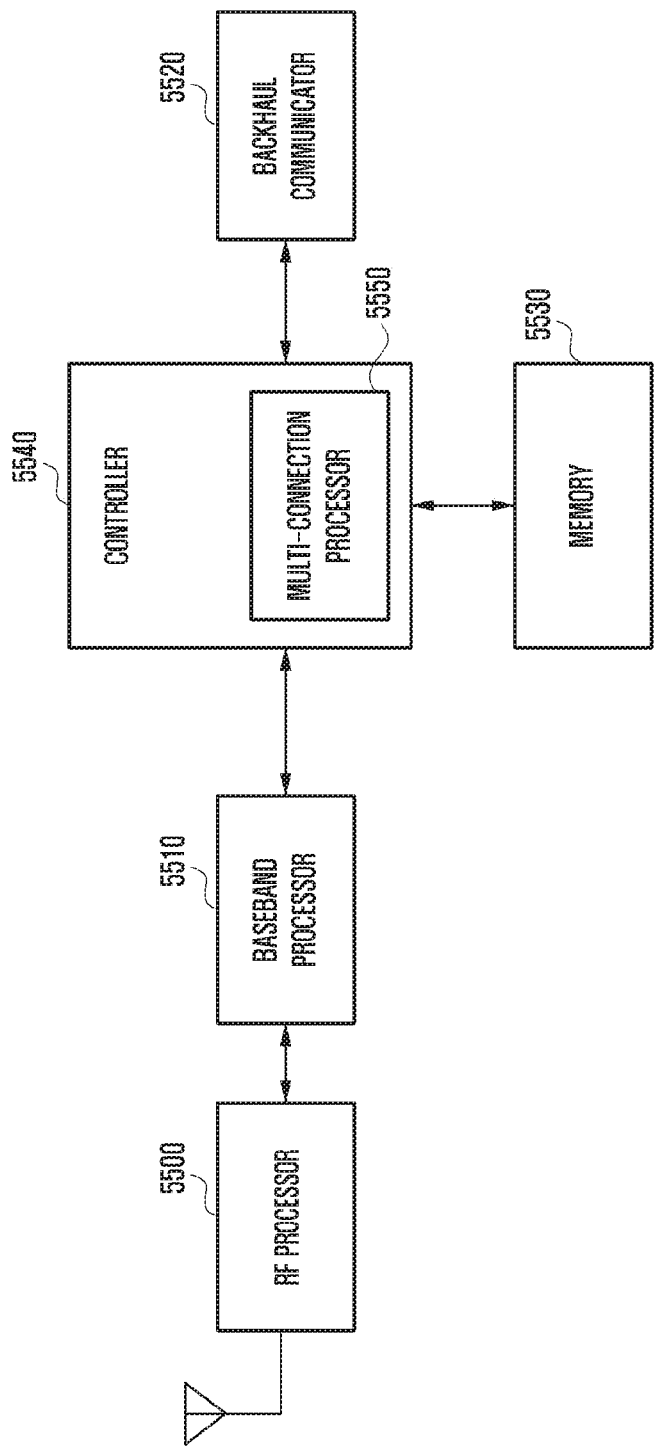
FIG. 55 is a block diagram illustrating the configuration of a 5G eNB (SeNB) according to an embodiment of the present disclosure.

FIG. 55 is a block diagram illustrating the configuration of a 5G NB (SeNB) according to an embodiment of the present disclosure.

As illustrated in FIG. 55, the 5G NB includes an RF processor 5500, a baseband processor 5510, a backhaul communicator 5520, a memory 5530, and a controller 5540.

The RF processor 5500 performs a function for transmitting and receiving a signal through a wireless channel, such as band conversion and amplification of a signal. That is, the RF processor 5500 up-converts a baseband signal provided from the baseband processor 5510 into an RF band signal, transmits the RF band signal through an antenna, and then down-converts the RF band signal received through the antenna into a baseband signal. For example, the RF processor 5500 may include a transmission filter, a reception filter, an amplifier, a mixer, an oscillator, a DAC, and an ADC. Although only one antenna is illustrated in FIG. 55, the 5G NB may include a plurality of antennas. In addition, the RF processor 5500 may include a plurality of RF chains. Moreover, the RF processor 5500 may perform beamforming. For the beamforming, the RF processor 5500 may control the phase and size of each of the signals transmitted and received through a plurality of antennas or antenna elements.

The baseband processor 5510 performs a function of performing conversion between a baseband signal and a bitstream according to a physical layer standard of the second radio access technology. The first radio access technology and the second radio access technology may be the same as or different from each other. For example, in data transmission, the baseband processor 5510 encodes and modulates a transmission bitstream to generate complex symbols. In addition, the baseband processor 5510, when receiving data, reconstructs the reception bitstream through the demodulation and decoding of the baseband signal provided from the RF processor 5500. For example, in an OFDM scheme, when data is transmitted, the baseband processor 5510 generates complex symbols by encoding and modulating a transmission bitstream, maps the complex symbols to subcarriers, and then configures OFDM symbols through an IFFT operation and CP insertion. Further, when data is received, the baseband processor 5510 splits the baseband signal provided from the RF processor 5500 in units of OFDM symbols, reconstructs the signals mapped to the subcarriers through a fast Fourier transform (FFT) operation, and then reconstructs the reception bitstream through demodulation and decoding. The baseband processor 5510 and the RF processor 5500 transmit and receive signals as described above. Accordingly, each of the baseband processor 5510 and the RF processor 5500 may be referred to as a transmitter, a receiver, a transceiver, a communicator, or a wireless communicator.

The backhaul communicator 5520 provides an interface for communicating with other nodes within the network. That is, the backhaul communicator 5520 converts a bitstream transmitted from the 5G NB to another node, for example, another access node or a core network, into a physical signal and converts a physical signal received from the other node into a bitstream.

The memory 5530 stores a basic program, an application program, and configuration information for the operation of the 5G NB. Particularly, the memory 5530 may store information on a bearer allocated to the accessed UE and a measurement result reported from the accessed UE. Further, the memory 5530 may store information which is a reference to determining whether to provide or interrupt multiple connections to the UE. In addition, the memory 5530 provides stored data according to a request from the controller 5540. The controller 5540 controls the overall operation of the 5G NB. For example, the controller 5540 transmits and receives a signal through the baseband processor 5510 and the RF processor 5500 or through the backhaul communicator 5520. In addition, the controller 5540 may record data in the memory 5530 and read the data. To this end, the controller 5540 may include at least one processor.

According to an embodiment of the present disclosure, when receiving a 5G NB addition request message of the UE from the LTE eNB through the backhaul communicator 5520, the controller 5540 generates a detailed information message to be configured in the corresponding UE and transmits configuration information through the backhaul communicator 5520, and then when transmitting a control message to the corresponding UE, determines whether to transmit the control message via the LTE eNB through the backhaul communicator 5520 according to the above-described method or to directly transmit the control message through generated SRB1s, and transmits the corresponding message to the UE.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the embodiment has been described in the detailed description of the present disclosure, the present disclosure may be modified in various forms without departing from the scope of the present disclosure. Therefore, the scope of the present disclosure should not be defined as being limited to the embodiments, but should be defined by the appended claims and equivalents thereof.

The invention claimed is:

1. A method performed by a terminal in a wireless communication system, the method comprising:
receiving, from a long term evolution (LTE) base station involved in a dual connectivity of the terminal, a first message via a first signaling radio bearer (SRB) established between the terminal and the LTE base station, the first message including configuration information of a second SRB;
establishing the second SRB based on the configuration information of the second SRB included in the first message, the second SRB being established between the terminal and a new radio (NR) base station involved in the dual connectivity of the terminal for transmitting and receiving a radio resource control (RRC) message;
transmitting, to the LTE base station via the first SRB, a second message as a response to the first message;
identifying whether a RRC reconfiguration message is received from the NR base station via the established second SRB, the RRC reconfiguration message including configuration information associated with a physical layer associated with the NR base station; and
transmitting, to the NR base station via the established second SRB, an RRC reconfiguration complete message as a response to the RRC reconfiguration message in case that the RRC reconfiguration message is received from the NR base station via the established second SRB.

2. The method of claim 1, wherein the RRC reconfiguration message further includes information associated with measurement of the NR base station.

3. A method performed by a new radio (NR) base station in a wireless communication system, the method comprising:
receiving, from a long term evolution (LTE) base station involved in a dual connectivity of a terminal, a first message for adding the NR base station for the dual connectivity of the terminal;
generating configuration information of a first signaling radio bearer (SRB) between the NR base station and the terminal for transmitting and receiving a radio resource control (RRC) message;
transmitting, to the LTE base station, a second message as a response to the first message, the second message including the configuration information of the first SRB;
establishing the first SRB between the NR base station and the terminal;
transmitting, to the terminal via the established first SRB, a RRC reconfiguration message, the RRC reconfiguration message including configuration information associated with a physical layer associated with the NR base station; and
receiving, from the terminal via the established first SRB, an RRC reconfiguration complete message as a response to the RRC reconfiguration message.

4. The method of claim 3, wherein the RRC reconfiguration message further includes information associated with measurement of the NR base station.

5. A terminal in a wireless communication system, the terminal comprising:
a transceiver; and
a controller coupled with the transceiver and configured to:
receive, from a long term evolution (LTE) base station involved in a dual connectivity of the terminal, a first message via a first signaling radio bearer (SRB) established between the terminal and the LTE base station, the first message including configuration information of a second SRB,
establish the second SRB based on the configuration information of the second SRB included in the first message, the second SRB being established between the terminal and a new radio (NR) base station involved in the dual connectivity of the terminal for transmitting and receiving a radio resource control (RRC) message,
transmit, to the LTE base station via the first SRB, a second message as a response to the first message,
identify whether a RRC reconfiguration message is received from the NR base station via the established second SRB, the RRC reconfiguration message including configuration information associated with a physical layer associated with the NR base station; and
transmit, to the NR base station via the established second SRB, an RRC reconfiguration complete message as a response to the RRC reconfiguration message in case that the RRC reconfiguration message is received from the NR base station via the established second SRB.

6. The terminal of claim 5, wherein the RRC reconfiguration message further includes information associated with measurement of the NR base station.

7. A new radio (NR) base station in a wireless communication system, the NR base station comprising:
a transceiver; and
a controller coupled with the transceiver and configured to:
receive, from a long term evolution (LTE) base station involved in a dual connectivity of a terminal, a first message for adding the NR base station for the dual connectivity of the terminal,
generate configuration information of a first signaling radio bearer (SRB) between the NR base station and the terminal for transmitting and receiving a radio resource control (RRC) message,
transmit, to the LTE base station, a second message as a response to the first message, the second message including the configuration information of the first SRB,
establish the first SRB between the NR base station and the terminal,
transmit, to the terminal via the established first SRB, a RRC reconfiguration message, the RRC reconfiguration message including configuration information associated with a physical layer associated with the NR base station, and
receive, from the terminal via the established first SRB, an RRC reconfiguration complete message as a response to the RRC reconfiguration message.

8. The NR base station of claim 7, wherein the RRC reconfiguration message further includes information associated with measurement of the NR base station.

* * * * *